United States Patent [19]

Watts et al.

[11] 4,412,294

[45] Oct. 25, 1983

[54] DISPLAY SYSTEM WITH MULTIPLE SCROLLING REGIONS

[75] Inventors: LaVaughn F. Watts; Ronald L. Smith; Yogendra C. Pandya; Paul B. Wood, all of Houston, Tex.

[73] Assignee: Texas Instruments Incorporated, Dallas, Tex.

[21] Appl. No.: 237,316

[22] Filed: Feb. 23, 1981

[51] Int. Cl.[3] .............................................. G06F 3/14

[52] U.S. Cl. .................................. 364/518; 340/726; 364/521; 364/900

[58] Field of Search .............. 364/518, 521, 200, 900; 340/716, 724, 726

[56] References Cited

U.S. PATENT DOCUMENTS

| | | | |
|---|---|---|---|
| 3,792,462 | 2/1974 | Casey et al. | 340/726 X |
| 4,075,620 | 2/1978 | Passavant et al. | 364/521 X |
| 4,117,469 | 9/1978 | Levine | 364/200 |
| 4,120,028 | 10/1978 | Membrino et al. | 364/200 |
| 4,126,814 | 11/1978 | Marlowe | 315/307 |
| 4,197,590 | 4/1980 | Sukonick et al. | 364/900 |
| 4,284,988 | 8/1981 | Seitz et al. | 340/726 |

FOREIGN PATENT DOCUMENTS 4554 10/1979 European Pat. Off. .

OTHER PUBLICATIONS

H. E. Bush et al., "Data-Display Terminal Buffer Addressing for Scrolling Operations", *IBM Tech. Disc. Bull.*, vol. 23, No. 6, Nov. 1980, pp. 2507-2508.

D. A. Stockwell, "Display with Partitioned Slow Scroll", *IBM Tech. Disc. Bull.*, vol. 23, No. 4, Sep. 1980, pp. 1512-1513.

R. R. Demke et al., "Line Attribute Control", *IBM Tech. Disc. Bull.*, vol. 22, No. 11, Apr. 1980, pp. 4809-4810.

*Primary Examiner*—Jerry Smith

*Attorney, Agent, or Firm*—Douglas A. Lashmit; N. Rhys Merrett; Melvin Sharp

[57] ABSTRACT

A data display and management system includes a microprocessor whose functions are implemented by instructions in data from a directly connected main memory. A mass data storage memory is connected to the main memory and has permanently stored instructions therein for the microprocessor. A display control system which operates asynchronously with the microprocessor includes a display controller, display memory, character memory means, and a visual character attribute generator. By linking one or more row attribute bytes, or pointers, to each row of characters stored in the display memory the display controller performs character and row manipulation on a display device without transferring whole blocks of data in the display memory. Multi-region display segmentation into horizontal and vertical split regions, smooth or discrete scrolling of individual regions, and various editing functions are achieved by modifying the associated display memory pointers.

7 Claims, 15 Drawing Figures

DISPLAY SYSTEM WITH MULTIPLE SCROLLING REGIONS

BACKGROUND OF THE INVENTION

This invention relates generally to data display and control systems and more particularly to a system having a display device segmented into multiple scrolling regions.

Traditional region separation has been performed using large scale computers. In such cases, data to be placed into a desired region was computed by software resident within the main computer. The data was then transmitted to a display device as a new display frame. Heretofore, data in display systems were not organized for display in terms of regions or windows into a data block. Further, the segmentation of the display into vertical and horizontal regions was performed by the large computer in software, and not at the local display device. Prior systems could not provide smooth or pixel scrolling of a vertical split region because of the immense software and processing time requirements.

SUMMARY OF THE INVENTION

In one embodiment of the present system, a microprocessor controls the system operation in accordance with the list of instructions stored in a random access main memory. The main memory stores a portion of the list of instructions, while the complete list of instructions is stored in a mass data storage memory in the form of one or more GROMs. An additional ROM contains a list of instructions for initializing the system and a nonvolatile memory in the form of a CMOS RAM powered by a battery is included to store system configuration parameters in the event of a power loss.

A display device such as a CRT is controlled by a display control system formed of a CRT controller, a visual attribute generator, a display memory, and a character ROM. Alternate character sets are provided by a character RAM which is accessed by the display controller through the attribute generator. The display controller accesses the display memory asynchronously with the system microprocessor, thus decreasing the processing time and increasing the processor throughput. Segmentation of the display into multiple horizontal and vertical split regions which are independently scrollable either discretely or smoothly is provided by the linking of one or more row attribute bytes or "pointers" to each character and character attribute row stored in the display memory. In this manner, data can be manipulated on the display screen without changing the absolute address of the data in display memory. That is, only the pointers associated with each block of data (corresponding to a displayed row) need to be modified by the display controller. Processing time is greatly reduced because whole blocks of data need not be transferred in the display memory, only the display memory addresses associated with the pointers are affected.

For network applications, input/output means are provided for communicating with a controller or "host" computer. For local control of the system, input means in the form of a keyboard are provided. In one embodiment, the keyboard is a self-contained unit having a dedicated microcomputer. The keyboard unit communicates with the system through a keyboard interface unit that converts the serial data into a parallel form which is processed by the system microprocessor.

Discrete control of the display device contrast is achieved by a contrast register in conjunction with the attribute generator.

It is an object of this invention to provide a display control system which permits the smooth or discrete scrolling of a plurality of horizontal and vertical split display regions.

Another object is to provide a system for controlling a display memory which minimizes the processing load on a system CPU.

Still another object is to provide a system for mapping the contents of a display memory without requiring the transfer of blocks of data therein during various editing and scroll functions.

Yet another object is to provide a display control system whch may be formatted either locally or from a remote host computer.

Another object is to provide the system microprocessor with executable instructions at a high access rate, and to provide the microprocessor with instructions through a directly accessed memory whose capacity is less than the list of program instructions.

BRIEF DESCRIPTION OF THE DRAWINGS

Other objects and many of the attendant advantages of the present invention will be readily apparent as the invention becomes better understood by reference to the following detailed description with the appended claims, when considered in conjunction with the accompanying drawings, wherein:

DETAILED DESCRIPTION OF INVENTION

SYSTEM ARCHITECTURE

Figure 1A:
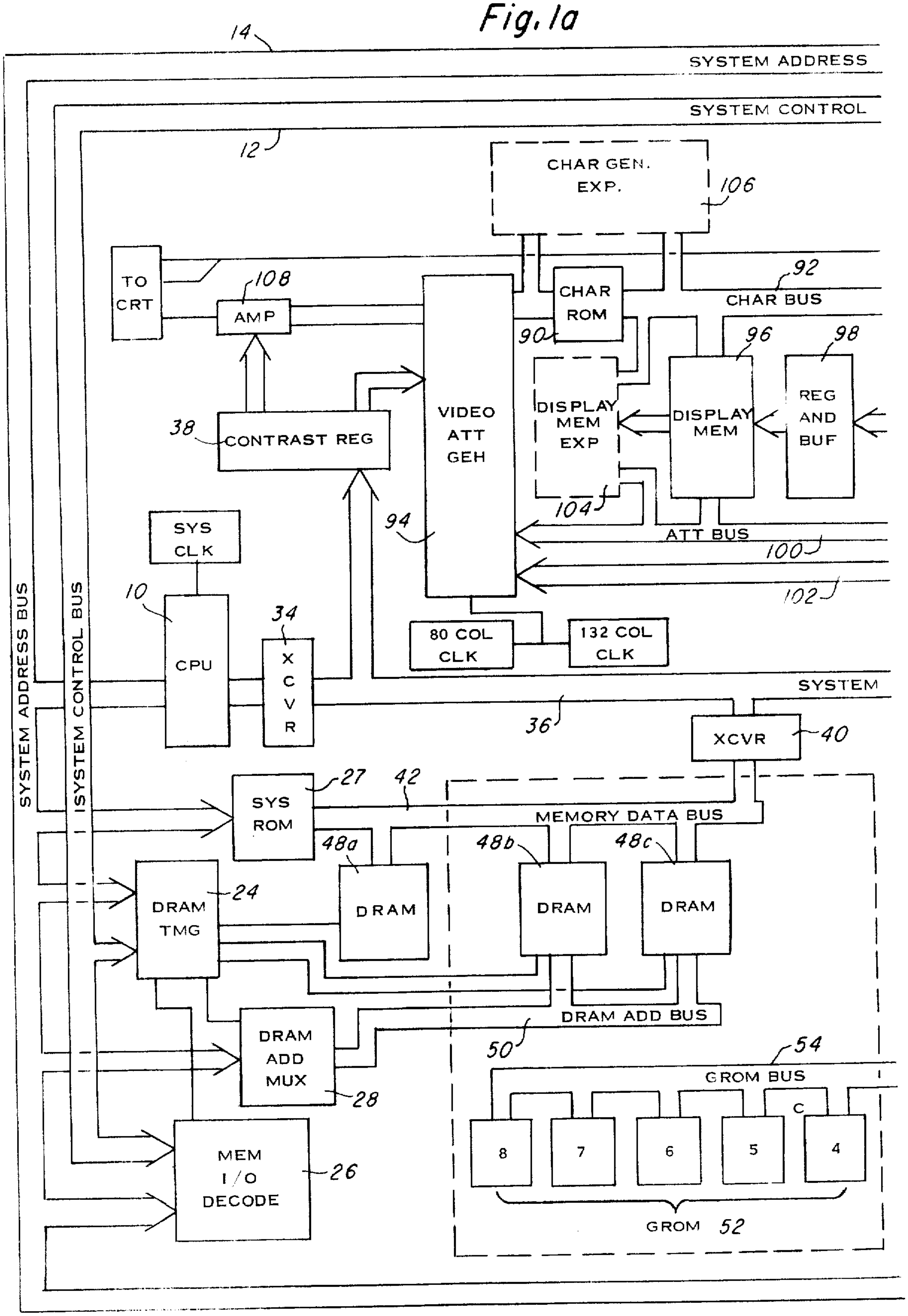
FIGS. 1*a*–1*c* form a block diagram of an electronic terminal including a display controller system according to the present invention.
Figure 1B:
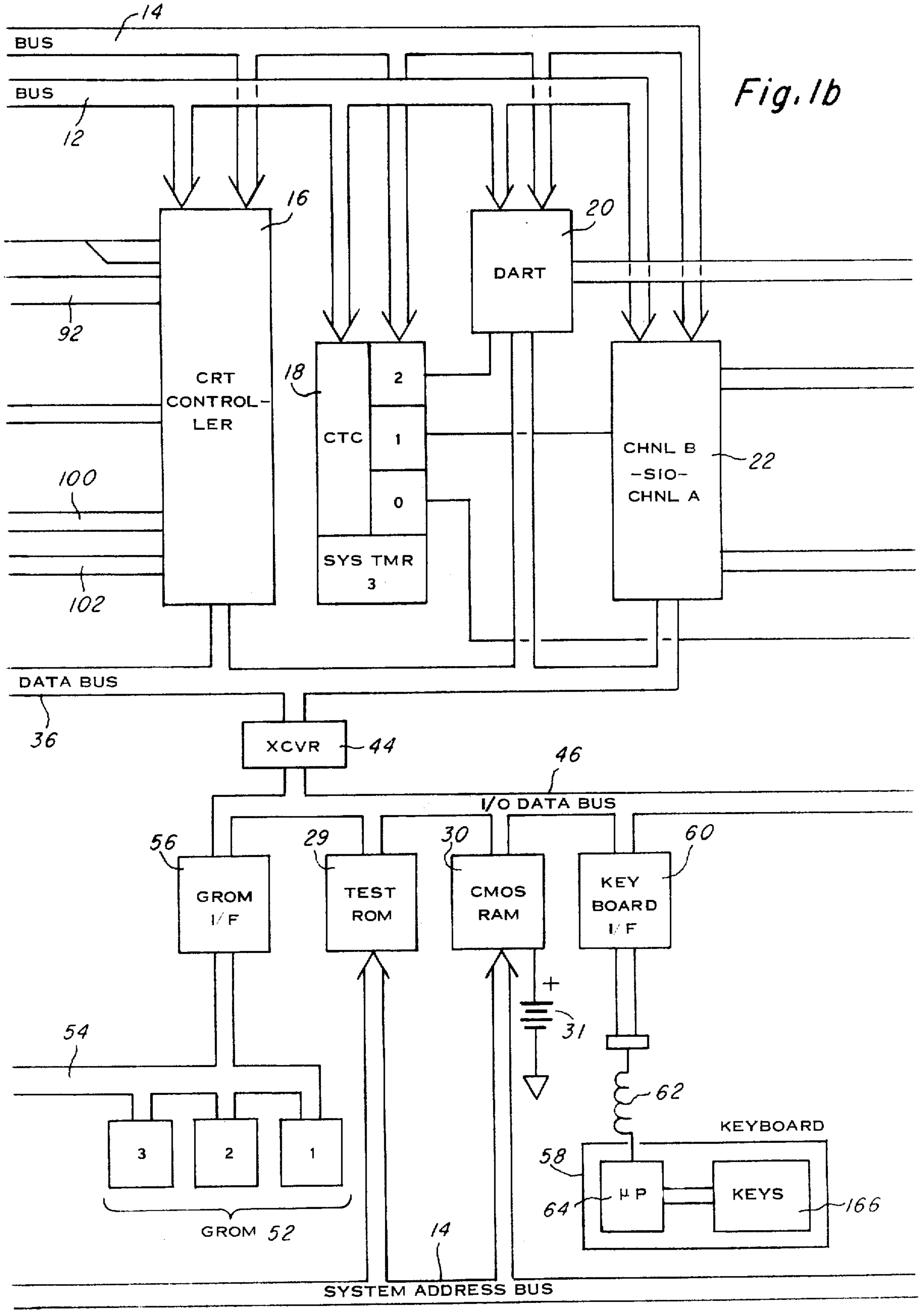
Figure 1C:
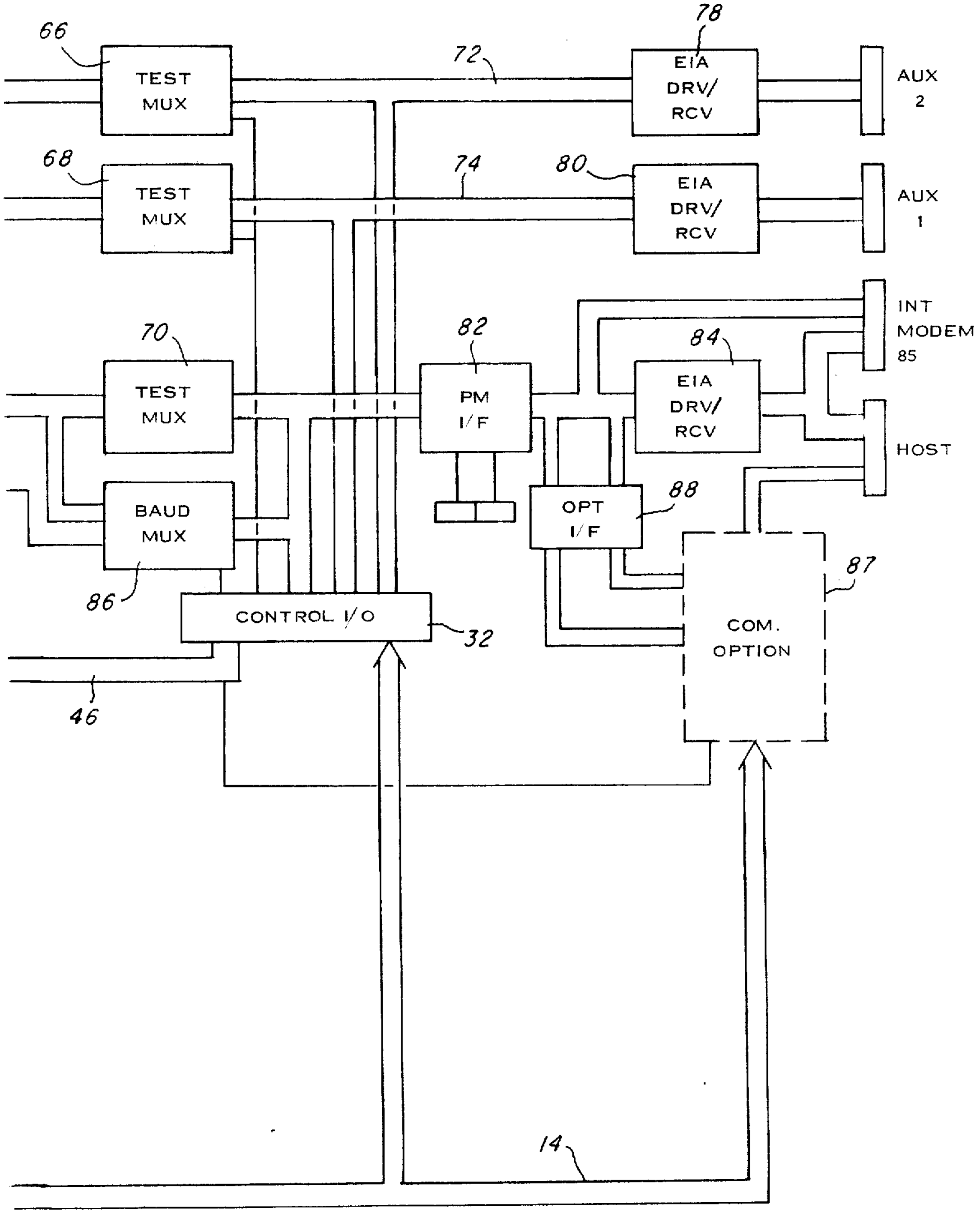

Referring now to FIGS. 1*a*–1*c* there is shown a block diagram of an electronic input/output terminal according to the present invention. A system microprocessor CPU 10 is coupled to a system control bus 12 and a system address bus 14. Control bus 12 and address bus 14 both extend to a CRT controller CRTC 16, a counter-timer circuit CTC 18, a dual asynchronous transmitter/receiver DART 20, a serial input/output device SIO 22, a dynamic random-access memory (DRAM) timer 24, and a memory I/O decoder 26. System address 14 also extends to a system read-only memory (ROM) 27, a DRAM address multiplexer 28, a test ROM 29, a CMOS RAM 30, and a control I/O device 32. A battery 31 is coupled to CMOS RAM 30 to provide backup during power off conditions. CPU 10 is connected through a two-way buffer for transceiver (XCVR) 34 to a system data bus 36. Data bus 36 extends to a contrast register 38, and to CRTC 16, CTC 18, DART 20, and SIO 22. Data bus 36 is connected through a transceiver 40 to a memory data bus 42 which in turn extends to system ROM 27 and a series of DRAMs 48*a*–48*c*. Each DRAM is also connected to DRAM timer 24 and to a DRAM address bus 50 which is connected to a DRAM multiplexer 28. Data bus 36 is also connected through a XCVR 44 to an I/O data bus 46 which in turn extends to test ROM 29, CMOS RAM 30, and control I/O 32.

Program storage is provided by large scale mass read-only memory in the form of GROMs 52-1 to 52-8. The GROMs are connected to a common GROM bus 54 which is in turn connected to I/O data bus 46 through a GROM I/F 56.

An operator interfaces with the present system by means of a keyboard 58 which is connected to a keyboard I/F 60 through a telephone type multiconductor cable 62. Keyboard 58 contains its own microcomputer 64 which permits keyboard 58 to process instructions with a minimum computing load on CPU 10.

A series of test multiplexers 66, 68, and 70, are connected respectively to DART 20, and channels B and A of SIO 22, to provide loop back testing of the terminal in a local operating mode. A set of communication buses 72, 74, and 76, are connected to control I/O 32 and, respectively, to test multiplexers 66, 68, and 70. Communication to peripheral devices such as printers is provided from communication buses 72 and 74 through EIA driver-receivers 78 and 80, which are connected respectively to auxiliary ports AUX 2 and AUX 1. Communication with a host computer is provided by communication bus 76 which is connected through a PM interface 82 and an EIA driver-receiver 84 to an input/output port labeled HOST in the drawing. Longer distance communication is provided by means of an internal modulator-demodulator (MODEM) 85 which is also connected to communication bus 76. PM I/F 82 may be connected to a "personality module" (not shown) which permits the terminal communications to be compatible with various host computers. A baud rate multiplexer 86 is connected to communication bus 76 and to control I/O 32 to provide synchronization and a selection of baud rates with the host computer. The timing of baud multiplexer 86 is provided by timer 18-0 of CTC 18. Baud rate timing for the AUX 2 and AUX 1 ports is provided by timers 18-2 and 18-1 of CTC 18. Timer 18-3 functions as a system timer.

A communications option unit 87, shown by dashed lines in FIG. 1*c*, is connected to the HOST port, the system address bus 14 and through an option I/F 88 to communication bus 76. Unit 87 is used to provide local and current-loop communications by methods known in the art, and need not be described in detail here.

The present terminal communicates with an operator by video display means such as a CRT (not shown) which is driven by a controller CRTC 16. The generation of characters with various character attributes will be described in more detail below. Briefly, however, a set of characters is stored in a character ROM 90 connected to CRTC 16 by a character bus 92. The character, along with selected visual "attributes" generated by a video attribute generator VAG 94 are stored in RAM display memory 96, which is connected to CRTC 16 through a register/buffer 98. In the present terminal an "attribute" is defined to mean any of the following in relation to individual characters:

high/normal intensity or background highlight, blinking, underline, reverse video, double high characters, non-display double wide characters, and double high/wide characters. VAG 94 is connected to CRTC 16 and to display memory 96 by an attribute bus 100, and to CRTC 16 only through a control bus 102. The display memory 96 is expandable by additional RAMS 104 connected as shown in FIG. 1*a*. Additional characters may be generated by including a character generator RAM 106 connected to character bus 92 and to VAG 94 through a dot bus 107. The CRT intensity is controlled by programmable contrast register 38 through a video amplifier 108, which is also connected to VAG 94.

SYSTEM MEMORY MAP AND ARCHITECTURE

Figure 2:
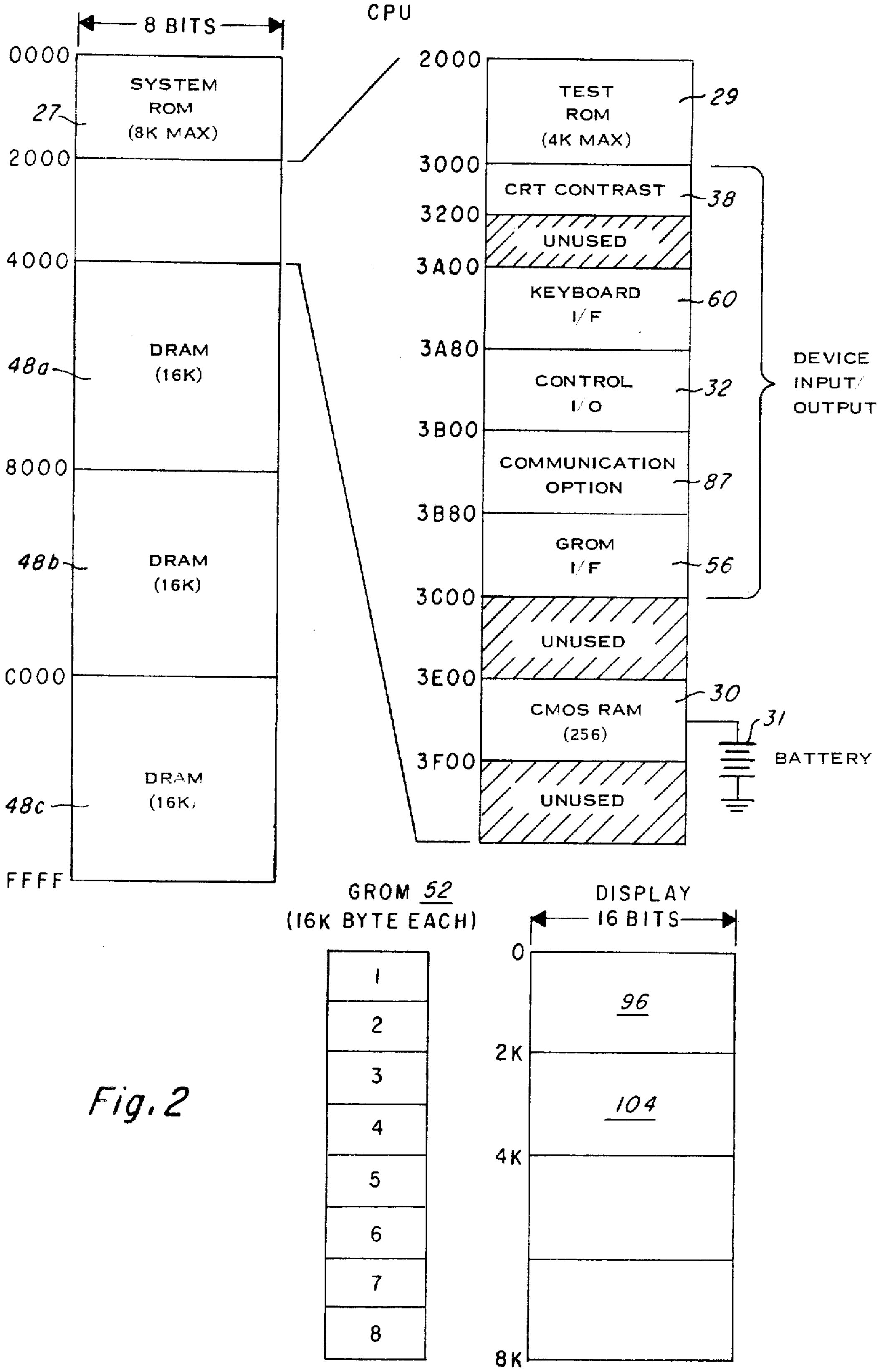
FIG. 2 is a system memory map.

Referring now to FIG. 2, there is shown a memory map of the present system illustrating the assigned memory locations of the various memory devices in hexadecimal form. In the basic configuration the CPU operating system memory is formed of 32K 8-bit bytes in memory locations 0000-7FFF, and is expandable to 64K bytes in memory locations 8000-FFFF by the addition of DRAMs 48*b* and 48*c*.

Memory locations 0000-1FFF are assigned to system ROM 27, which contains 2K bytes (expandable to 8K) of program instructions to control the system initialization and diagnostics on power up, as well as instructions for loading DRAM 48*a* from the program storage memory resident in the GROMs. DRAM 48*a* is used by CPU 10 for execution of instructions to control the terminal.

Locations 2000-3000 are assigned to test ROM 29 (4K byte maximum) which is used primarily during manufacture for test and diagnostic aids such as signature analysis.

Address 3000 is a write-only memory location that stores data in contrast register 38 to control the intensity level of the CRT as set by the operator. The attributes video on/off, background select, and highlight select are also controlled by register 38.

A read at memory location 3A00 inputs the data sent by keyboard 58 and resets its associated interrupt. A write to this location sends data to the keyboard for processing.

Read and write commands to memory locations 3A8-0–3A87 communicate the terminal configuration from control I/O 32 to CPU 10, that is, which of the basic and expandable devices are installed, as well as configuring the operational mode of the various communication devices as selected by the operator. Location 3B00 is reserved for communication option unit 87, which functions as described above.

Location 3E00–3EFF are assigned to the 256 byte CMOS RAM 30, which is powered by a battery 31 to preserve its contents during power off conditions. CMOS RAM 30 stores terminal configuration information such as communications baud rates so that the terminal can readily communicate with the host computer when power is restored.

Display memory 96, which stores characters and associated attributes for display on the CRT screen, is accessed through CRT controller 16 as an I/O device.

Display memory 96 contains 2K 16-bit bytes and is expandable to 8K in 2K increments.

The GROM storage memory is accessed by addressing the GROM I/F 56 at memory location 3B80. A read from this location inputs 4 bits of data from the selected GROM, and a write to this memory location outputs address and control information for accessing the GROM. In the basic terminal configuration three 16K byte GROMs, 52-1, 52-2, and 52-3, form a 48K byte program storage memory. This is expandable to a total of 128K bytes in 16K increments by the addition of GROMs 52-4 to 52-8. Dashed line 110 in FIG. 1 denotes the expanded portions of the operating and program storage memory. Basically, a GROM is a PMOS, metal gate read-only memory that provides low cost mass data storage. In the present terminal, program instructions are down-loaded from the GROM to the DRAM operating system memory as needed for execution by CPU 10. In this manner, a 16K DRAM can be used for execution of 48K of program instruction. A similar method of overlaying program instructions into the DRAM is described in a co-pending patent application Ser. No. 191,892 by Skelton, et al entitled "Virtual Memory Microcomputer Architecture."

Figure 3:
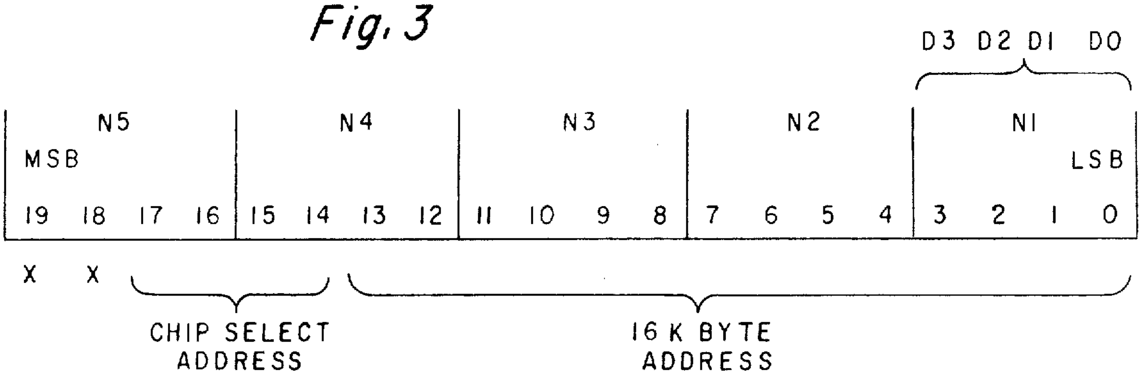
FIG. 3 is a diagram of the bit structure of an address byte used to access the system mass read-only program storage memory.
Figure 4:
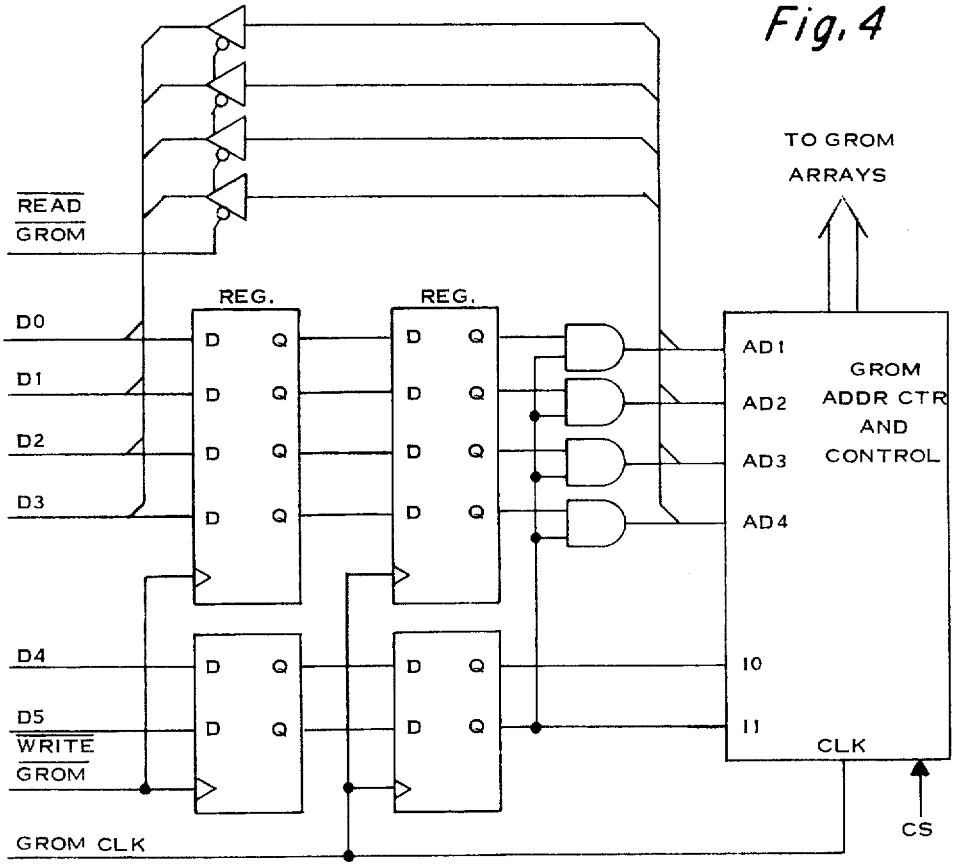
FIGS. 4 and 5 are block diagrams of the GROM interface unit.
Figure 5:
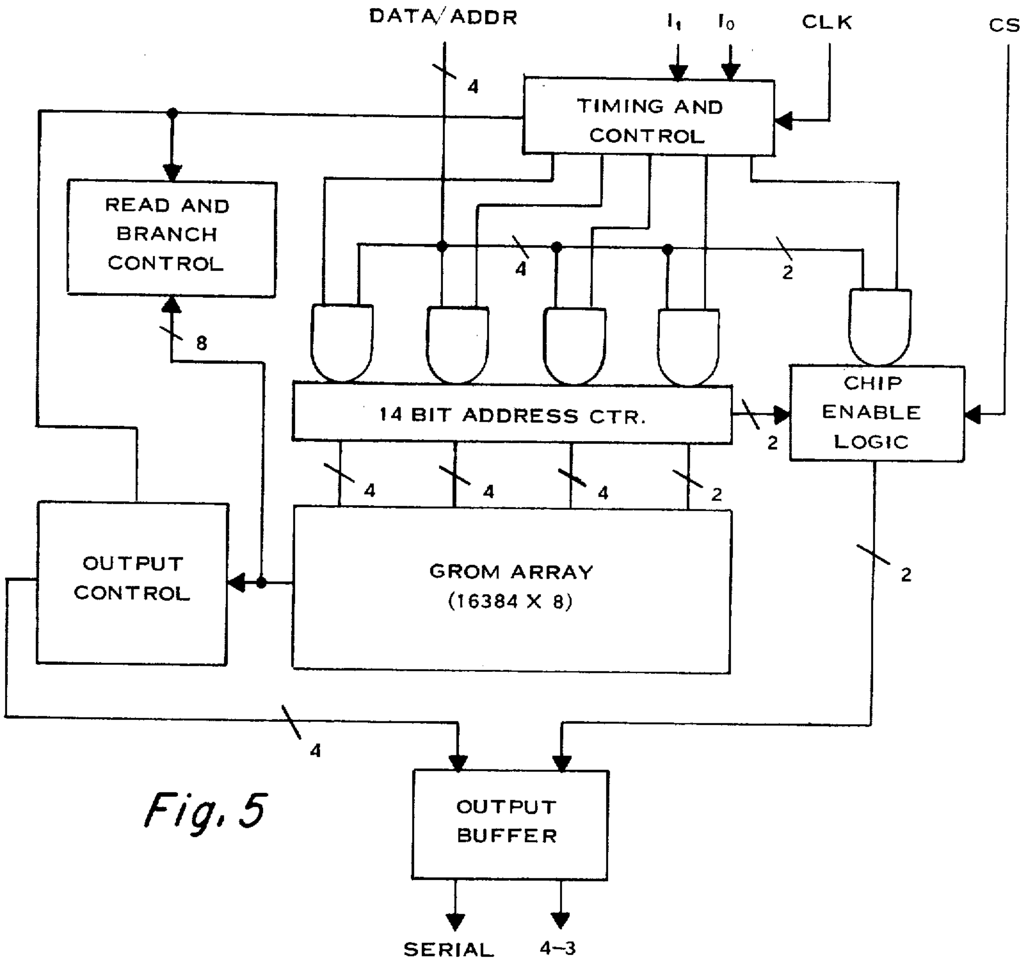

Referring now to FIGS. 3–5, the GROM accessing procedure is shown in greater detail. FIG. 3 shows the bit structure of a 20-bit byte used to access the GROM. The byte is loaded into GROM I/F 56 in 4-bit blocks or "nibbles" N1–N5. Bits 0–13 are used to select any one of 16K byte addresses in a particular GROM, while bits 14–17 are used to select one of up to eight GROMS. One embodiment of the GROM I/F is shown in FIGS. 4 and 5, illustrating circuitry for accessing a 16K byte GROM through a 4 bit data/address line D0–D3.

DISPLAY CONTROL SYSTEM

The display control system of the present terminal is formed of CRT controller 16, video attribute generator 94, display memory 96, character ROM 90, contrast register 38 and the associated circuitry and expandable memories 104 and 106. Briefly, CRTC 16 provides horizontal and vertical timing for the CRT, addresses display memory 96 for CRT refresh, provides the scan line addresses for character ROM 90 and character generator 106, controls the cursor on the CRT, controls data transfers between CPU 10 and display memory 96 or character generator 106, and controls video attribute generator VAG 94. VAG 94 converts parallel dot data into serial video data, modifies dot data according to attributes and control inputs, generates a character clock from a video dot clock, and provides a data path for character generator access. The CRT is configured to display information in a 25 row by 80 or 132 column format, with the line 25 reserved for terminal status messages. Each character cell defined by a row/column address is 9×11 dots or pixels, with a character size of 7×9 pixels.

The present terminal, as configured by either the operator or the host computer, allows for dividing the display memory into partitions. Each partition is called an editing boundary. The partition is defined in terms of rows of display, each row having 80 or 132 columns of display information. Additionally, the editing boundary may be defined to be a form containing formatted or unformatted regions. An unformatted display contains no fields, but may contain display attributes on a character-by-character basis. The formatted display contains at least one field and may contain display attributes on a character-by-character basis.

If more than one editing boundary is resident in the terminal, the length of each editing boundary must be equal to or greater than 24 rows of display information. That is, if 12 rows of double high/wide characters are used, then the 12 rows of double high/wide characters are 24 rows of display information.

A formatted editing boundary consists of "regions." A region is defined as a consecutive number of display rows viewed by the operator. The maximum number of consecutive rows possible for a region is 24 and the minimum is 1. However, the region data may exceed the display rows allocated for the defined region. This is called a scrolled region. Additionally, a region is defined as a full partition, left partition, or right partition. A full partition region is a region displayed to the operator using all columns possible in the CRT display. A left partition region is a region displayed to the operator using all columns to the left of the vertical split defined by the form. A right partition is a region displayed to the operator using all columns from and including the vertical split to the right defined by the FORM. If a region is defined as display only, with no operator access to the region, an entire region may be defined as a "protected region." A protected region is always guarded for transmission. A vertical split may exist in any column, however, only one vertical split is used in the disclosed embodiment for any one form. A vertical split is a selected column 1–80 or 1–132 which defines the starting column of any right partition region.

Each region is a "window." A window which shows all the data in the display at once is called a fixed region or a non-scrollable region. A window that shows only a part or a segment of the data assigned to the window is called a scrolled region. Every editing boundary contains at least one window. The window may consist of all of the editing boundary which in turn may consist of all terminal memory, but the window still exists. Each region can be individually scrolled either discreetly or smoothly. Thus, in effect, each region can function as an independent display.

These and other features are obtained by means of a "data-linking" procedure whereby two "line attributes" are generated and stored in display memory 96 for each row of characters and character attributes on the CRT screen. A line attribute is a byte of data which functions as a pointer, telling CRT controller 16 at which display memory location the first character in the next row of characters appears. In the case of a vertical split region, wherein a full partition region is followed by a left and a right partition region on the display, the last character of the last row of the full partition region will be followed in display memory by a right attribute (RA) and a left attribute (LA). The LA points to the display memory location of the first character in the first row in the left partition, and the RA points to the memory location of the first character in the first row of the right partition. In this manner, various display functions such as inserting/deleting lines and scrolling are achieved by merely modifying the pointers RA and LA to indicate the memory location of the next desired row of characters. This greatly increases the processing throughput of CPU 10 because only the affected pointers need to be modified, without rearranging character and character attribute data in the display memory.

By way of example, and to aid in the understanding of the form and region concept described above, reference is made to FIG. 6 wherein the display screen as seen by an operator is partitioned into four regions. It is assumed for this example that the terminal has been configured by the host computer to define two editing boundaries or forms. The form descriptors as well as region data tables (RDT) are loaded into the terminal memory or DRAM. Form descriptor 2 contains the information for configuring the display screen as shown in the drawing, that is, there is a vertical split at column 40 of the display screen and the form starts at display memory location 10 and ends at display memory location 50. As shown in the display memory map each of the four regions is a scrollable region, that is, the number of rows in each region exceeds the available "window" for display. Since the terminal in this example is configured to have a two page display memory, there are 48 lines of information available for the region definitions, although only 24 lines may be displayed at one time. Form 2 has four associated region data tables (RDT), one for each region on the display screen. Each RDT contains 8 bytes of information. Byte 0 is a predetermined region number, for example, to indicate whether a left or a right partition region will be displayed on the screen. Byte 1 indicates the starting row on the display screen for the associated region. Byte 2 is the current memory display starting row, that is, the display memory address of the currently displayed row. Byte 3 indicates the memory starting row number in the region, and byte 4 is the display ending row. Byte 5 is the current memory display ending row, byte 6 is the region memory ending row number in display memory, and byte 7 is the maximum relative column number for the region on the display screen. For example, referring to the RDT for region 1 in FIG. 6, region 1 character and character attribute data are stored in display memory locations 10–24. The currently displayed information from region 1 on the display screen, however, is formed of 8 lines that are stored in display memory locations 12–19, and appear on the display screen rows 0–7. That is, memory locations 12–19 comprise the "window" of region 1 that is currently displayed. Since region 2 is a right partition split region occupying the same display screen rows as region 1, the display window for region 2 is the same size as the window for region 1. It should be noted that 48 rows of display memory have been used for form 2, although only 24 rows of information appear on the display screen at a time. Regions 3 and 4 are similarly defined by their associated RDTs.

Figure 6:
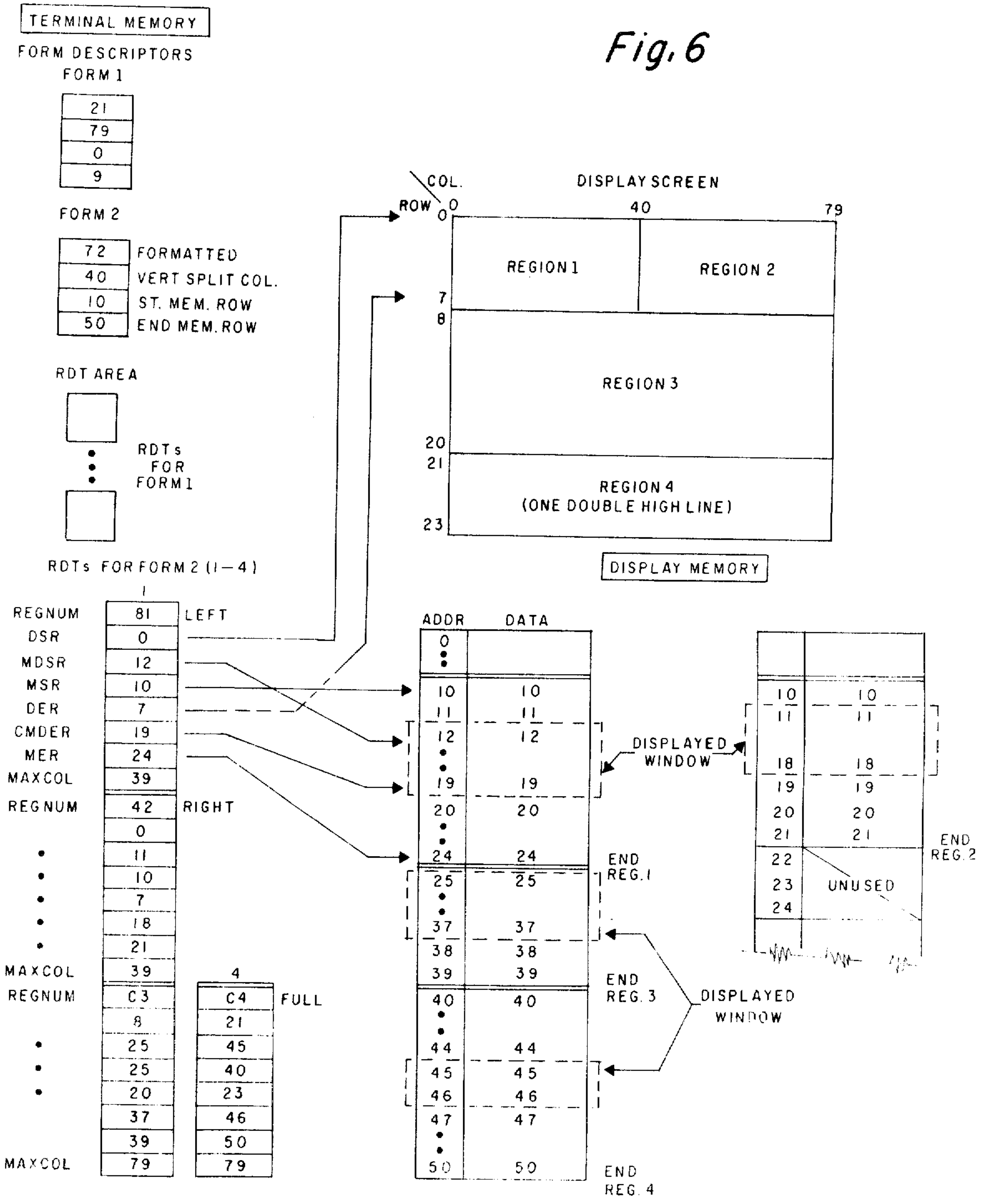
FIG. 6 is a pictorial representation showing the use of form descriptors and region data tables in establishing a display screen format.

Although in FIG. 6 the rows of information in display memory corresponding to the rows on the display screen are shown in sequential order, they may in fact be located at any display memory location. The RA and LA pointers associated with each row of screen information, as described above, will map the location of the next characters in display memory to be displayed on the screen.

Figure 7:
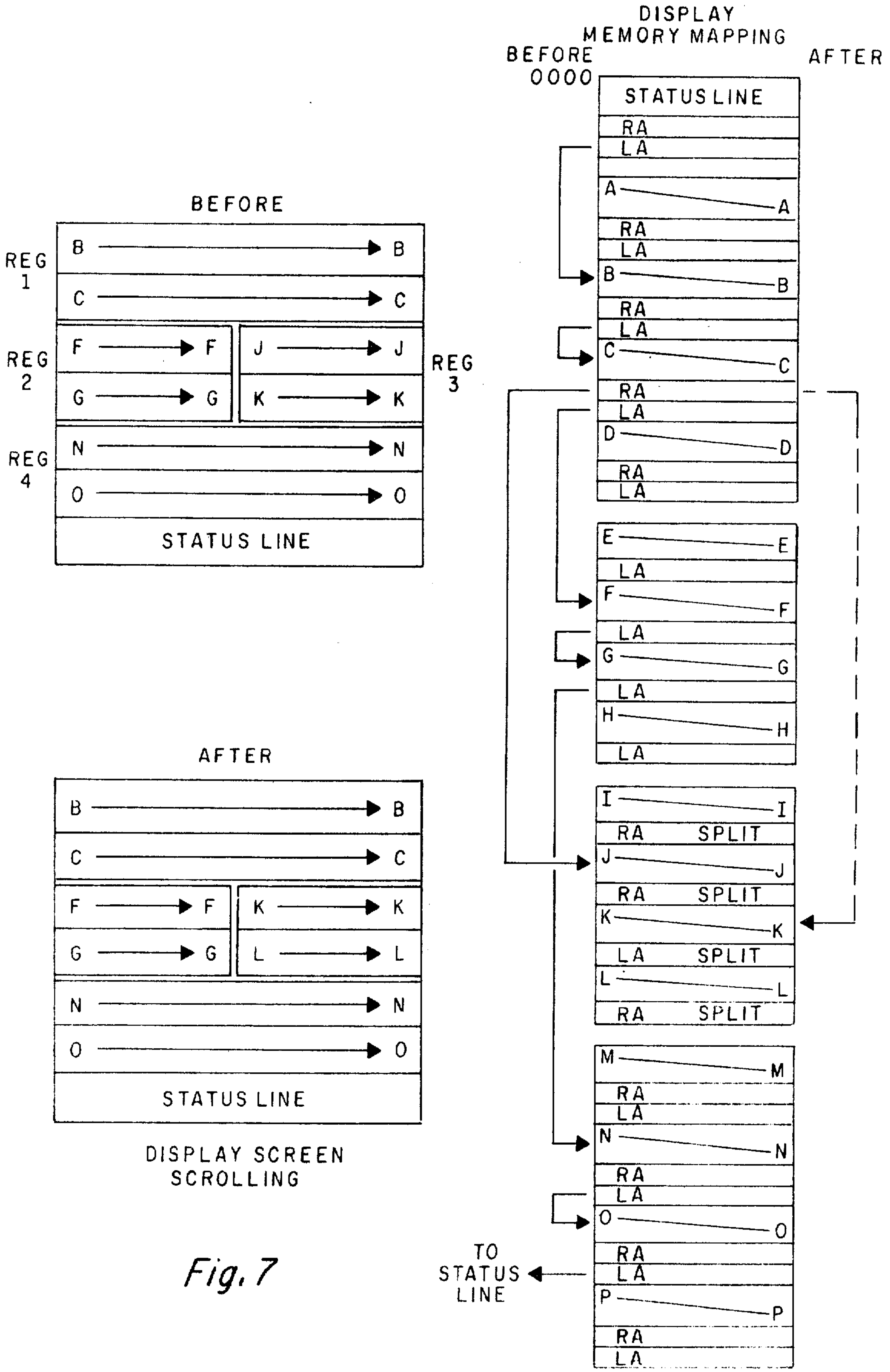
FIG. 7 shows the use of display memory mapping to scroll a selected region on a display screen segmented into a plurality of regions.

Referring now to FIG. 7, the use of these pointers in scrolling an individual region on the display screen will now be described by way of example. The display screen is shown divided into four regions, with the letters in each region indicating the first and last rows of characters in that particular region, for example, line B in region 1 is the first row of characters and line C represents the last row of characters in region 1. Similarly, line J represents the first row of characters in region 3 while line K represents the last row of characters. The "after" view of the display screen show region 3 scrolled up one row of characters, that is, row K is now the first displayed row of characters and row L is the last displayed row. Also shown in FIG. 7 is a map of the RA and LA pointers showing the action of the pointers both before and after the scroll function has been completed. Before scrolling is initiated pointer LA of the status line points to row B in region 1 and pointer LA of row B points to row C. Since region 2 is a left partition split region, pointer LA of row C points to row F in region 2, while pointer RA of row C points to row J in right partition region 3. Pointer LA of row G in region 2 points to row N in region 4. Because region 3 is a right partition region, only the associated RA pointers are used to indicate the next successive row in that region. Region 3 is scrolled up by one row merely by changing pointer RA in row C of region 1 so that it points to row K in region 3 instead of row J. Thus, scrolling and other editing functions are achieved by changing the pointers only, rather than rearranging whole blocks of data in display memory as was done in prior art systems. Further, the use of controller 16 and its associated circuitry to assign and modify the various pointers greatly reduces the processing time required to perform these functions and, since CRTC 16 operates asynchronously with CPU 10, the processing load on CPU 10 is reduced.

Smooth scrolling, i.e., the scrolling of a line one pixel or scan line at a time, may be performed independently in any of the vertical or horizontal split regions under the control of CRTC 16, which will now be described in greater detail.

DISPLAY CONTROLLER

In one embodiment, display controller CRTC 16 is a single integrated circuit device, which generates timing signals for a standard or a nonstandard raster-scan CRT monitor incorporating a non-interlaced format. CRTC 16 controls the horizontal and vertical display formatting, the independent display refresh memory 96, and the cursor address. Internal character and attribute data registers sychronize attribute and character data allowing controlled transfers between CPU 10 and display memory 96 or video attribute generator 94. As described above, controller 16 and its associated circuitry provide smooth scrolling and split screen capabilities as well as determining the number of characters per row, the number of scan lines per row, and the number of rows per display frame. In conjunction with VAG 94, the various character attribute features are also provided.

Figure 8A:
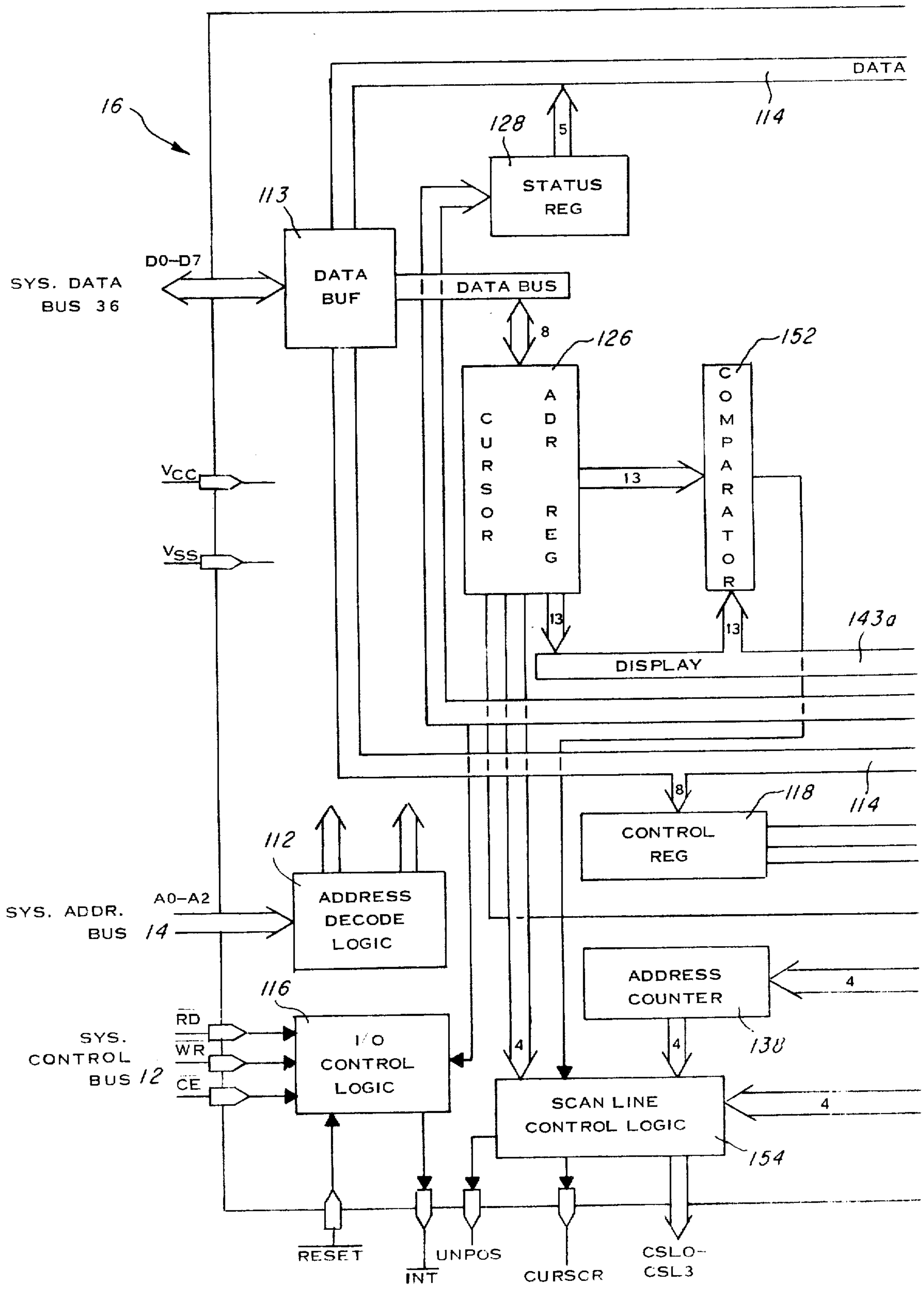
FIGS. 8*a*–8*c* form a block diagram of the display controller.
Figure 8B:
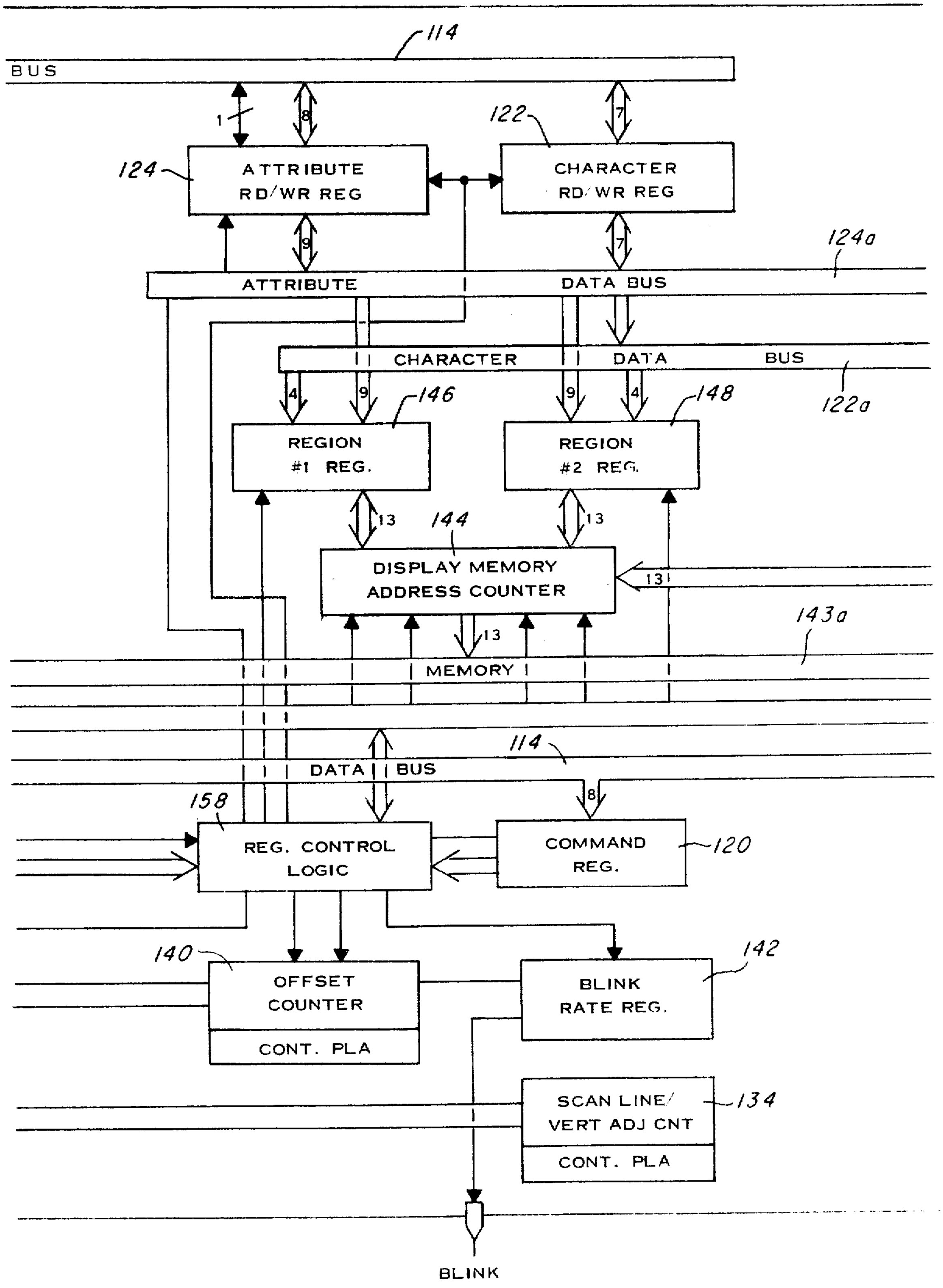
Figure 8C:
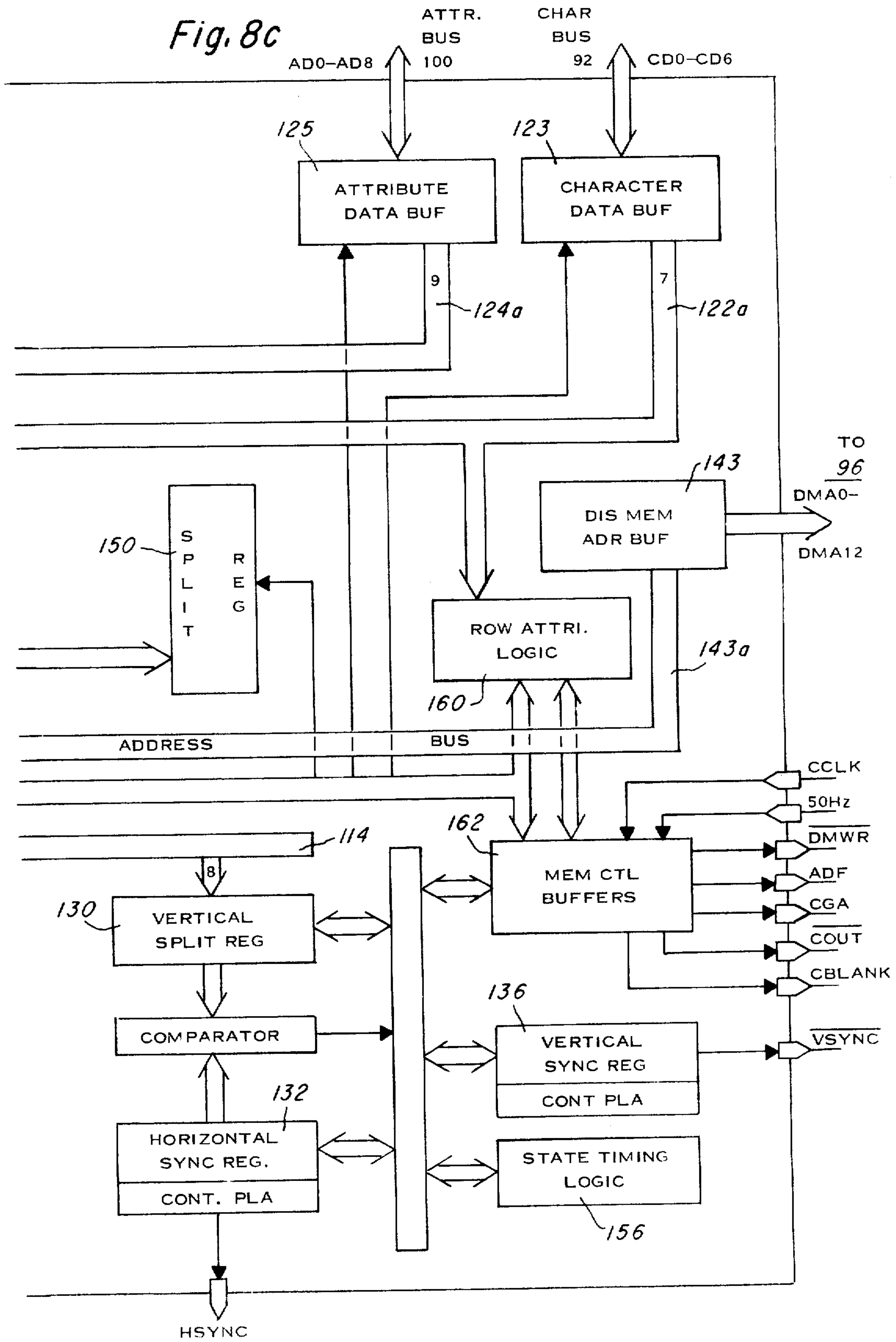

Referring now to FIGS. 8a-8c, CRTC 16 is shown in block diagram form. Controller 16 interfaces with CPU 10 through system address bus 14 (select lines A0–A2), system data bus 36 (data lines D0–D7), and system control bus 12 (RD/, WR/, and CE/). Lines A0–A2 are connected to an address decode logic circuit 112. Lines D0–D7 are connected to a data buffer 113 which is in turn connected to an internal data bus 114. The signal lines from control bus 12 are connected to an I/O control logic circuit 116. Address decoder 112 controls the various internal registers connected to data bus 114 by decoding the three address inputs together with the I/O control logic 116 outputs. Tables 1 and 2 below list the write and read assignments for the three select lines, A0–A2. I/O control 116 gates the control signals from CPU 10 and controls data buffer 113 and the bus precharge.

TABLE 1

| SELECT LINE (A0-A2) WRITE ASSIGNMENTS | | | | | |
|---|---|---|---|---|---|
| $\overline{CE}$ | $\overline{WR}$ | A2 | A1 | A0 | REGISTER LOADED |
| 1 | X | X | X | X | Address decoding inhibited |
| 0 | 0 | 0 | 0 | 0 | Control Reg. |
| 0 | 0 | 0 | 0 | 1 | Command Reg. |
| 0 | 0 | 0 | 1 | 0 | Character Data Reg. |
| 0 | 0 | 0 | 1 | 1 | Attribute Data Reg. |
| 0 | 0 | 1 | 0 | 0 | Cursor Address Reg. (Upper 6 bits) |
| 0 | 0 | 1 | 0 | 1 | Cursor Address Reg. (Lower 8 bits) |
| 0 | 0 | 1 | 1 | 0 | Vertical Split Reg. |
| 0 | 0 | 1 | 1 | 1 | Not used |

TABLE 2

| SELECT LINES (A0-A2) READ ASSIGNMENTS | | | | | |
|---|---|---|---|---|---|
| $\overline{CE}$ | $\overline{RD}$ | A2 | A1 | A0 | REGISTER READ |
| 1 | X | X | X | X | Address decoding inhibited |
| 0 | 0 | 0 | 0 | 0 | Status Reg. |
| 0 | 0 | 0 | 0 | 1 | Not used |
| 0 | 0 | 0 | 1 | 0 | Character Data Reg. |
| 0 | 0 | 0 | 1 | 1 | Attribute Data Reg. |
| 0 | 0 | 1 | 0 | 0 | Cursor Address Reg. (Upper 5 bits) |
| 0 | 0 | 1 | 0 | 1 | Cursor Address Reg. (Lower 8 bits) |
| 0 | 0 | 1 | 1 | 0 | Not used |
| 0 | 0 | 1 | 1 | 1 | Not used |

TABLE 3

| CONTROL REGISTER BIT ASSIGNMENTS | | |
|---|---|---|
| CONTROL BIT | NAME | DESCRIPTION |
| 7 | | Not used |
| 6 | | Not used |
| 5 | TSTMD | Test mode |
| 4 | COUT | Control out |
| 3 | ENLA | Enable row attributes |
| 2 | CBLINK | Blink cursor |
| 1 | CURON | Enable cursor |
| 0 | DFMS | Select alternate display format |

A control register 118 connected to data bus 114 is a write-only register that contains the control bits listed in Table 3. Bit 0 (DFMS) selects either a standard or an alternate display format. The logical value of bit 0 is output as the ADF signal shown in FIG. 8*c*. Bit 1 (CURON) enables the cursor output. Setting control bit 1 to zero inhibits the cursor output unconditionally. Bit 2 (CBLINK) selects either a blinking or nonblinking cursor. Bit 3 (ENLA) sets the mode of operation for controller 16. Enabling the line attributes allows for a display memory format with row attributes following each row. When disabled, the display format is assumed to be conventional, that is, each row is sequentially followed by the next displayed row with no row attributes present. The logical value of control bit 4 (COUT) appears as signal (COUT/) during a read or write to display memory 96. During active display this signal is inactive (high) and during retrace the signal is active (low). Setting control bit 5 (TSTMD) reduces the display format to 16 characters per row and 2 scan lines per character row. Resetting this bit enables normal device operation. This is primarily used for testing and inspection purposes.

A command register 120 connected to data bus 114 is an eight-bit write-only register which allows CPU 10 to issue display memory read or write commands, scroll commands, or interrupt commands. The register bit assignment is shown in Table 5 wherein an "x" indicates a "don't care" value.

A character register 122 connected to data bus 114 is an eight-bit read/write register used by CPU 10 for transferring data to and from display memory 96. The lower seven bits from register 122 appear on an internal data bus 122*a*.

TABLE 4

| STATUS REGISTER BIT ASSIGNMENTS | | |
|---|---|---|
| STATUS BIT | NAME | DESCRIPTION |
| 7 | | Not used |
| 6 | | Not used |
| 5 | SCRBSY | Scroll busy |
| 4 | RWBSY | Read/write busy |
| 3 | INTP | Interrupt pending |
| 2 | SCRCOM | Scroll complete |
| 1 | RWCOM | Read/write complete |
| 0 | SVBLK | Vertical blank |

TABLE 5

| COMMAND REGISTER BIT ASSIGNMENT | | | | | | | | |
|---|---|---|---|---|---|---|---|---|
| COMMAND REG. BIT | | | | | | | | |
| 7 | 6 | 5 | 4 | 3 | 2 | 1 | 0 | DESCRIPTION |
| | | | | | | | | READ/WRITE COMMAND |
| 0 | 0 | X | 0 | 0 | X | 0 | X | No operation |
| | | | | | | 1 | 0 | Read at cursor address |
| | | | | | | 1 | 1 | Write at cursor address |
| 0 | 0 | X | 0 | 1 | 0 | 1 | 0 | Read and post-decrement at cursor address |
| | | | | 1 | 1 | 1 | 0 | Read and post-increment at cursor address |
| | | | | 1 | 0 | 1 | 1 | Write and post-decrement at cursor address |
| | | | | 1 | 1 | 1 | 1 | Write and post-increment at cursor address |
| 0 | 0 | X | 0 | 1 | 0 | 0 | X | Enable post-decrement at cursor address |
| | | | | 1 | 1 | 0 | X | Enable post-increment at cursor address |
| 0 | 0 | X | 1 | 0 | X | 0 | X | Post increment/decrement at cursor address |
| | | | | | | | | SCROLL COMMAND |
| 0 | 1 | X | X | X | | | 0 | Scroll up |
| | | | | | | | 1 | Scroll down |
| | | | | | | 0 | | Offset counter internal clock mode |
| | | | | | | 1 | | Offset counter external clock mode |
| | | | | | 0 | | | No operation |
| | | | | | 1 | | | Offset counter external increment clock |
| | | | | | | | | INTERRUPT CONTROL COMMAND |
| 1 | 0 | X | | | | | 0 | Disable vertical blank interrupt mask |
| | | | | | | | 1 | Enable vertical blank interrupt mask |
| | | | | | | 0 | | Disable read/write interrupt mask |
| | | | | | | 1 | | Enable read/write interrupt mask |
| | | | | | 0 | | | Disable scroll interrupt mask |

TABLE 5-continued

| COMMAND REGISTER BIT ASSIGNMENT | | | | | | | | |
|---|---|---|---|---|---|---|---|---|
| COMMAND REG. BIT | | | | | | | | |
| 7 | 6 | 5 | 4 | 3 | 2 | 1 | 0 | DESCRIPTION |
| | | | | | 1 | | | Enable scroll interrupt mask |
| | | | | 0 | | | | No operation |
| | | | | 1 | | | | Reset interrupts |
| | | | 0 | | | | | Disable interrupts |
| | | | 1 | | | | | Enable interrupts |
| 1 | 1 | X | X | X | X | X | X | No operation |

Bus 122*a* is connected to a character data buffer 123 which is in turn connected to character data bus 92. An attribute register 124 is a eight-bit read/write register similar to character register 122. Register 124 is connected to an internal attribute data bus 124*a* which is in turn connected to an attribute data buffer 125. The eight attribute bits and the most significant character bit are connected to external attribute bus 100 as shown in FIGS. 1*a* and 1*b*. A cursor address register 126 connected to data bus 114 is a thirteen-bit read/write register containing the absolute display memory address of the displayable cursor. The contents of this register are also the address used for display memory transfers.

A status register 128 connected to data bus 114 is a 6-bit read-only register with a bit assignment as shown in Table 4. Bit 0 (SVBLK) indicates the start of the vertical blanking interval, i.e., the beginning of the status row. Bit 1 (RWCOM) indicates that a read or write operation to display memory 96 has been completed. Bit 2 (SCRCOM) indicates that a smooth scroll operation has been completed. This will occur at the beginning of the status row on the last frame of the scroll. Bit 3 (INTP) indicates that an interrupt condition has occurred. This bit is reset or enabled by means of the command register 120. Bit 4 (RWBSY) is set following a read or a write command from CPU 10, indicating that the desired operation has not been completed. Upon completion of the read/write, this bit is reset. Bit 5 (SCRBSY) is set following a smooth scroll command from CPU 10 and is reset upon receipt of a scroll complete signal.

A vertical split register 130, connected to data bus 114, is an 8-bit write-only register containing the column position of a vertical split and is zero based. That is, if register 130 is loaded with zero, on a split region the left partition would contain one character and the right partition would contain the remaining number of characters that are displayable.

The overall display format is controlled by a series of cascaded free-running counters. Two independent formats are mask programmable, each having two mask programmable formats for providing separate refresh rates. A horizontal sync register 132 is an 8-bit counter that controls horizontal display timing and is incremented at the character rate by a CCLK signal from video attribute generator 94. A programmable logic array (PLA) decodes the current register value and outputs signals corresponding to the total number of displayed characters, the start of horizontal sync, the end of horizontal sync and the end of horizontal retrace which clears the register. The operation of PLA's are known in the art and need not be described in detail. A scan line/vertical adjust counter 134 is a 4-bit counter that is incremented at the end of horizontal retrace, thus counting the number of scan lines per character row. Its count is decoded by means of a PLA and when the total number of scan lines is reached it is cleared and the counter in a vertical sync register 136 is incremented. When the register 136 counter reaches its total number of character rows count, register 134 enters a vertical adjust mode which permits a resolution of the refresh rate to within one scan line. Upon completion of vertical adjust, register 134 is cleared and begins counting scan lines in the upper-most character row.

Vertical sync register 136 as described above counts character rows and is clocked by register 134. Register 136 is a 7-bit counter which is PLA decoded for total displayed character rows, status row position, total character rows (including vertical retrace), and vertical sync position. The vertical sync pulse is set at vertical sync position and reset on the total character rows count.

An address counter 138 is a 4-bit counter that counts character scan lines as does register 136. Register 136 is used for normal characters while address counter 138 is used for double high and smooth scroll characters. Counter 138 tracks register 136 until one of these special character regions are detected. For double high characters counter 138 toggles between increment and inhibit increment states. For the scrolling function, counter 138 is preset with an offset signal from an offset counter 140 and then is incremented as before. Offset counter 140 is a four-bit counter which is incremented every time the status row position is reached, or once every frame. This increases the smooth scrolled offset one pixel (or scan line per region) per display frame. Offset counter 140 is initialized when a smooth scroll command is received from CPU 10 by means of command register 120. This either presets or clears counter 140 based upon the direction of the scroll. A blink rate register 142 is a three stage ripple counter that is clocked by the carry output of the most significant stage of offset counter 140. It is used to establish the cursor blink rate and the blink rate output.

The display memory 96 is addressed by the thirteen bit display memory address (DMA) outputs (DMA0–DMA12), from a buffer 143 connected to an internal DMA bus 143*a*. Associated control signals include write control (DMWR/), select memory or character generator (CGA), and bank select control (COUT). A display memory address counter 144 generates the DMA for active, or visible, display. Counter 144 is connected to bus 143*a* and contains three registers: a region 1 register 146, a region 2 register 148, and a split register 150. Register 146 contains the starting address of a character row and is loaded into the memory address counter 144 at the beginning of every scan line of that particular row. After the last scan line of a row has been displayed, register 146 is updated with the starting address of the next row. This may be done either by: loading memory address counter 144 contents plus 1 into register 146 when scan line attributes are disabled; loading the address following the row attribute in register 146 when the link address is not valid and row attributes are enabled; or, loading the thirteen bit address stored in memory 96 at the row attribute location into register 146, when the link address is valid and row attributes are enabled.

Region 2 register 48 is the equivalent of register 146 for a split region. That is, register 146 contains the starting address for the left region, while register 148 contains the starting address for the right region. Register 148 is loaded from either the memory address counter 144 or from display memory 96 through the internal attribute and character data buses 124*a* and 122*a*.

Split register 150 is loaded from memory address counter 144, for a row falling into two regions, with the display memory address of the row attribute of the left region. During the retrace state times, the address in register 150 is loaded into the display address counter 144 to fetch data at that location. When not on the last scan line of a split row, register 150 contains a refresh address that is loaded into memory address counter 144 following the state time throughout horizontal retrace for the purpose of refreshing dynamic memory devices. When a read or a write to display memory command is given to the controller 16, it is synchronized in command register 120 and decoded. During the actual read or write operation, which occurs during the state time of retrace, the contents of cursor address register 126 are placed onto display memory address bus 143*a*. If the cursor is enabled, the cursor output will be active since a cursor address register comparator 152 always compares the contents of register 126 with what is on the DMA bus 123*a*. In this case it is comparing the register 126 contents with itself.

The character scan line outputs CSL0-3 from a scan line control logic circuit 154 may also be considered to be a part of the display memory address. These outputs indicate which scan line of the character the display memory address corresponds to. The four bits may be either from counter 138, counter 134 or the four least significant bits of the cursor address register 126. The selection between these counters depends upon the type of row being displayed, i.e., normal, smooth scrolled, or double high. The four cursor bits are always selected during the state times and are used in accessing the external character generator RAM 106. A PLA follows a multiplexer in circuit 154 for the purpose of decoding the underline position based on the selection of a standard or an alternate display format.

A state timing logic circuit 156 is a seven bit shift register with recirculation capability. At the beginning of horizontal retrace, a one is shifted into this register and serially propagates through all stages. The outputs of the stages represent state times which are used to control a register control logic circuit 158. All row attribute fetches and display memory reads and writes occur during the state times with the row attribute fetch having priority over the command-oriented memory accesses. The register control logic embodies control of the character 122 and attribute 124 registers with respect to the character 92 and attribute 100 external data buses. Also controlled by logic circuit 158 are the register transfer of memory address counter 144, the command register 120 sychronization and control logic, the precharging of character bus 122*a* and attribute bus 124*a*, and the control of buffers 123 and 125. Following the last displayed character row until the beginning of vertical adjust, the state timer recirculates shifting the "one" from the last stage back to the first, thereby increasing the bandwidth of the processor (CPU 10) access to display memory 96.

A row attribute logic circuit 160 provides an input to the register control logic 158 based upon the row currently being displayed and the row to be displayed next. The outputs of the row attribute logic 160 provide for the following: controlling counter 138 by presetting it with the offset counter 140, by clearing it, or by enabling it to count double high; signalling the register control logic 158 when a left and/or a right row attribute fetch should occur; and determining when register 146 or register 148 should be loaded from the character and attribute buses 122*a*, 124*a*. A set of memory control buffers 162 is connected to row attribute logic 160 and to register control logic 158 in order to buffer the inputs and outputs to display memory 96 and VAG 94.

Table 6 below summarizes the various signals and I/O ports on controller 16. The registers, PLA's and counters described above are known in the art and the electronics circuitry of each need not be described in detail.

TABLE 6

| SIGNATURE | I/0 | DESCRIPTION |
|---|---|---|
| D7 (MSB) | I/0 | D7 through D0 constitutes the data bus. The data bus serves as an input for register contents to the controller and output for buffer/cursor address read data and attribute/character data. |
| D6 | I/0 | |
| D5 | I/0 | |
| D4 | I/0 | |
| D3 | I/0 | |
| D2 | I/0 | |
| D1 | I/0 | |
| D0 (LSB) | I/0 | |
| A2 (MSB) | I | A2 through A0 are select lines, used to select the internal registers of the controller. |
| A1 | I | |
| A0 (LSB) | I | |
| $\overline{RD}$ | I | Read - a negative true signal indicates that the controller should gate data onto the data bus. |
| $\overline{WR}$ | I | Write - a negative true signal indicates that the controller should gate data bus into internal register. |
| $\overline{CE}$ | I | Chip Enable - a negative true signal indicates that the controller is being addressed. |

TABLE 6-continued

| SIGNATURE | I/0 | DESCRIPTION |
|---|---|---|
| $\overline{\text{RESET}}$ | I | Reset - a negative true signal initializes the controller, and is active for 1 μs minimum. |
| $\overline{\text{INT}}$ | 0 | Interrupt - a negative true signal indicates that at lease one of the interrupt conditions has occured. $\overline{\text{INT}}$ is an open drain output. |
| 50HZ | I | 50/60 Hz Control Input - this input indicates to the controller to switch to second set of vertical timing parameters in the current display format. |
| HSYNC | 0 | Horizontal Sync - a positive true signal is used to drive the horizontal deflection circuits of a CRT. |
| $\overline{\text{VSYNC}}$ | 0 | Vertical Sync - a negative true signal is used to drive the vertical deflection circuits of a CRT. |
| CBLANK | 0 | Composite Blanking - a positive true signal is used to blank the video input of a CRT during Horizontal and Vertical Retrace. |
| DMA12 (MSB) | 0 | DMA12 through DMA0 constitutes the Display Memory Address. The controller outputs the address of the Display Memory location which it is currently accessing. |
| DMA11 | 0 | |
| DMA10 | 0 | |
| MDA9 | 0 | |
| DMA8 | 0 | |
| DMA7 | 0 | |
| DMA6 | 0 | |
| DMA5 | 0 | |
| DMA4 | 0 | |
| DMA3 | 0 | |
| DMA2 | 0 | |
| DMA1 | 0 | |
| DMA0 (LSB) | 0 | |
| VCC 1 | I | Supply Voltage (+5V NOM). |
| VCC 2 | I | Supply Voltage (+5V NOM). |
| VSS | I | Ground Reference Voltage. |
| CD6 (MSB) | I/0 | CD6 through CD0 constitutes the character data bus. This data bus defines the character the controller stores or reads from the Display Memory. |
| CD5 | I/0 | |
| CD4 | I/0 | |
| CD3 | I/0 | |
| CD2 | I/0 | |
| CD1 | I/0 | |
| CD0 (LSB) | I/0 | |
| AD8 (MSB) | I/0 | AD8 through AD0 constitutes the Attribute Data Bus. This data bus defines the Visual Attributes the controller stores or reads from the Display/Memory. |
| AD7 | I/0 | |
| AD6 | I/0 | |
| AD5 | I/0 | |
| AD4 | I/0 | |
| AD3 | I/0 | |
| AD2 | I/0 | |
| AD1 | I/0 | |
| AD0 (LSB) | I/0 | |
| CCLK | I | Character Clock - this establishes the basic character clock rate and is used to synchronize the controller internal timing. |
| CSL3 (MSB) | 0 | Character Scan Line - CSL3 through CSL0 indicate the binary number of the scan line for the character to be displayed. |
| CSL2 | 0 | |
| CSL1 | 0 | |
| CSL0 (LSB) | 0 | |
| CURSOR | 0 | Cursor - a positive true signal indicating the location in the Display Memory defined to have the cursor. |
| UNPOS | 0 | Underline Position - a positive true signal indicates that the underline attribute should be displayed if applicable. |
| BLINK | 0 | Blink rate - this signal determines the rate at which characters should be blinked when applicable. |
| $\overline{\text{DMWR}}$ | 0 | Write Display Memory - A negative true signal indicates that the data gated onto the character and attribute data bus will be stored in the Display Memory at the address provided by the Display Memory Address Bus. |
| CGA | 0 | Character Generator Access - a positive true signal indicates that the controller is accessing the Character Generator Circuitry |

TABLE 6-continued

| SIGNATURE | I/0 | DESCRIPTION |
|---|---|---|
| | | instead of the Display Memory. |
| ADF | 0 | Alternate Display Format - a positive true signal indicates that the controller has been configured to operate in the Alternate Display Format instead of the standard format. |
| $\overline{COUT}$ | 0 | Control Output - this output signal is the inverse of Bit 6 of the Control Register of the controller. |

KEYBOARD AND KEYBOARD INTERFACE UNIT

Keyboard unit 58 is self-contained, with its own microcomputer 64, for scanning and decoding the keys, assigning various function thereto and transmitting and receiving data and instructions serially via I/F 60 to CPU 10. Various character formats are selectable, e. g., for different countries as stored in character RAM 106. The advantages of a separate keyboard unit include a reduced processing load on CPU 10 and thus a faster throughput.

Figure 9:
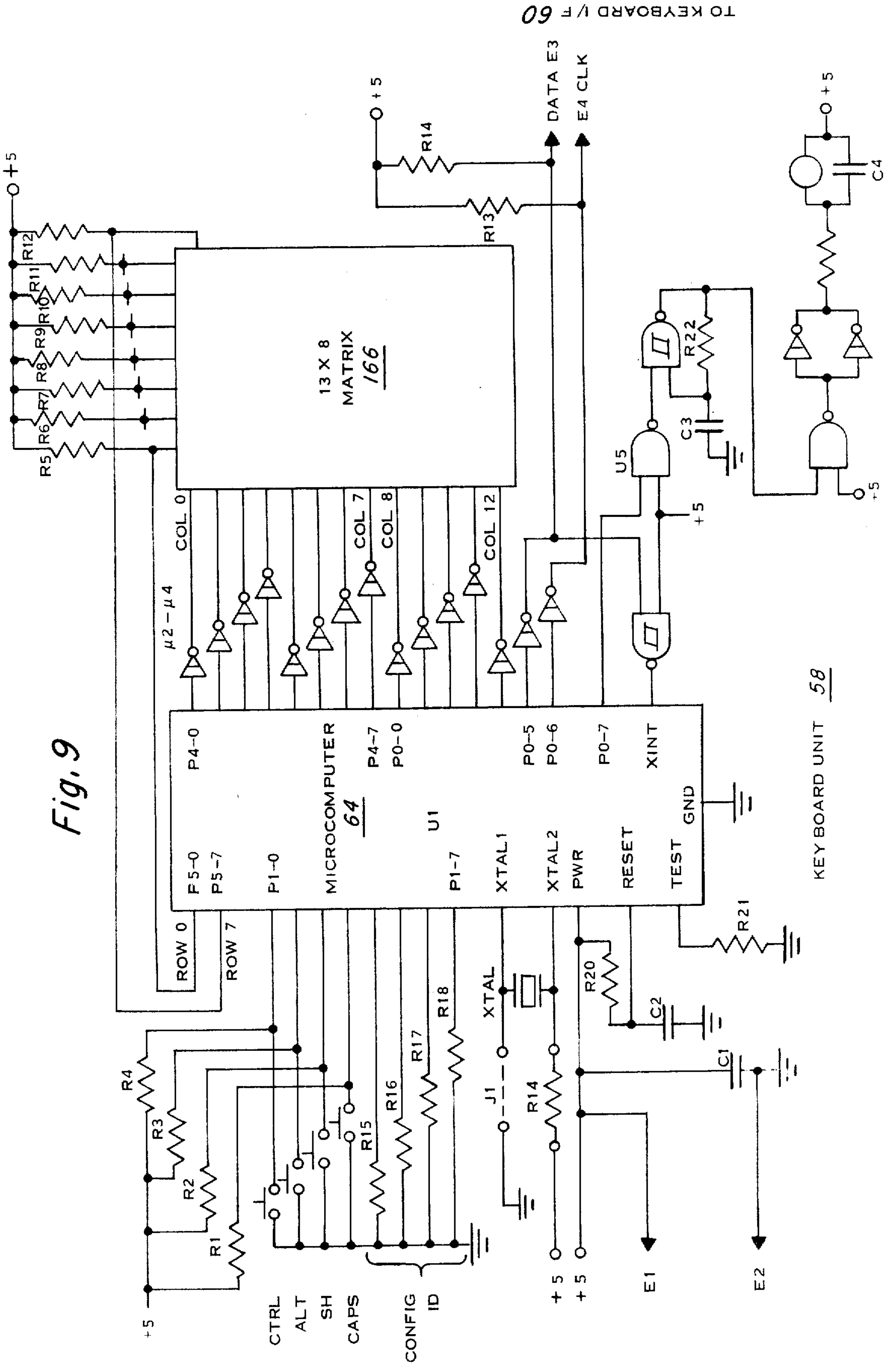
FIG. 9 is a schematic diagram of the self-contained keyboard unit.

Referring now to FIG. 9, keyboard unit 58 includes an array or matrix 166 of momentarily-closed single action switches arranged in rows and columns. Microcomputer 64, for example, a model 3870 available from MOSTEK Corporation and from Motorola, Inc., includes internal ROM and RAM. Input/output ports, P0 and P4 are connected to a series of open collector buffers U2-U4, used for strobing matrix 166. A feedback return is produced via a row path into port P5 of U1. Four control keys, shown in the left hand portion of FIG. 9, are connected to U1 through input port P1. Bits 5 and 6 of port P0 are connected to a bidirectional data line E3 and a clock line E4 which are connected in turn to keyboard I/F 60 for serial transmission of signals thereto and therefrom. Lines E1 and E2 provide power and ground connections for keyboard unit 58. The four logic gates denoted as U5 in FIG. 9 form a bell or tone circuit that is controlled by microcomputer 64 upon commands from CPU 10 and from internal error codes.

Figure 10:
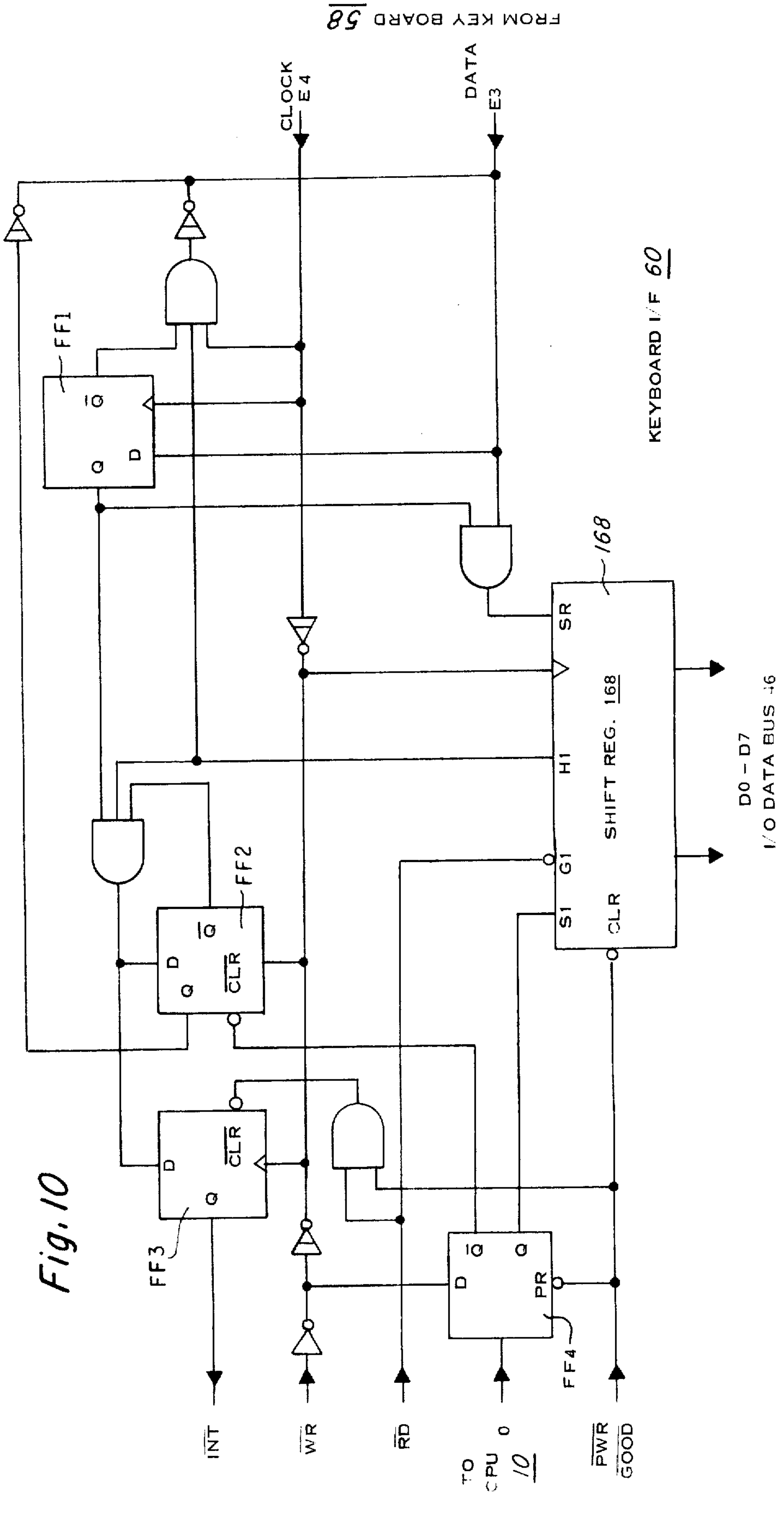
FIG. 10 is a schematic diagram of the keyboard interface unit.

Referring now to FIG. 10, I/F 60 converts serialized data from keyboard data 58 to a parallel form in a tristate output shift register 168 for output onto I/O data bus 46. Flip-flop circuits FF1-FF4 control the data transfer to shift register 168. FF1 determines whether I/F 60 is in a read or a write mode and controls the data path. FF2 signals microcomputer 64 that CPU 10 is still processing data and is not ready to read. FF3 sends an interrupt signal to CPU 10 to indicate that the data in register 168 is available for reading, and FF4 establishes a time-delay to stabilize the data transfer into register 168 from the I/O data bus 46. The signals that appear on the left hand portion of FIG. 10 are from CPU 10. This arrangement reduces the processing load on CPU 10 while expanding the versatility of keyboard unit 58.

Figure 10A:
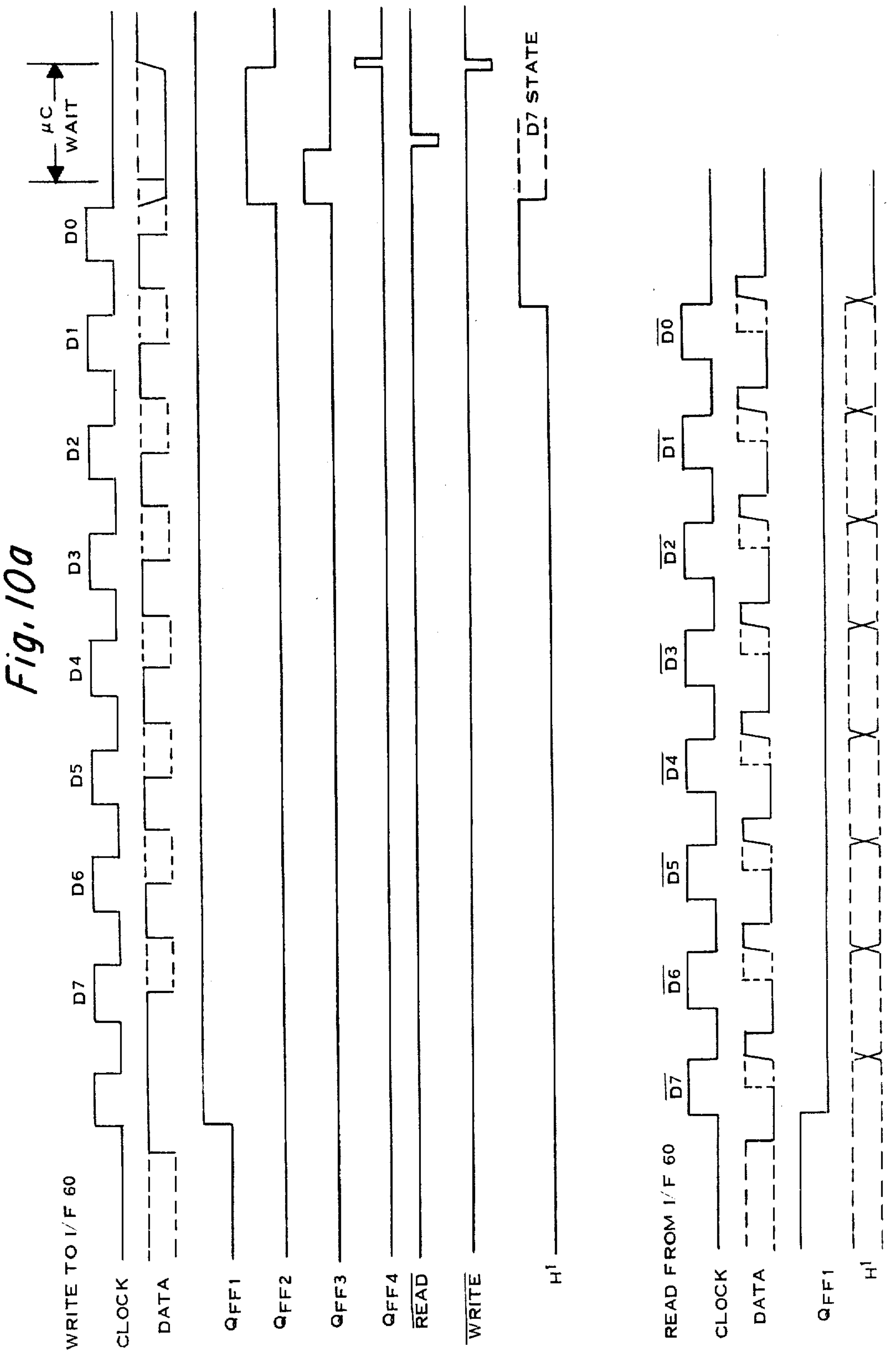
FIG. 10*a* is a timing diagram showing the relationship of the signals in the keyboard interface unit.

FIG. 10*a* is a timing diagram showing the relationship of various signals in I/F 60 to the clock and data signals. The clock signal is generated by microcomputer 64, and the serial data in the read and the write modes is bidirectional.

PREFERRED MODE OF OPERATION

Appendix A forms a map, in hexadecimal code, of the contents of the GROM program storage memory 52. These data are instructions that cause the present system to operate in a prescribed way. The instructions include device service systems, application programs, protocols, command processors and the like. Such instruction lists are known for causing perpherial devices to operate in a desired manner. These instructions are sent to the DRAM memory 48 via system microprocessor CPU 10 shown in FIGS. 1*a* and 1*b*. Similarly, appendix B forms a map of the contents of CMOS RAM 30 which, when connected to battery 31, provides non-volatile terminal configuration information which is used by the system after a power off condition. Appendix C forms a map of the contents of system ROM 27, which contains the system initialization instructions.

The program instructions stored in memories 27, 30, and 52 were written specifically for a Zilog Corporation Model Z-80 microprocessor (CPU 10). However, similar microprocessors will work equally as well in the disclosed system. CTC 18, DART 20 and SIO 22 are also available from the Zilog Corporation and are compatible with the present system. Upon power up, CPU 10 first initiates self-tests on each of the ROM memories. Then the operating system DRAM 48 is loaded in a predetermined sequence from the GROM 52. The system is then ready to either accept a message from the host computer or to perform a task under local operator control.

Thus, there is provided by the present invention an electronic data system including means for segmenting a display screen into a plurality of independently controllable vertically and horizontally split regions. Smooth or discrete scrolling operations may be performed in any selected horizontal or vertical split region. The display controller system, which operates asychronously with the system microprocessor provides access to the display memory character ROM and character RAM as input/output devices rather than as directly connected memory. The display controller accesses and modifies data in display memory by means of line attributes or pointers associated with each row of characters therein. This system permits data to be rearranged in display memory and on the display screen on an individual region basis without the transfer of whole blocks of data, which is required in systems using software for display control.

Other embodiments and modifications of the present invention will readily come to those of ordinary skill in the art having the benefit of the teachings presented in the foregoing description and drawings. It is therefore to be understood that this invention is not to be limited thereto and that said modification and embodiments are intended to be included within the scope of the appended claims.

GROM

APPENDIX A
GROM

$$
$$
:10410000073860A4632D81DE66DE66DE669E650686
:104110008906810000000000000000000000008F
:104120000000000000000000000000000000008F
:104130000000000000000000000000000000007F
:10414000000000000000000029901810191019901 25
:104150008902810289029 12D891F8187650D81075E
:104160008107893281 0E811260256013812881 28A0
:10417000992 8A11981796 4CE64FE63A4630C81003F
:1041800000178138652889289118812981 3F612588
:10419000812681238124814561000000000000000 8
:1041A000002C811C811C890A81158916811581 16B4
:1041B0008900000000D65A464279127991D811DC9
:1041C000892781278900000000000000001 2811E5D
:1041D000811E892989299112892D992D8927B12E2E
:1041E0008900002E8103810000058115610589 1E6B
:1041F00061000009810000068014812281218111 63
:10420000812E9122892081208927A12291108 1105D
:104210008910910F811E9907901EA930812F810767
:10422000A01E911EB11EB92DA113802DA913883295
:104230008939811180118834890889198 92D91085B
:1042400081199131893181 0B813B893481358932E2
:104250009 12A892B891EC11EA11189368 10A8022CB
:10426000993881 22A138893A913A813A8933813348
:104270008933910730078807980 7A807B003800350
:10428000880480058 03A9927A92DB1148900000 07F
:104290000002A81088009800988 09902B81378100D4
:1042A000000888089008983B813C813C8910803E3A
:1042B000813E893F813F8935810F803D811580148 2
:1042C000804081418107B8048104890491049904E4
:1042D000A131912689 1A811B81258912800B8021A9
:1042E00089329 91D911D99000000000000000000016
:0542F0000000000000C9
:0542F70000000017749 01
:0242FE000000BE
:06430800604B6E4B7C4B84
:01432F000786
:0543F6000000B24B00C5
:1044A100F3FDE5E5F521A54B34FBD5DDE57EFE0108
:1044B1002007ED73A34B31544EFD360100FD7E0004
:1044C10021C944CDC400EBE94850DB440051DB4431
:1044D100DB44A04FDB44EC4E544FFD3601FFCD458C
:1044E1005021A54B7EFE012004ED7BA34BF335DD6E
:0F44F100E1D1F1E1FDE1FBC9F3AF32A54BFBC90E
:10496F00714920500080000000017001740171CED
:10497F007D1C7D0000FFFF000000170017401 71C73
:08498F007D1C7D4F00FFFF00BD
:1049B500000000000000001B5900001B58000000000B
:0749C50000001B001B340081
:0449D0001C7D00004A
:014A8B00002A
:104B6000FA743275CD75C5761779C979347A000033
:0D4B7000000000000000000000000000000038
:104B9B000009B4B0000000000000000000000000024
:104BAB000400000000924C0000C24BD44BE64BF8C3
:104BBB004B0A4C1C4CC44B0000D64B2E4D00000333
:104BCB0001100000000000C9760000E84B124D00F8

```
:104BDB0000030200000000000000000000FA4B4A36
:104BEB004D0000030310000000000002F7800000CA4
:104BFB004C6E4D0000030410000000000BE7B0053
:104C0B00001E4C804D0000030500000000000000005A
:104C1B00000000000000164F000003061000000000C
:104C2B0000050700000003E4C4C4C5A4C684C764C84EB
:104C3B004C3E4C4C4C00010100000000000464C0067
:104C4B00005A4C00020200000000000544C000068A7
:104C5B004C0003030000000000624C0000764C0087
:104C6B0004040000000000704C0000844C000505?B
:104C7B000000000000007E4C00000000000606000053
:104C8B00000000008C4C00009B4C0100175701000 1E9
:104C9B00A44C0200C256000000AD4C0300625C0045
:104CAB000000B64C0D00835C000000BF4C1E00F7EB
:104CBB005B000000C84C53009C5B000000D14CE52E
:104CCB00009C5B000000DA4C53079C5B000000E388
:104CDB004C0100685D010001EC4C0200835F000099
:104CEB0000F54C9F249D6000000000000005007651EC
:074CFB0000000000000000B2
:104EB000F33A9F4B47AF329F4B78FBB7282D11C079
:104EC0004BB728ECEB47CDD30078D5DDE1DD2BDD0A
:104ED0002BDDCB0A5E28EADD4609FD21FE4CFD7084
:104EE00002CDA144DDCB0A9E3D18D6C9FD7E02212C
:104EF0002E4CCDC400D5DDE1DDCB0276201AEB11BE
:104F00000A0019FD5605FD5E04CDF100CD8000D5E7
:104F1000DDE1DD7702C3E244DDCB02B6FD5605FDDF
:104F20005E04DD660DDD6E0CFD7E02DDE5E5DDE196
:104F3000DD7702DD7304DD7205CD8000D5FDE1DD96
:104F4000E1FD7702DD7E04CDDA00AFDDE5D1CDF005
:104F500050C3E244FD7E02212E4CCDC400CD800022
:104F6000D5DDE1EB11080019CDAE00280FDD7E0381
:104F7000FD7702FD7205FD7304C3E244FD7E03B7B5
:104F80002817DDCB02F6FDE5E1DD740DDD750CCDF6
:104F90008000DD360804C3A850FD360102C3E24498
:104FA000CD8000DDE5D1AFCDF050C3A850ED73AC9E
:104FB0004B31A84EE5F521AE4B34FB21AB4B3520F0
:104FC000053604CDCC4F2AAC4BC32150C5D5DDE509
:104FD000FDE521B04BCDD300283FEBE5DDE1DDCB96
:104FE00084628F1DD5E06DD56071BDD7306DD721F
:104FF00077BB220E0E5DD6E04DD6605CD2050E1E3
:10500000E5DDE1300EDD7E02DD7706DD7E03DD7756
:105010000718C2DDCB088618BCFDE1DDE1D1C1C9AE
:1050200 0E9E5F321AE4B35E122A14BF1E1ED7BA1A6
:105030004BFBED4D313A4ECDB04E219B4BCDAE00EA
:10504000C28A0018EF7618FDFD7E02CDDA00DD7E03
:105050008215C50CDC400EBE9CD4550595069505 2
:1050600069509850715 0C3E244DD7E08FD77011805
:10507000F5CD7750C39850DDE5213C4CCDD300EB06
:10508000E5DDE1FD7E02DDBE0420F1DDCB02762808
:10509000EBDDCB02B6DDE1C9DDE5D1CDF05018C6C0
:1050A000DDE1DD22A94B1808DD210000DD22A94B3E
:1050B000ED7BA34BDDE1D1F1E1FDE1FDE3DDE5F5C4
:1050C000E5C5D5DD2AF64321000022F64339DD751A
:1050D0004DD740531544EFDE5E1DD7407DD750630
:1050E000AF2AA94B7CB5200721 3450E521F944E9CA
:1050F000D5DDE3DD360802219D4BCDF100DDE1C9B0
:10510000CD8000DD360803FD22A74BCDA050213411
:1051100050E521F944E5FD2AA74BFD6607FD6E0623
:10512000E5DDE1FD6605FD6E04E9DDE5E5CDDA00CE
```

```
:10513000DD7E08216C51CDC400EBE9DD7E0837E14E
:10514000DDE1C9ED5FF5F3DDCB0A5EDDCB0ADE20E4
:1051500014F1E25651FBD1DD7207DD7306219F4B3E
:1051600034AFDDE1C9F1E23B51FB18CF59503B515F
:105170003B51435143513AF742B720333A2C43FE57
:1051800002282C3A313ECB5F28253AF94221F842D9
:10519000BE2055B7204C212E43CB46772811CD0099
:1051A00052CD4700E13E01CD3C603AF642D378371C
:1051B000C9CD7460210000DD215144FD2101441E50
:1051C00032CD4D003A2C43B720DA322D431E1ECD8E
:1051D0004D003AF542FE8420CB5F16001DCD1F52D4
:1051E00018C23A2D43B728C7CD00523AF642CB8FAA
:1051F000D3783AF94232F842B720B6CD470018A426
:10520000DB7D6FDB7C67E3E9F547DD4E08DDE5D148
:10521000CD5300C1E50E00CD5300D1CD1F52C93E84
:1052200000ED4BFE42CD3C60C93AF942EE0132F945
:1052300042C9323852CD3A5200C9C33B00FD210D5E
:1052400053FFFD5E04FD5605D5DDE1AFDD7704DDDE
:1052500077 05DD7E02FE022806DD213A531804DDC3
:10526000212F53DD7301DD720218D2DD224953D79D
:10527000DD2A4953CDD9523005CB015318F6FD66CC
:1052800003FD6E0478FE01FA9252280CFD360708E1
:10529000181FFD3607041804FD36070871FD340495
:1052A0001640FD7E02FE0228021687FD7E04BA200B
:1052B00005CDBD52180578FE0128F6CFC9FDE5D110
:1052C000FD212953FD7304FD7205DD7E00FD77028B
:1052D000FFAFDD7701DD7702C9E5DD6E01DD660236
:1052E0007DB4E3FDE1C037C9DDE5F5DD213A53CDFD
:1052F000D9523808CDD152F1DDE1B7C9F1DDE1373E
:10530000C9FDE5FD214553FFFDE1C9080005FF008A
:1053100000000000450000040100000046000004F9
:1053200002000000480000000007000200325302A3
:1053300032530000004900000501033D5300000006
:105340004A00000501050100000000DD21975CFD19
:105350002101 54FFFD6E04FD6605E5FDE1FDCB076F
:1053600046204C3E01DDBE20C2DF53FDCB074E2060
:105370009FDCB07662058C3DF53F3CDE553FD216C
:1053800001 54FD5E04FD5605DD731DDD721ED5FD65
:10539000E1FD5E04FD5603DD731BDD721CFBDDCBFE
:1053A0001266283B3EFFCD3655DDCB12A61830DD08
:1053B000362001FDE5E1DD751DDD741EFD6E04FD89
:1053C0006603DD751BDD741CDDCB11E6C34B53DDBD
:1053D000362000DDCB11A6EBCDE553CDF553EBCD5B
:1053E000F553C34B53DD6E1DDD661EDD7E1BE5FDF3
:1053F000E1FD7704C9FD210754FD7504FD7405FF27
:10540000C9080001FF000007000400000DD21972B
:105410005CDD361A01FD217F54FFFD6605FD6E043B
:10542000E5FDE1DD7418DD7517DDCB1256201EFD9C
:105430007E04B72818DDCB11D6DD7714FD5603FDA9
:105440005E05DD7216DD7315FD218B54FFDD361A06
:1054500003E5FDE1DDCB234620113A443ED6202072
:105460000AFDCB075E2804DDCB1196FD7E06FD21EB
:105470008554FD7405FD7504FD7702FFC30D5408C6
:105480000002FF000007000000000002000000DE34
:1054900055975CED73DC5531EE49E5F521AE4B34A3
:1054A000FBDDE5D5C5DD21975C21C955DD4E013E0B
:1054B00001ED79ED781E30ED59CB6728073A0F3EA4
:1054C000CB6F202DDD4E00ED581E1A3A3C3ECB6FBF
:1054D000203A3C323C3E1834ED73DC5531EE49E560
```

```
:1054E000F521AE4B34FBDDE5D5C5DD21975C21C947
:1054F00055DD4E00ED78E67F5F010900EDB9200C27
:1055000021CA55CB21094E2346C5E1E9DD6E1BDDDD
:10551000661C733EFFBD280A2CDD751B3EC095CC72
:105520003655DDCB12AE214C1D22D74CC1D1DDE169
:105530002ADC55C32150DDCB23462844DDCB235E36
:10554000201DB7280B0611CD9E56D0DDCB12C6C943
:10555000DDCB12E60613CD9E56D0DDCB12CEC9B7F9
:105560002808DDCB23662012180ADDCB12E6DDCB3E
:10557000236628063E0132033BC93E0032033BC985
:10558000DDCB2356C8B728EC18F01896DDCB12EE09
:105590001894DDCB12DEC32255DDCB129EC32255FB
:1055A000DDCB12FEDDCB11D6C30C55DDCB244E284E
:1055B00006CDA45BC32255DDCB126EC4A45BC3220F
:1055C0005500000000000000000000AB55A055A0559C
:1055D000A055A05599559255BC558A550000DD214E
:1055E000975CDD361A02CD2156C9ED73D156316074
:1055F0004BE5F521AE4B34FBDDE5C5DD21975C3E87
:1056000002DDBE1AC49656200FDD7E14A7CC855647
:10561000CC96562803CD2156C1DDE12AD156C321AF
:1056200050DD4E00DD7E12A72814CB472806061158
:10563000CD9E56C9CB4F28060613CD9E56C9CD4DDB
:1056400057DDCB125E2804CDAF56C9DDCB125628EC
:1056500007CD8556CD9656C9DD6E15DD66167EE6FC
:105660007FDDB62147DD3415DD3514ED41214C1DBC
:1056700022D74C7801040021C255EDB1C0DDCB1119
:1056800096CD4D57C9F5DD361A03214D543E02D54E
:10569000CD2A51D1F1C9DD4E013E28ED79C9DD4E4B
:1056A00001ED78CB572806DD4E00ED41C937C9DD45
:1056B0004E013E28ED79DDE5DD219B4CCD8360DD9B
:1056C000E1C9DD21975CDDCB125E37C0CD2156AF3D
:1056D000C90000ED73E85C31304BE5F521AE4B3489
:1056E000FBDDE5DD21975CDDCB1346201ADDCB1316
:1056F000C6C5D5CD5357CD7357CD8D57CDC75AD1CC
:10570000C1DDCB13861804DDCB13CE3E10D3F6DDFE
:10571000E12AE85CC32150DD21975CDDCB134637DD
:10572000C0DDCB13C6CD7357CD8D57DDCB1276DDE3
:10573000CB12B6C4C75AF3DDCB134EDDCB138EFBB1
:10574000F5C45357F120DEDDCB138637C9D7CD170B
:1057500057CFC9DD4E01ED78CB3FCB3FCB3F47F66E
:10576000FE4F78CB3FF6FDA14FDD7E11F603A1DDA4
:105770007711C93A003B2FF69F4FDD7E11F660A1ED
:10578000DD77113AE75CB7C8DDCB11EEC9DD7E11DC
:1057900047DDAE104FC8DDCB12F6CB61203CCB69A4
:1057A000205EDDCB1066C8DDCB106EC8DD7E10E656
:1057B00007CB275F160021CC57E521BC5CDDCB234E
:1057C00046200321CC5C195E2356EBE9DD7E10DD1B
:1057D0004611A8C84FE6FBC818D2CB602814DDCB11
:1057E0000BFECD245ADDCB10E6DDCB106EC4165B6C
:1057F000189BDDCB10A6DDCB13AECDB55BC38D57AB
:10580000CB68280EDDCB10EEDDCB1066C4165BC373
:105810008D57DDCB10AECDA45BC38D57CDFE59C9DE
:10582000CB41C2AC59CB49C48759C4125AC0CB71C1
:10583000C2435AC3375ACB41C2BD59CB49C4875919
:10584000C2125ACB71C2435AC3375ACB49C4A75963
:10585000C21C5ACB41C2AC59CB71C2435AC3375A4E
:10586000CB49C4A759C21C5ACB41C2BD59CB71C246
:10587000435AC3375ACB412819CDAC59DDCB1396C7
:10588000DDCB13A6DDCB12D6DDCB2356C8AF32035A
```

:105890003BC9CB71280ECB702005DDCB10B6C9DD1E
:1058A000CB10F6C9CB51CA375A3EFF32033B3A44BC
:1058B0003ED620CAC858DDCB127E2807DDCB12BEEB
:1058C000C2C858DDCB1356C8DDCB2446CAFE59DD0D
:1058D000E5DD21BF4CCD8360DDE1C3FE59C9CB417D
:1058E0002812CDBD59DDCB1296DDCB2356C83EFF25
:1058F00032033BC9CB71CA375ACB702805DDCB10B8
:10590000F6C9DDCB10B6C9CB49CA375ACDA759DD88
:10591000CB2356C83E0032033BC9CB492816DDCB0A
:105920001396CD8759DDCB23562805DDCB1076C8DD
:10593000CD125AC9CB512804CD085AC9CB71CA37E8
:105940005ACB702005DDCB10B6C9DDCB10F6C9CB24
:10595000512809CDAF5ACD085AC31C5ACB49C41C93
:105960005A2044DDCB2356CA375ACB71CA375ACB9B
:10597000702808CD125ADDCB10F6C9DDCB10B6CD9C
:105980001C5ADDCB1196C9F5AF32C74CDDCB13667F
:10599000280FDDE5DD21AD4CCD8360DDE1DDCB13EE
:1059A000A6DDCB10CEF1C9DDCB108EC9DDCB10C684
:1059B000AF32C74C32D04CDDCB09C6182EF5DDCB4B
:1059C0001086DDCB2446281EDDCB2346200DDDCB03
:1059D000127E20123A443ED620280BDDE5DD21BFA1
:1059E0004CCD8360DDE1F1DDCB0986F5C5DD7E09B7
:1059F000603DD4E01F3ED41ED79FBC1F1C9DDCBCD
:105A000010D6DDCB0BCE181CDDCB1096DDCB0B8E6C
:105A10001812DDCB0BDEDDCB129E1808DDCB0B9E02
:105A2000DDCB12DEF5C5DD7E0B0605DD4E01F3EDA7
:105A300041ED79FBC1F1C9DD7E11E604DDB610DD73
:105A40007711C9F5C5DD7E23CB4F2012CB5F202C0B
:105A5000DDCB10F6CB702054DDCB10B6184ECB70DA
:105A600020083E20DDCB10B618063E08DDCB10F630
:105A7000DD4E02DD460EED41ED791830CB70200C85
:105A8000DDCB10B6DDCB2366281818OADDCB10F667
:105A9000DDCB2366200CDDCB235E2810DDCB12DEB0
:105AA000180ADDCB235E2804DDCB129EC1F1C9F3B9
:105AB000DD4E01ED78CB5728F73E0306FF10FE3D83
:105AC00020F9DDCB1196C9DD7E1047E630EE302897
:105AD0000C3E1FDDCB136E280F3E20180B21DC5C23
:105AE00078E6074F0600097E21E45CBEC4E66C77C9
:105AF0003E18DDCB10462002 3E1721E55CBEC4E611
:105B00006C773E1ADDCB106E20023E1921E65CBE9A
:105B1000C8CDE66C77C9DDCB13D6DDCB12DEDDCB8D
:105B20001296DD7E23CB472804DDCB11D6CB472848
:105B300018CB4F200ACB5F2810CB672010180ADD46
:105B40007E22E60FFE04FA4D5B3EFF18023E003255
:105B5000033BDDCB245E280BDDE5DD21D14CCD837D
:105B600060DDE1DD7E24DDCB105E2806CB6F2006F4
:105B7000180CCB672808DDCB11D6DDCB13E6DDCBC7
:105B800024462817DDCB13662806DDCB2356280BC9
:105B9000DDE5DD21C84CCD8360DDE1C9DD21975C09
:105BA000DDCB13EEDD21975CDDCB11662807DD210F
:105BB000B64CCD8360DD21975CAFDD7711DD7710CA
:105BC000DDCB0BBEDDCB0B8ECD245ACDE759CD1CE2
:105BD0005ADDCB235E2805CD6A55180053EFF3203FA
:105BE0003BAFDD7712DDCB12D632C74C32D04C3210
:105BF000D94CCDC75AAFC9DD21975CDDCB116620EA
:105C00000ADDCB116E37C0DDCB11E6AFC9DDE5DDB6
:105C100021975CDDCB135E2036DDCB2346201BDDD8
:105C2000CB104E2015DDCB12FEDDCB11D6DDCB2304
:105C300005628193EFF32033B1807DDCB0BE6CD2477

```
:105C40005ADDCB13DEDD21A44CCD8360DDE1C9DD5F
:105C500021A44CDD7E06FE06F25F5CDD360606DD25
:105C6000E1C9DD21975CDDCB0BA6CD245ADDCB232A
:105C700056280ADDCB104E2004AF32033BDDCB1398
:105C80009EAFC9DD21975CF3DD6E1BDD661C36051A
:105C90002CDD751BFBAFC9F4F6DC180000144713AC
:105CA000401520111717080000000000000000000038
:105CB0000000000000000000000000001C581C58FC
:105CC0001C581C5820583658 4B5860587558DE5888
:105CD00075937 5A1A59375A4F59375A211C211C1C
:105CE000211C1B1DFFFFFF000000ED73665E3100ED
:105CF0004BE5F521AE4B34FBDDE5C5D5DD21405E3E
:105D0000DD4E01ED78CB672821DDE5DD21975CDDF7
:105D1000CB11DEDDCB10DEDDCB10662007F53E2299
:105D2000CDE66CF1DDE1E624282A3A0B3EE60328B5
:105D300023DDCB1346201 9DDCB13C6CD5357CD9FA2
:105D40005DCDB85DCD0F5ECD2B5EDDCB1386180427
:105D5000DDCB13CED1C13E10D3F7DDE12A665EC3A1
:105D60002150D7CD685DCFC93A0B3EE603C8DD218F
:105D7000405EDDCB134637C0DDCB13C6CD9F5DCD76
:105D8000B85DF3DDCB134EDDCB138EFBF5C453575B
:105D9000F120E9CD2B5ECD0F5EDDCB138637C93AFE
:105DA000003B2FCB27CB27CB27CB27F69F4FDD7E82
:105DB00011F660A1DD7711C9DD7E1147DDAE104F10
:105DC000C8CB612011CB69201ADDCB1066C8DDCBB2
:105DD000106EC8C3AC57DDCB10E6DDCB0BFECD2477
:105DE0005A18D5CB682816DDCB10EEDD3620013AE7
:105DF0003D3ECBD7323D3EDDCB129618BBDDCB10FE
:105E0000AEDDCB12D6DD362000DD36101018A93EEF
:105E100026DDCB1256200A3E24DDCB125E28023E40
:105E20002521655EBEC877CDE66CC9DDCB125E3A32
:105E30003D3E2006CB87323D3EC9CBC7323D3EC9F1
:105E4000F5F7DD1812D0144713401520111717086 5
:105E50000000C00000000000000000000000000036
:105E600000000000000260000DD21405EFD21C15E33
:105E7000FFFD6605FD6E04E5FDE1DD7418DD7517B7
:105E80003E01DDBE20280A3A3D3ECBCF323D3E18D2
:105E90019FD7E04DD7714FD5603FD5E05DD7216E7
:105EA000DD7315FD21CD5EFF1800E5FDE1FD7E06E9
:105EB000FD21C75EFD7405FD7504FD7702FFC36813
:105EC0005E080003FF00000700000000000020000 61
:105ED0000D55E405EDD21405EDD361A02CD265FD4
:105EE000C9ED73925F31C04AE5F521AE4B34FBDD5D
:105EF000E5C5DD21405E3E02DDBE1A2019DD7E14BF
:105F0000A72805CD265F1815DD361A0321AA5E3EA7
:105F10003D5CD2A51D1DD4E013E28ED79C1DDE119
:105F20002A925FC32150DD4E00DD7E12A72814CBDC
:105F30004728060611CD9E56C9CB4F28060613CD1D
:105F40009E56C9CD625DDDCB125E280CDDE5DD21FC
:105F5000E34CCD8360DDE1C9DDCB1256280FCD08BF
:105F60005FCD165F3A3D3ECBCF323D3EC9DD6E156B
:105F7000DD66167EE67FDDB62147DD3415DD35149E
:105F8000ED41C9DD21405EDDCB125E37C0CD265F1D
:105F9000AFC90000ED73E45F31D04AE5F521AE4BA7
:105FA00034FBDDE5C5DD21405EDD4E00ED78E67FAA
:105FB0006FDD4E013E01ED79ED780630ED41E67082
:105FC0002019DDCB235E20137DFE112006DDCB12D0
:105FD0009E1808FE132004DDCB12DEC1DDE12AE4A9
:105FE0005FC3215000000000ED73E65F31004AE519
```

:105FF000F521AE4B34CD3B012AE65FC32150F5C5F8
:10600000E547E6F0FE60200332FA433E1EDFE1C1C1
:10601000F1C9F5E521403ECBC63E28CDFE5FCD3B24
:106020006D03E1F1C9F5E521403ECB863E20CDFE72
:106030005FE1F1C9CDB16CC03E24DFC9D7F5AF3205
:10604000FD4CF1FE01285EFE0D380AFE13DAFC60FD
:10605000C615DF1815F5DFF1FE082804FE09200A31
:10606000ED43CC49CFED4BCC49D7DD21F54CCD8369
:106070006OCFC9E93E25DFDDE5DD21EC4CCD836055
:10608000DDE1C9ED5FF5F3DDCB08C6DD7E02DD772E
:106090006DD7E03DD7707F1E29C60FBC9AFCBF73D
:1060A00032003037C9E53A34473C013030FE6438BD
:1060B000304D664FE0A38050CD60A18F7C630DD8C
:1060C000215C44DD7000DD7101DD77023A313ECBA9
:1060D0005F281F3AF742B7201F3A2C43FE022812CE
:1060E0003AF842B7280CFD210C44210B001E03CDC9
:1060F0004D0E13E01DF1801E1C36A60FD22024369
:106100003E88D379FD3601013E91D379FD7E01B7FA
:10611000CA6A6018F7213B3ECBCECD7460C9213BE3
:106120003ECB8ECD9D60C9E52A344722874A2A3668
:1061300047223447E1C9E52A874A223447E1C92189
:106140003B3ECBC6C9213B3ECB86C9CD51633E0108
:10615000CD3C60C9BDBEBF0000000000000000D7FC
:10616000CD1763CD27613E013257613A023ECB47DE
:10617000CC0A631808D7CD1763AF325761CD51638E
:10618000225D61DD2AFA423A8A4AFEFF2807473A31
:10619000BD49B72803DD460B78325C61FD2A5961A1
:1061A000FD7E003258613AF543FE01285021604906
:1061B000CB46280A3A5861B7282AFE202826CD2F38
:1061C00063FD7E03E603B7281B215461DD21113EE8
:1061D0003D4F0600097E32E0613A586157CD3A5290
:1061E00000C2D3622A5D613A023ECB4720123E08CC
:1061F000CD3C603A3F3EE607CDF76218452A5D6127
:10620000AFE5211947CB7E200623CB7E28213C3CDD
:10621000C1C5F5E5C5E13E08CD3C60E179E63F4FFB
:10622000F13D7ECBBF2803A11801B14FE11805E174
:10623000ED4B18473A3F3ECB3FCB3FCB3FE607CD38
:10624000F7623A586157CB78422804CBF81802CB52
:10625000B8CB69280EDD2AFA423A3447CD276320AD
:106260002CBA93E02CD3C60CB69280A23E521344C
:106270004734E1CD3C60DD2AFA42225D613A576144
:10628000B7201B3AF543B7280D3A3447CD27632092
:106290002FCDFE63183ACDEE67CD20631835DD7E35
:1062A0002DD960157DD5E0B2A3447AFED52200820
:1062B000223447CD2063181B3A3447DDBE0B280D2E
:1062C000213447342A5D6123225D611806CDF963CC
:1062D000CD20632A59612322596I3A5B613D325BCB
:1062E00061C29C613A5761B7280BED5B3447ED53AF
:1062F0003647CD3661CFC9CBB8CB4F2802CBF8CBD0
:10630000F1FE01C8FE02C8CBB1C9F53AF642CB8F07
:10631000D37832F642F1C9FD22596179325B61C905
:10632000CD5163225D61C9D5ED5B5C61BBD1C9CD47
:106330003663CD3E00C9C5FD21A149ED4B3447FD73
:106340007004FD7105ED4BFA42FD7100FD7001C155
:10635000C9ED5BFA42ED4B3447C35300F5060E809E
:10636000DFF1C91602B72802CB22C93A053EE60181
:10637000CD5C63C9E5D51EC6180BE5D5118600189E
:106380004E5D51E46D6083803231 8F9ED443DCB65
:1063900027CB27CB27B3329A63CB46D1E1C936004E

:1063A0002310FBC9D7ED4B3447DD2AFA4279B728D1
:1063B000340D3A894AFEFF280CB9FAC56328063A1B
:1063C000BD49B72820ED433447CD51633E08CD3C4D
:1063D00060213447CB69280B35F2E363341806EDAE
:1063E000433447CFC9CD7964ED4B34473A8A4AFEEE
:1063F000FF2003DD7E0B4F18CCD73E011802D7AF2C
:10640000328665CD51633E08CD3C60C5D1ED4B343D
:1064100047CB6B28010C0CDD2AFA42DD7E0BB93824
:106420003B3A8A4AFEFF284A3A8665B72044CDB1F6
:106430006C201D3A313ECB7728163ABE493CB9282C
:1064400008CB6B280B3CB920073E10CDFE5F18220D
:106450003A8A4AB9301C3ABD49B72016CDCE64ED10
:106460004B34473A8665B720073A894AFEFF200138
:10647000AF4FAF328665C3DF63D7ED4B3447DD2ABC
:10648000FA42DD7E03B8280405C3DF63DDCB056E69
:10649000200D3A023ECB4F2806DD4604C3DF63CD14
:1064A000A464CFC9DD2AFA42DDCB0576281CDD7E47
:1064B00003B72011DDCB056E20103A5F49B72805E0
:1064C000CD3A52F3C9CD3A52D4C9CD3460C9D7EDD3
:1064D0004B3447DD2AFA42DD7E04B8280404C3DFCA
:1064E000633A8665B7280EDD7E02DD9601B820EDA1
:1064F0000600C3DF63DDCB056E200D3A023ECB4FB5
:106500002806DD4603C3DF63CD0D651895DD2AFA45
:1065100042DDCB057628B3DD7E02DD9601DDBE04CB
:106520002011DDCB056E20A23A5F49B72805CD3A90
:1065300052F0C9CD3A52CFC9D7DD2AFA42DD46031F
:10654000AF4FED43344732BD49DDCB057E2030DD12
:10655000CB056E282ACD2F63FD7E03E603FE0320C4
:10656000005CD50003819DD7E04FDBE063811FD7ED4
:1065700006DDBE033809FD4606FD4E07C3DF63EDA9
:106580004B3447C36964002118477EE6C0F5FD7EA1
:1065900000E63FC1B07723AF772377C90000D5AFBE
:1065A00032BD493A043E2A6F49DD2AFA42DDCB0565
:1065B0006ECA8566CD2F63FD4606FD4E07CB47C2EA
:1065C0004866FD360500CD3E00CD546720063234C6
:1065D00047C3A666C5CD9D6CC12825CD3A529ADA2F
:1065E000A666AF323447CD2F63FD4603CB50CAA613
:1065F000662A3447E5CD3A52CBE1223447C3A6663A
:10660000CD41003012DD2AFA42DDCB0F46CAA66624
:10661000CD3A5264C3A666FD6606FD6E07E5AFED92
:1066200042E12006ED433447187CCD9D6C200CCB15
:1066300006028CDFD4606FD4E0718E9E5CD3A529A91
:10664000E13863223447189ECD5E67200BCD6E671C
:106650002054CD3460C3C265FD3404FD360500CD41
:106660003E00CD546720083234 47CDCE641837CD74
:106670003A529A3831AF323447CDCE64CD2F63CD04
:106680003A529C1821CB47C4E266ED4B3447ED5B90
:10669000FA423A894AFEFF28093ABD49B73A894A7F
:1066A0002801AF323447D13A2753CB67282FCD4941
:1066B00067282A1601219C653A043ECB4728063EEE
:1066C0000A77CD2E6C3A0F3ECB5FC83A443ED620B7
:1066D00028083A453E77CD2E6CC9CD4F6CC93E0196
:1066E0001801AFF5D52A6F49DD2AFA42DDCB056ED8
:1066F000283ACD2F63FD4606FD4E07CD5E67200A82
:10670000CD6E672041CD3460183CFD3404CD3E0091
:10671000CD54672005CDCE64182CCD3A529A382638
:10672000CDCE64CD2F63CD3A529C181AED4B344731
:106730003A894AFEFF28085779BA4AFA3F674FED6F
:10674000433447CDCE64D1F1C9CDB16C2004CDB670

```
:106750006CC0AFC9FD6606FD6E07AFED42C9DD2A0C
:10676000FA42DD7E02DD9601ED5B3447BAC9DDCB2E
:106770000F46C8F5CD3A5264F1C90E00D5E5FE20AA
:106780003018ED5B2653CB722825CB402008CB6216
:10679000201D0E0418080E841804CB4020F8E1D107
:1067A000C9573A0F3ECB5728263E45CBC918EF05AF
:1067B0002018FE1A28E00E82FE0520023E80FE0F01
:1067C0002804FE0E20D8CBE118D4FE1F28D3573A58
:1067D0002753CB677A2004CBC918C3573A0F3ECB57
:1067E000472006CBC9CB572002CBD97A18B079CD38
:1067F000BC6CFDCB00DEFDE5FD21A149FD460FFD92
:106800004E0EB7ED42FDE12024DD2AFA42DDCB0534
:106810006E281AFDCB006E280AFDCB00662009CD3C
:106820003A52F7FDCB0066C8CD3A5209C9CB6F2862
:106830000421344735CDFE63C9C5FDE5FD216B68F4
:106840000E01CDB76BFDE1C1C9C5FDE548CDB76B04
:10685000FDE1C1C9CB71C4396847CD4968C9C5CB11
:1068600071C439680E01CDB76BC1C91BE53A6149E6
:10687000C6203288683A6449C620328A682187680F
:106880001604CD2E6CE1C91C001E00DD2AFA42CD93
:106890002F633AF543FE01C8DDCB057E37C0FD7E90
:1068A00003E603FE0337C8B7C90000D7CD2F63FD49
:1068B00022A968CD3B6D063A2753CB772806CD3BFE
:1068C0006D36182FFD2AA968CD9D6C2006CD3B6D35
:1068D000021820C5060990ED4432DF68CD3B6D00FB
:1068E000C1CB782806CD3B6D001808CB702804CDAD
:1068F0003B6D013A0F3ECB572812FDCB036E2806A5
:10690000CD3B6D14180ACD3B6D131804CD3B6D12B1
:10691000CFC9E521403EAFCB6E2802CBC721023E56
:10692000CB562802CBD7213B3ECB462802CBCFCB40
:10693000DFE1C9210C00CD81693A2753CBE732272B
:10694000533E16CDE66CCD0701DD21DD69DD360451
:1069500058DD36056EE9210D00CD81693A2753CB0C
:10696000A7322753AF328B4A3E15CDE66CCD0701D7
:10697000DD21DD69DD3604B9DD36056EDDCB018E46
:10698000E9FD2100473E0AF5E5FD7500FD74013E75
:1069900015DFE1A72807F13D20ED3E27DFF1FD6679
:1069A00003FD6E02C9D5FD5E04FD5605D5FDE1D19E
:1069B000C93A003BCB47280F3ADC69B7200E3C327E
:1069C000DC69CD126037C9AF32DC69C93AC940FE13
:1069D000FF20F23ACA40FE7328E818E900002000C0
:1069E00000586E00000034505B5D7B7D7975335C30
:1069F0005E393E3F405859767846470101010101 12
:106A00000101010202020334483434347C7C80806A
:106A10000800000000000007000600215307000300E3
:106A2000000005000100070001002C6A00000000C2
:106A3000000000410070006003A6A0000004700004A
:106A40000004FD21F86BFFFD6E04FD6605E5DDE148
:106A500022FE6B2A3447221B472A3647221D47DD78
:106A60006603DD6E05DD7E0422006C32026CE5FDFE
:106A7000E1DD7E0732F543FE01C26C6BDDCB0656CD
:106A800020473A026C470E01FDE5FD7E00FE2038EE
:106A90000E1007FDE1CDB76B18560CFD2318EBFD6A
:106AA000E30DC4B76BFDE1FD7E00CDB36AFD23109D
:106AB000D5183DFDE5C50601CD7A67CB51C45E68AA
:106AC000CB49C43252C1FDE1C9DD7E04CDE273CBB6
:106AD00049C43460CB61C45468CB512813FD7E0097
:106AE000FD23F53A026C3D06004FF1CD32521800FD
:106AF000DD2AFE6BDDCB0696DDCB069EDD212F5316
```

```
:106B0000CDD9523809FD7E04FDB605C4BD52AF573C
:106B10002A3447ED4B1B47ED422801143A023ECB85
:106B200047281DAF2A3647ED4B1D47ED4228082A5E
:106B30003647223447180915200662A34472236479B
:106B40003AF742B720123A403ECB472003CDAB681C
:106B5000CD126932F642D378CD4B61CD7460CD1A37
:106B600001DD2AFE6BDDCB068EC3426A3AF742FE98
:106B700000202CDDCB0656202CDDCB065E202C7EA3
:106B8000FE20382D3A2753CB6728113A0F3ECB57BA
:106B9000200A1601CD2E6CCB4FCAF06AC3826ACD93
:106BA000AC6FC3F06ACD3A52D218F7CD3A52D3182F
:106BB000F1CD3A52D118EBF5E5FDE5FD56003AF579
:106BC00043FE00200C3A403ECB5F2011CD7561188A
:106BD000103A023ECB4720F4CD5F611804CD3A5203
:106BE00050FDE1E1F1C9FD2A006CFD23FD22006C9E
:106BF0003A026C3D32026CC9080006FF000000003A
:106C00000000001B6900DD21413EDDCB006EC8168F
:106C10000321036C3A554932056CCD2E6CC9D5E57C
:106C2000032056C160321036CCD4A6CE1D1C9D71E25
:106C300000DD212F5306003E014EBA2004BB200187
:106C400004CD6B52231520F1CFC9D71E0118E2C520
:106C5000DDE5DD212F530602CD6B52DDE1C1C90117
:106C60001C001E001B281B2921606CE523ED5B6FB7
:106C7000491AE61FC620772323ED5BFA421AE61F66
:106C8000C62077E11604181121646C1602180A2137
:106C9000666C18F7215F6C1601CD2E6CC9FD7E0362
:106CA00047E603FE03C9FD4604FD4E05ED433447A8
:106CB000C93AF543B7C93A0F3EE603C9E5FD6E1080
:106CC000FD66112323E3FDE1C9FD7E06FD7704FD8A
:106CD0007E07FD7705C922DE6CED53E06CC9514497
:106CE000144E570B373D7CD1D6DCD3E6D3FC9CDD9
:106CF000176DE5D1FD6E00260047FD4E02B7280551
:106D00003E05CD3C600620FD7E01B7C8853D5F167F
:106D1000003E00CD3C60C9D1E17E23E5D5010600EF
:106D2000ED5BE26CCD816DCD6E6DED4BE26CE5FD02
:106D30006E04FD660509FD7E03C1C9CD176D3DFAE0
:106D4000516DF5FD7E0212E680B602031323F118A1
:106D5000EDC5E1FD7E02FD460105FA646D362012A7
:106D600023131 8F5CD6E6D3E01322D43B7C92ADECF
:106D70006CED5BE06CFD7E003DFA806D231318F82E
:106D8000C92100003DFA8B6D0918F919E5FDE1C92B
:106D9000CDA46DFD6E002600FD4602FD4E013E07AE
:106DA000CD3C60C9D1E17E23E5D5010300ED5BE474
:106DB0006CCD816DC9CDA46DCD6E6DFD4E02FD7E95
:096DC000010DFA676D121318F8B9
:06000001455A45584F531B
:106DC900DD21DD69FD21106AFD360008FD3602046A
:106DD900FFFD7E01B7280ACDED6FFD21226AFF185C
:106DE900DFCDA569FDCB0766C25669CDC76F281BE4
:106DF900FD21DD69FDCB0186CD3A6ECDED6FDDCB91
:106E0900146200AFD21226AFF18EDCDED6FFD2113
:106E1900106AFD360007FD360201FDE5CDA569FDC5
:106E2900360702FD360400FD360500FDE1FFC3C942
:106E39006D3A8B4ACB4F2009FD212153FDCB064EDC
:106E4900C0DD6E04DD6605E5FDE1CD9070FDE93A32
:106E59002753CB77201F3E1BBE2825EDB120010CFF
:106E6900DD7E0391C54FDD6E02110048EDB0C1CD45
:106E7900A870C3AD6F110048EDB0CDA870C3AD6F58
:106E89002C0DDD3402DD3503CD8D6F7EE5C521FA8C
```

:106E99006901150OEDB928043E00182C21FB690988
:106EA9007E47E603202278CB7F203D3A053ECB473B
:106EB900200A78CB2FCB2FE6033C180C78CB2FCBAD
:106EC9002FCB2FCB2FE6073CC1E11100483C32E51F
:106ED900693AE569EDA03D32E569B72805CD8D6FC1
:106EE90018EFCDA070C3AD6F110048C1E13E46BE99
:106EF9002821CD8D6F3EFFBBCAAD6F7EEDA0FE1B75
:106F090020F0CD8D6F3E29BE20E81B0D2CCDA07041
:106F1900C3AD6FCD8D6F3E1BEDB120F7CD8D6F3EAB
:106F290028BE20EF0D2C3A8B4ACB472805CDA06F00
:106F390018F4CBCF328B4ACDE8523005CDA06F186B
:106F4900F1CDE06FCD8D6F3E1BBEEDA028173E87BA
:106F5900BB20F1CDC170CDE8523005CDA06F18F638
:106F6900CDE06F18DFCD8D6F3E29BE20D70D2C3AAD
:106F79008B4ACB8F328B4A1B7BB7F5CCDB70F1C4C4
:106F8900C170182078B1C0ED53E369DDCB01C6E1CA
:106F9900DD7504DD7405C9ED53E369DD7103DD7544
:106FA9002E1181378B12808DD7103DD75021804B0
:106FB900DDCB01C621586EDD7504DD7405C9DD21FF
:106FC900DD69FD6603FD6E044D2DDD7103DD3602BD
:106FD90000DD740079B7C9FDE5D1ED53206A1E00C3
:106FE900FD5603C9FD213A6AFDCB064EC0CDB169F4
:106FF900D83ACA40FEFFC8473AC9404FCD0E01CD25
:107009006B703EFFB920123E7CB8200D3A2B3ECB67
:10701900672836FD21266AFFC93E80B82007CD0DB5
:107029005CCD0701C93A0F3ECB57201DDDE5DD21B7
:10703900975CDDCB2346200FDDCB12562809DDE115
:10704900CD0701CD3460C9DDE1CD5B70210047700A
:10705900181B3EFFB92805782FCB7FC0FDCB06DE74
:10706900AFC93EFFB9C83EAAB8C0061BC9FD213A3F
:107079006AFD360401FD360347FD360700FDCB06E0
:10708900CEFD21346AFFC9ED5BE369DD6E02DD6681
:107099000000DD4E030600C93A2753CBD7322753FDEB
:1070A900212153FDCB06CEFDCB0686FD360701FD1A
:1070B9007304FD21166AFFC9FD211C6ACDA569FD6E
:1070C9007304AFCBD7FD7707FD211C6AFD36020398
:0C70D900FFC9FD211C6AFD360205FFC93D
:06000001524F4E4C4E452B
:106DC900CDD36DFD21226AFF18F6FD212153FDCB9C
:106DD90064EC0CDB169D83ACA40FEFFC8CDA16FF1
:106DE900473AC9404FCD0E01CD656F3AF742A7200A
:106DF9003EFDCB0676283E3EFFB920053E7CB828ED
:106E09003ECD706FCA866F3E03B82012DDCB014EAE
:106E1900DDCB018ECA866FFDCB06B6C3866F3E10E9
:106E2900B8DDCB018EC2866FDDCB01CEC3866FCDB7
:106E3900706FC3866F3EFFB920333E7CB8202ECDDC
:106E4900A16FFD21106AFD360008FD360204FFFD21
:106E59007E01B720FEFDE5CDA569FD360701FDE1FF
:106E6900FD360007FD360201FFE1C33369CD706FBE
:106E79002007CD866FCD5B6FC93E02B8201ADDCBE6
:106E8900014EDDCB018E2810FDCB06F63E36CDE650
:106E99006CCD866FCD5B6FC9DDCB018E3E10B820FE
:106EA9008DDCB01CECD866FC9DD6E04DD6605E94F
:106EB9003E1BB82804CD866FC9CD556F78C521FA18
:106EC9006901150OEDB928043E00182C21FB690958
:106ED9007E47E603202278CB7F20403A053ECB4708
:106EE900200A78CB2FCB2FE6033C180C78CB2FCB7D
:106EF9002FCB2FCB2FE6073CC12100483C32E56957
:106F09003AE569703D32E569280C2322AA6FCD550F

:106F19006F2AAA6F18EACD806F1837210048C1AFD0
:106F290018033AE5693C282A32E569702322AA6FD9
:106F3900CD556F2AAA6F3E29B820E72B7E23FE1B69
:106F490020E03AE5693D5FCD806F1806CD0701E184
:106F5900180321B96EDD7504DD7405C93EFFB9C892
:106F69003EAAB8C0061BC93EFFB92805782FCB7FBA
:106F7900C0FDCB06DEAFC9FDCB06D61806783200B8
:106F8900481E01FD212153FDCB06CEFD7304FD36BC
:106F99000700FD21166AFFC9FDCB0696FDCB069EAB
:106FA900C900003AF742FE01282DFE022845FE726B
:106FB90028183A313ECB7F2804CD3A52CD3E0232D1
:106FC900F742CD8E70CD3A52ADC93E0132F742CD6E
:106FD9008E70CD3A52ABC9DDCB065E28107EFE72AB
:106FE9002832FE2228CCFEA02825CD32707ECD3A4B
:106FF90052ACC9DDCB065E28107EFE72285AFE22ED
:107009002846FEA02809CD32707ECD3A52A2C9CDBC
:107019003A52E5C9AF32F742CD96703AF942EE01DC
:1070290032F8423E30325549C97EF5E5CD3A52B57E
:1070390OE1CB492808FE303808FE493808CB7F20C3
:107049004F177E1C977F1C93A313ECB7F2804CD04
:107059003A52CECD677018BCCD6770C3D36F3A0F63
:107069003ECB572011CB8FCB87CB672004CBC718DA
:107079002CBCF320F3EF3CD3A52C5CD3A52C6CDEF
:107089003A524CFBC9CD1269CB8FD378C9CD12695D
:10709900CBCFD378C921403ECB6E3E2C28023E315E
:1070A90032AF70CDEF6C00C9000000000000FF0096
:0570B900010100BC70A4
:06000001524F464C4E4533
:106DC900FD211153FD360701FD21FE6DFD3602013E
:106DD900FD360411FD360553FFFD211953FD360714
:106DE90002FD21FE6DFD360204FD360419FD36054E
:0B6DF90053FFC33369070001000000D6
:0600000152535441525419
:1070E50000020203 8A01000102048D010001020968
:1070F50091010000130A9A01000113097A4010007F
:10710500000000AD01000A0000000000000020AAD0108
:10711500000020208B70100020208BF010F000203D6
:10712500C7010F000203CD010F000203D0010F00BC
:107135000203CA0113010102D30123010206D5018D
:107145002A000206DB011303000000001700020 3FA
:10715500E1011700 0203E4011700 0203E7011C0225
:107165000205EA011C030204EF0127000201F301F5
:1071750027000201F4012E000201F3012E00020195
:10718500F40136010004F50136010004F901360069
:1071950000005FD0136010004020236010004060265
:1071A500360100040A0236010004 0E0236011104FC
:1071B500120236040000000040010004020 24000F3
:1071C500000516024001000041B024A0100040202E8
:1071D5004A0000051602 4A0100041B020000003F98
:1071E5001F020000003C5E020050000000000000 08D
:1071F500001D9A02170000 02B70200000000B90244
:10720500000000000B9020084000000000000000003A
:10721500B90232000204B9023C000204BD02460074
:0A7225000204C102000102 09C502C3
:10726F00524551464 94C4C50524F5445435444 5456
:10727F004B4244204C4F434B45444B4244204552D4
:10728F00524F522020202020414C5048412020202096
:10729F0020204E554D202020202020412F4E50524966
:1072AF0053433353433153433 25E434443442820C3

:1072BF0029445352282029434852424C4B464C44B0
:1072CF004F46464C4E4F4E4C4E30313A534E443A49
:1072DF005243563A464450583A5244593A454F54FD
:1072EF003A4449533A434F4E3A524E473A42555316
:1072FF00593A4F464646312D435552534F52207FF0
:10730F002020202046322D48492D4C4947485420F3
:10731F00434841522F424B475244420220202046C1
:10732F00332D435552534F522057524150204F4EF9
:10733F002F4F464646312D52455455524E200D2F54
:10734F000D0A202046322D42454C4C204C4F4E47C3
:10735F002F53484F52542F4E4F4E45202046332D1A
:10736F00545950414D41544943204F522F4F46469B
:10737F0050474D2046554E4354494F4E533A205394
:10738F00454C454354205020202020204B45592F464310
:10739F004F4D4D415558314155583250474D20446E
:1073AF004542554700090505090 50A11011B01044E
:1073BF00200106390102 3C01030A01010C010218E8
:1073CF0001041D0105230104360102701030A01DD
:0173DF0001AC
:0600000150524 34E54432F
:1073E000EB73E5F50E80CDEC73F1E1C90600FDE528
:1073F000FD2AFA42FDCB056E20020604119774FDAA
:1074000021957 47EFDBE00381AFDBE01301BFD962D
:107410000 0FDE1E526006F195E78E6FF2824CB3BEE
:107420000518F6FE203002CBC1FDE1CD7F74300897
:1074300 0CBE1CB41C0CBE9C93A0F3ECB47C8CBD952
:1074400018F3E1CD7F74300BCBE1CBE9C9CB79C028
:107450000CBC9C93A2753CB672007CB4328EFCBD101
:107460000C9CB79200FCB5B2804CBD9CBE9CB5328F0
:1074700008CBD1C9CB4B20F9C9CB5928D0C9C93ABF
:10748000F543FE013A27532804CB672006CB772823
:1074900 0237C9B7C92A7F7070707070303030778A
:1074A00003332222222223333FFFF77333320777CF
:1074B0007777702233777777777FF33777733773340
:1074C0000000000000777777773333333300007777 26
:1074D00077777777777770000000005577333333528
:0C74E00077773330883077003333333354
:06000001434D44424C4B424C
:1073E000EB73E5F50E80CDEC73F1E1C906003A0FC1
:1073F0003ECB472002060411A574FDE5FD21A374D0
:107400007ECB79200DFE7320093A043ECB4F20023B
:10741000360 97EFDBE00381AFDBE01301BFD960008
:10742000FDE1E526006F195E78E6FF2824CB3B05D9
:1074300018F6FE203002CBC1FDE1CD8D743008CBB3
:10744000E1CB41C0CBE9C93A0F3ECB47C8CBD918F5
:10745000F3E1CD8D74300BCBE1CBE9C9CB79C0CB57
:10746000C9C93A2753CB672007CB4328EFCBD1C9F3
:10747000CB79200FCB5B2804CBD9CBE9CB532808A1
:10748000CBD1C9CB4B20F9C9CB5928D0C93AF54348
:10749000FE013A27532804CB672006CB7728023712
:1074A000C9B7C92A7FFBFBFBFB333333FB00333C
:1074B000222222223333FFFB8833332 2FBFBFBFBE8
:1074C0000002233FB888888FB33888888888 3300005 3
:1074D000000FB333333333333330000FBFBFBFB60
:1074E000FBFBFBFB880000000007777333300FBFBDE
:0A74F00033338833FB0033333333AA
:06000001434D4443485248
:1074FA00FE741875DD7E00CB7F2809CB77280A2118
:10750A00F0431E0821F[illegible]1E0321F1437EC9C5014B

```
:10751A003043DDCB007E2003019043B7ED42DD4EC0
:08752A00010600ED427DC1C91C
:0600000147455442 4C4C3F
:1074FA00FC74210D7516005F197EF578E6F047F1E8
:0D750A00B047C90007080904050601020387
:06000001544 54C434F562C
:1074FA00FE740D75FD7E00E63FCBFF321947AF32B1
:10750A001A47C9FD7E00E63FCBFF321A47AF321950
:02751A0047C95F
:06000001415 4544F52412E
:1074FA000175FE74CD1260AF474FED436D49CD94CF
:08750A006CCD066CCD886CC944
:0600000152444845414451
:1074FA00FC74D721483E7EE67FD62028055723CD47
:04750A004A6CCFC92F
:0600000152414248495340
:0B74FA00FC74ED4B3647ED433447C9EE
:06000001494E5343555225
:1074FA00FC74CD946CCD066CCD686CCD886C16028C
:10750A0021BB49CD2E6CFD21B549ED4B3447FD70A9
:10751A0000FD7101CD6B63CD636321B749CD2E6C3C
:04752A00CD8F6CC9CC
:0600000152435552504F1E
:1074FA00FC7421413EFD46007023FD7E017723FD89
:04750A007E0277C9BD
:0600000153455443544C2A
:1074FA00FC74FD7E00E63FF5FD7E010F0FE6C0C17C
:02750A00B0C906
:0600000141444A54574F30
:1074FA000075137 51E753A303E67E61FFE1FC83EBB
:10750A0001843 2303ECD7460C93A303E67E61FC806
:10751A003EFF18ED0600CBE03A023EA832023E18C2
:01752A00E47C
:0600000142524947485439
:1074FA00FE740D7521403ECBDE3E0E320B75CD3B40
:0C750A006D00C921403ECB9E3E1118EFE1
:06000001494E534D4F442F
:1074FA00FC7421320 0ED5BF54216001BCD1F523E93
:0E750A0001F3322D43322E43AF322C43FBC926
:060000014552534D534729
:1074FA00FE741C75AFF5FD7E01E61FCD3A52D038F9
:10750A0015E5DDE1F1B72005DDCB00FEC9DDCB00D5
:0B751A00BEC93E0118DFF1CD3460C98E
:060000014C4F4B46524D2E
:1074FA00FE742775AFF5FD7E00E61FCD3A52D038EF
:10750A0020FD7E01E61FCD3A52D83815E5DDE1F1BE
:10751A00B72005DDCB05FEC9DDCB05BEC93E011886
:06752A00D4F1CD3460C96C
:0600000150525452454725
:1075320036754A75FD660FFD6E0EFD7E08FD7704F9
:10754200FD7E09FD77051803CDA3753E08CD3C608D
:10755200AFB828053E20B82037E5FD4606FD4E07A8
:10756200FD6604FD6E05AFED42E1C8FD7E05B72064
:1075720019FD3504FD6601FD6E00010B00097EFD5B
:1075820077 05CD3E00CDA37518C1FD35052B18BB7F
:10759200F5FD6604FD6E05CB6928012B226549F1D4
:0875A200C9FD660BFD6E0AC96C
:060000014E4F4E554C4C21
:1075320036757775DDE5E5DDE1FD2108473AF5426F
```

```
:10754200FD7702DD7E01B728033D18033AF542FDBF
:107552007703DD7E02FD7704DD7E03FD7705DD7EA8
:1075620004FD7706DD7E05FD77073E0EFD7700CD33
:107572003C60DDE1C92120473A1F47962E40FE407C
:0D7582003804D6402E4167CBF422373EC9B5
:06000001444953465240D34
:1075320036755E75D7CD3A52A6160D21373EAFCDC0
:107542002E6CB7200F3E40323C3E21403ECB8E2176
:107552003D3ECB8ECD8F6CCD4F6CCFC9D7CD3A523D
:0A756200A6162E21023E3E0118D5A8
:060000015254475244433 3
:107532003A7568756E758C75DD2AFA42DD7E00E655
:10754200C0FEC02008AF3D32323E32333EAF3DDD99
:1075520077 0DDD770E328A4A32894A3E0132BD49C1
:107562003E01322E43C93E0132BD49C93A3447DD9C
:107572002AFA4247DD7E00E6C0FEC078200332329E
:107582003EDD770D32894AAF18D33A3447F5D60833
:1075920032BE49DD2AFA42F147DD7E00E6C0FEC076
:0E75A2007820033 2333EDD770E328A4A18D944
:060000014D415247494E3B
:1075320036753975AF18023E01F53A053EE601F59A
:10754200CD636306004AFDE5E111B749EDB0F1C62E
:1075520002FD21B549CD5C63DD2AFA42DD4601DD3B
:107562007E0290FD4600903819FD4E01DD7E0B91A2
:107572003810F1B72006ED433647B7C9ED4334471B
:0A758200B7C9F121403ECBCE37C956
:06000001534554424341 47
:107532003A75667590755F75DD2AFA42DDCB057680
:10754200281EDD7E03B72818CD9375C5DD7E039016
:1075520005280 4CD3A52B6F1CD3A52B0C94718EBDC
:10756200CD3460C9DD2AFA42DDCB057628F2DD7E14
:1075720002DD9601DD960428E7CD9375C50528083E
:10758200DD7E043CCD3A52B6F1CD3A52AFC947182E
:10759200EB47DD7E05E61FED44DD86063CB8D047AD
:0175A200C91F
:0600000150525650414729
:107532003475CD0A63CD51633E08CD3C60C5CD8B19
:1075420068C1386BED43B575CB692806CD5875CD4A
:107552002F63CD5875C9FD6E0AFD660BE5E5D12393
:10756200FD46120528053E0CCD3C60E1FD4E12069B
:1075720000092B3A6049CB4F20073A043ECB5728EB
:1075820024FDCB024E201EE5FD3404FD360500CD60
:107592003E00FD6E0AFD660B3E08CD3C60E13E03F7
:1075A200CD3C6018B1ED4BFE423E03CD3C60C9CDEF
:0375B2003460C979
:0600000144454C43485247
:107532003A754275A175C97521CC753600C5181CFE
:10754200C5213043DDCB007E2003219043DD4E0276
:10755200060009 4F7E127921CC75360121 3043DDB8
:10756200CB007E2003219043DD4E010600094F0926
:107572003ACC75B720027E12EBDD7E02DD960191D8
:107582004F06002817 21CC75CB46280B6F26001911
:10759200E5D12BEDB81805D5E123EDB0F112C93EC6
:1075A20016F5DD4E0B0C59D5DDE5D1CD5300C1E505
:1075B200CD5300EBE10601DD7E00E6C0FEC02001F6
:0A75C20004F1B7C43C60C9AF18D74C
:06000001534846415554 2E
:107532003A7543757275 6D75F53A3AEE61F281F26
:10754200F1213A47B7C8D55F3A2C3EE61FBB38183F
```

:107552007B110600193D20FCCB6E280CD1B7C92A3D
:107562006F49F1B728F737C9D137C9C5D5F5180A18
:10757200C5D5F53A3A3EE61F282F7EE61F21404741
:1075820028074711C0001910FD111000F1B7280C8F
:10759200473A2D3EE61FB8380C1910FDD1C17EE6E0
:1075A200C02804B7C9D1C137C9F1D1C1B720F82A5F
:0475B200FA42B7C919
:060000014C4F4346524D36
:1075320034753AB570DD215F7521637506030E302F
:1075420096FA49750C18F986DD7100DD232310EED9
:10755200214B00115E7506053E04DFC95B00000089
:047562005D640A0159
:0600000157525444E434C1F
:0E7532003475D7FD213E753E15DFCFC9000030
:060000015253544434D531D
:1075320053753675 2A3447E52A3647E5210000227D
:107542003447223647CD5375E1223647E12234478C
:10755200C9CD0A63DD2AFA422A3647E52A3447E5CD
:10756200CD8B683846DDCB05762840AFFDCB024691
:107572002803FD7E07323447324549CD2F63FDCBC8
:10758200024E20153A4549215F49B62006CD3A52AE
:10759200F5180ACD3A52F41804CD3A523DE1D13AE7
:1075A20045496F223447ED533647C9CD3460E1D1A6
:0275B20018F1CE
:060000001494E534C494E2C
:1075320053753675 2A3447E52A3647E5210000227D
:107542003447223647CD5375E1223647E12234478C
:10755200C9CD0A63DD2AFA422A3647E52A3447E5CD
:10756200CD8B683846DDCB05762840AFFDCB024691
:107572002803FD7E07323447324549CD2F63FDCBC8
:10758200024E200F3A4549215F49B6200CCD3A52AE
:10759200F2180ACD3A523D1804CD3A52F1E1D13AED
:1075A20045496F223447ED533647C9CD3460E1D1A6
:0275B20018F1CE
:06000000144454C4C494E41
:1075CD00D375EF750176DD7E00CD1176DD21143E8C
:1075DD00DD7E00CD1176F5F1CD38603E01B7C9F1F4
:1075ED00AFC9CD0376CD1176DD21143ECD0376CD19
:1075FD001176 18E218E2DD7E00F5E61CCB3F47F16F
:10760D00E601B0C9CB4FC8CD4B76CB5F2018CB4729
:10761D007A280ACD647628BF1D1D20F7C94623B8E8
:10762D0028B51D20F8C9CB477A280ACD647628AF36
:10763D001D1D20F7C94623B828A51D20F8C92117FF
:10764D003EF5DD7E01E67FD62006004F09DD7E0288
:10765D00E67FD6205FF1C946234E23CD6C76C9D582
:10766D001E01B8FA7D765779BA7AFA7D761DD1C9A1
:03767D001CD1C954
:060000014348524544 4350
:1075CD00E375DF752276B776FE757276A476CD34C7
:1075DD0060C91E011802 1EFFFD2A6F49FDCB007EFA
:1075ED0020ECFD7E00E61F83FADB75CD3A52D038D4
:1075FD00DD226F49CD3A52832A6F49AFCD3A52D829
:10760D0022FA42E5DDE1DDCB057E2859CDB776D0F6
:10761D002AFA4218 5001F0FF1EFF2AFA427EE61F99
:10762D0083FAB276573A2D3EE61FBA387809E5FD52
:10763D00E1FD7E00E6C0286DFDCB057E20DFE53A3D
:10764D003847FEFF281EED4B3847ED5BFA42CD5310
:10765D0003E08CD3C603E1FB82009ED4BFE423E7A
:10766D003CD3C60E122FA42E5DDE1DD7E0D32899C

```
:10767D004ADD7E0E328A4AFEFF2003DD7E0BD607E1
:10768D0032BE49CD386521FFFF2238473E01322EEB
:10769D0043CD3A5272B7C92A6F49FD7E00E61FCD20
:1076AD003A52D83099CD346037C90110001E01C34C
:0276BD0027762E
:0600000150525646524D1C
:1075CD009C761576D7757676A976CD1576D7FD4E40
:1075DD0008FD4609FD6E06FD66073E02CD3C60FDC9
:1075ED005E01FD5602D5DDE1DD7E00E6C0FD5E04E7
:1075FD00FD5605D5DDE1DDA600FEC020090100002B
:10760D002B3E02CD3C60CFC9D7FD5E04FD5605D59E
:10761D00DDE1FD46030E00CD5300CBFCDDCB007E3E
:10762D002816E5FD7E03212147CDA976CD81633E48
:10763D0000E12808CBEC1804CBEC3E01FD7508FDEC
:10764D007409FD5E01FD5602D5DDE1FD4600DD4EFE
:10765D000BB720083CDDCB007628013C814FCD5384
:10766D0000FD7506FD7407CFC9DDE5D1FD219749F4
:10767D00FD7301FD7202FD7304FD7205FD77003C83
:10768D00FD7703CDD775FD3400FD340310F5C9DD4D
:10769D007E02DD9601C847AFCD7676C9E5C52130AE
:1076AD0043DDCB007E20032190434F060009DD4EC4
:0676BD0001097EC1E1C9D4
:0600000143484149E2A6C
:1075CD00EB75F575FB752176837658 76DF750E763E
:1075DD006C763A313E0600CBF0A832313EC9CD086B
:1075ED0076D821313ECBEEC921313ECBAEC9CD0887
:1075FD0076D83A313E0600CBE818DE3A1F47FE1921
:10760D00C93A313E0600CBC8A832313EE606F670C7
:10761D00CDFE5FC93A033EE62047FD6E00FD6601D3
:10762D0022023E7CE620B82814217A3EB72004368B
:10763D00801802367423061036202310FBFD6E02CF
:10764D00FD660322043E3A313E18C1C5D1DD212F1E
:10765D00530600FD4E00CD6B52FD231D20F5C921B3
:10766D000000ED5BF54216001BCD1F52AF322C43CF
:10767D0021313ECB9EC921313ECBDEAF322C433A78
:08768D00F942EE0132F842C996
:060000014D4953434D443C
:1075CD00CF75FDE5CD3663ED4B3647FD7004FD718E
:1075DD0005FDE5DDE1FDE1CD3A5290CB772802CBFB
:1075ED00BFDD7703DDE5FDE1CDFD75D0CD3460C99F
:1075FD00D7FD7E03326049CD3E00FD6E10FD661154
:10760D00E5DDE1DD7E00FDBE042008DD7E01FDBE71
:10761D000528652ACE4911030019ED5BD249B7EB58
:10762D00ED52DAB976ED53CE49DDE5E1EBB7ED522A
:10763D00110300ED52ED52280FE5C12ACE492BE57D
:10764D00ED52D1EDB82318052ACE49ED52E5FD6E68
:10765D0000FD6601E5DDE1CDAA763A2D3EE61F4738
:10766D00DD7E00E61F90280E111000DD19CD9A76F3
:10767D00CDAA763C20F5DDE1FD7E04DD7700FD7EB3
:10768D0005DD77013A6049DD7702CFB7C9C506033D
:10769D00DD34072003DD340810F6C1C9C9C5060362
:1076AD00DD34092003DD340A10F6C1C9FDCB02DE3D
:0876BD0021393ECBEECF37C9A5
:060000015354524644442A
:1075CD00DE75D3757C76D72A3647E52A3447E5181C
:1075DD001DD72A3647E52A3447E5FDE5CD0A63CDAB
:1075ED003A52A6FDE1CD7C76FD4600FD4E01ED5BE8
:1075FD00FA422A3647AFED42380F280DCD8F6CE198
```

:10760D00223447E1223647CFC9D5FDE1FD6E0BFD92
:10761D007E02FD960167AFED4238E1FD21A149FDE6
:10762D007300FD7201FD7004FD7105CD3E00CD3A74
:10763D00529D200BCD440038C3CD3A529B18F32AEE
:10764D006549ED4B3647AFED422803FA0976FD70DB
:10765D0004FD7105CD3E00CD3A52AE2005CD410061
:10766D0018F5CD8F6CE1223447E1223647CFC9C5DD
:10767D003A053EE601CD6363C602FDE5FD212E47C9
:10768D00E1FDE546FD700223FD231520F6FDE1CD5C
:04769D005C63C1C9A0
:0600000152444144525339
:1075CD00CF757932B37B2ACE4922CB7BFD7E00E687
:1075DD001F32AF7B4F3A3A3EE61FB9C2A2763A2C24
:1075ED003EE61FB9DA987679CD3A52D722B07BE5CF
:1075FD00DDE10606CD9E632AB07BAFCD3A52D9228E
:10760D00B67B22B87B06C0CD9E633AAF7BDD77009B
:10761D00FD6601FD6E02CD9B7B7D32B27B3A1F472D
:10762D00ED5B204793BD38637B32BA7B32BB7BFD6C
:10763D007E03E603FE032018FD6E05FD6604CD9B5B
:10764D007B3AF542BD384E7DB5284ADD75011804EB
:10765D00DD360184FDCB03562804DDCB00FEAFDD06
:10766D007702DD7703DD7704DD77050106 00CD5761
:10767D007BB7201C21000022B47B22BC7B21BE7B6A
:10768D00060DCD9E63DD2AB67BB7C9AFCBCF1808EB
:0A769D00AFCBD71803AFCBE737C916
:060000014445464652 4D45
:1075CD00D1756E76260011DE75EB19195E2356EB1B
:1075DD00E9F57519764C5441203D205B41424D2013
:1075ED003D205BCDEF6C2CC9AF32B870CDF075116D
:1075FD00E2750607CD677611453E3E0A32B6703A02
:10760D00443ED62032B470473E0318233E0132B8B3
:10761D0070CDF07511E9750607CD677611493E3EBF
:10762D002732B6703A483ED62032B470473E20908D
:10763D0032B5702107003EFF32B77078B7C46A7655
:10764D007D32B270065D3E03DFCD3A52DD3E07322C
:10765D00B17032B370CD3A52E1C92100003E04DF62
:10766D00C9217B3E1100003DC8F57ED62006004F96
:0B767D00E5D5E109E5D1E123F118ECAF
:060000014C5441424D4346
:1075CD00D1758A76260011DE75EB19195E2356EBFF
:1075DD00E9EA754F769B76A676F275F2753AB77035
:1075ED002F32B770C9CD8E703ABB70FE80F2977690
:1075FD003AB770B720173AB17021B270BECA9776FC
:10760D006F26003ABB70473E03DFC39B763AB570D9
:10761D00B728773AB27021B670BE286E21B2703499
:10762D0021B4703421B57035CD3A52DD3AB170F5D3
:10763D006F26003C5F16003AB270C190473E0BDFDB
:10764D0018B4CD8E703AB17021B270BE283CE55F92
:10765D001600473C6F26003AB27090473E0CDFE1B2
:10766D006E260006203E03DF21B2703521B5703441
:10767D00CD3A52DD21B47035180 3CD8E70CD3A520E
:10768D00DC3AB1706F26003E01DFCD9670C921B195
:10769D00703AB270BEC83418E121B1703AB370BE01
:0476AD00C83518D6EE
:0600000149444 34F4E4646
:1075CD00CF75C9FFA0462055204E204320542049 99
:1075DD00204F204E2053FF0B48204F20532054FFA7
:1075ED000B41205520582031FF1BFFA05350454 51E

:1075FD00443AFF4A504152495459 3AFF4944555073
:10760D004C45583AFF4953544F5020424954533A30
:10761D00FF46444556494345205459504 53AFF9439
:10762D0052435620112F133AFF4843485220 4D4FD5
:10763D0044453AFF47434F4D4D204F50543AFF4775
:10764D004C5441204F4E200D3AFF47444953204F93
:10765D004E3AFF494449532049 4E4143543AFF465F
:10766D004155544F2D545249473AFF464641494CD6
:10767D005341464 53AFF4752435620504152 4954D3
:10768D00593AFF95434F4C3AFF4C4552415345 3AB9
:10769D00FF4A534B49503AFF4B43485220575241F2
:0676AD00503AFF47FFFF09
:06000001534D444154 4413F
:1075CD00D875D1752100003E0218052132003E010B
:1075DD00329276793291 76E5ED5BF54216001BCD50
:1075ED001F52E13A9176B72847AF328F76329076B7
:1075FD00FD7E00FE072842FE0E2845FE0F284BFE9D
:10760D001B200FFD7E01FE342857FE79283FFE7AA0
:10761D002848ED4B8F76B0473E02CD3C6023CB69B9
:10762D002801237DED5BF542933005CD857620C095
:10763D003A9276F3322C43FBC9D73E24DFCF18E3C1
:10764D003A9076CBFF32907618D9AF18F83A8F76FC
:10765D00CBF7328F76CD857618C93A8F76CBB718A2
:10766D00F1FD7E02E63FED4B8F76CB712802CBF715
:10767D00328F76CD857618DDFD233A91763D3291A8
:06768D0076C900000000B8
:06000001575254 4D534715
:1075CD00CF7526001 1DC75EB19195E2356EBE9E03A
:1075DD00754D76CD417611F77521000006 0AC5016E
:1075ED0002073E05DF23C110F5C946312D4C4F4F23
:1075FD005046322D434F4D4D46332D535953204652
:10760D00342D524F4D5346352D505249204636 2D6F
:10761D00414C542046372D5343332046382D534388
:10762D00312046392D53433220463130 2D4D454DB5
:10763D0057414954 4CDEF6C2CC93E04210000DFC9E0
:10764D003ABB70FE312827FE32282CFE33282FFE40
:10765D0034282BFE352827FE362823FE37281FFE1B
:10766D0038281BFE392817FE3A2840C3E0753E0125
:10767D0032013B32E75CC9AF18F6491B28003ABB13
:10768D0070C610328A76CD4176113D763E050111D8
:10769D0004CD48760104001100482187 76EDB00134
:1076AD000400FD210048CD3A5247C9F3CD1260C701
:060000014447 4E53545326
:1076C500E376C976D7325749CD0A63FD210847FDD0
:1076D50036001 1DD2AFA42AF325E49C37177D7CD44
:1076E5000A633E01325749DD2AFA423E0F21313EF7
:1076F500CB6E20023E11FD210847FD7700DD7E029D
:10770500DD9601DDBE04201CDDCB056EC2E778CD1C
:107715003A52B7225A49325C49CD3A52B9325D499B
:107725003E011801AF325E49CDEC782021CDF278CB
:10773500203ACDB16C20323A2753CB672805CDB618
:107745006C20293A363ECBFF32363ECD5C77CD0EE6
:107755 0001AF32003A1815DD7E04DD4E039147ED89
:10776500435849C8CD3A5289C9CD5C77FD210847B0
:10777500DD7E00E6C0FEC03E0120023E02FD77022E
:10778500DD46043A5E49B72806ED5B5C4918053AC3
:1077950057498057CD3A52BAFD219749ED5BFA42D8
:1077A500FD7301FD7202FD7304FD7205DD7E04FDAE

```
:1077B50077003CFD77033A5E49B728063A5D49FDF7
:1077C5007703CD3A5288DD219749FD210847DD6EC3
:1077D50008DD6609DD5E06DD5607FD7E02FE022038
:1077E500011BFD7303FD7204F5CDF2782002CBF485
:1077F500F1110000200 1EBFD7505FD7406FD730711
:10780500FD7208DD2AFA42DD7E03CD3A5285CDF2BE
:1078150078200 9CBF2D5C13E02CD3C603A5E49B72E
:107825002821DD7E03DDBE042019010500FD7E0251
:10783500FE022003010700FD09FD5E00FD5601CB98
:10784500B2180CDD7E03ED4B574981CD3A5285FDCB
:10785500210847FD750AFD740BFD730CFD720DFDC6
:1078650036090 1CDF2782804CD3A52F6CD3C60CDEB
:10787500B16C280ECDF2782009ED4B584904CD3A6C
:10788500528A3A5E49B72813AFCD0852AFED5B5A1D
:1078950049ED4B5B49CD3A52BB1819ED4B5749DDC4
:1078A5007E0381DD7703DD7E0481DD77043A35478C
:1078B50081323547CDEC78280C3ACA40FEFF28F4D2
:1078C500FE85CAE776CDCF78CFC9CDF278C0CDB1E8
:1078D5006CC0DD4604040E00CD3A528A21363ECBFB
:1078E500BEC9CD346018DE3A363ECB7FC9FD7E0079
:0378F500FE0FC9BA
:060000015343524C465728
:1076C500C776CD3A52B7225A49325C49CD3A52B9BA
:1076D500325D49FD219749ED5BFA42FD7301FD726B
:1076E500023A5D49FD7700FD7304FD72053A3547A1
:1076F500FD7703CD3A528C3A3547DDBE03281C3D54
:10770500FD77003A5D49FD7703CD3A5288FD6E0657
:10771500FD6607FD5E08FD560918073A5D49CD3A35
:1077250005285FD210847FD36000DFD360201FD7528
:1077350003FD7404FD7305FD7206DD46043A354705
:10774500B82006ED5B5C4918025015CD3A52C9FDCB
:107755007009FD750AFD740BFD730CFD720D3E0D70
:10776500CD3C60DD7E02DD9601CD0852ED5B5A49C8
:0C7775003A3547ED4B5B49CD3A52BCC998
:06000001494E53505452L9
:1076C500C776CD3A52B7225A49325C49CD3A52B9BA
:1076D500325D49FD219749ED5BFA42FD7301FD726B
:1076E50002FD7304FD7205DD7E02DD9601DDBE043B
:1076F5002861DD46045014C5D5CD3A52BAD1C1FD35
:107705007000FD7203CD3A5288FD6E06FD6607FDD9
:107715005E08FD5609FD210847DD7E00E6C0FEC076
:10772500201BFD3602022BFD7503FD7404FD360595
:1077350000FD360600FD7307FD72081810FD3602C0
:107745000 1FD7503FD7404FD7305FD7206FD36002C
:107755000D180747ED5B5C49189D3A3547DDBE03BB
:107765002809473D57CD3A52C91829DDBE022005E3
:107775003A5D4918013CCD3A5285FD750AFD740BF9
:10778500FD730CFD720DFD360901FD360011CD3A74
:1077950052F61813FD210847FD7009FD750AFD74A1
:1077A5000BFD730CFD720DFD7E00CD3C603A354737
:1077B500CD0852ED5B5A493A3547ED4B5B49CD3A19
:0377C50052BBC9EB
:0600000144454C5054522E
:1076C500CF765377847 86F779C783E01324349CDE6
:1076D5000A63CD8B68383BCDDD78CD3E00CD58773C
:1076E5003A4449FE022833FD6E0AFD660BFD46123B
:1076F50011104 80E003A0579CD3C603A4349FE0227
:107705002813FDCB024E200DFD3404FD360500C3C4
```

```
:10771500DF76CD3460AF324349C9FD4E12CD2777B0
:1077250018D9FD5E05FD5604D5FD7E02F5FDE5FD86
:107735002110 48CDB16C2805CD5F611803CD756169
:10774500FDE1F1FD7702D1FD7305FD7204C93E022D
:10775500C3D1763EDE326D7718053E9E326D77FDDC
:107765006E10FD66112323CBDEC93E013244492A42
:107775003647E5CD3A5258ED4B3647E1223647DAE2
:107785001777DD2AFA42DD7E02DD960167DD6E0B95
:1077950022067 9B7ED42DA17772A3647ED423813D4
:1077A5002811C5ED4B06792A3647CDC37721000050
:1077B500C118032A3647CDC377AF324449C9ED43D3
:1077C5004149ED5B3447D5223447CD2F632A4149E2
:1077D500FD5E05FD5604B7ED52DA7F783A4449FE61
:1077E5000228 0AFD7E03E603FE03CA79782A414989
:1077F500FD5E09FD5608B7ED52306CFD4E05FD46A0
:1078050042A4149B7ED423871FD6E1226002B0955
:10781500ED5B4149EBB7ED523034C5CDD78C13A6A
:107825004449FE02281B3A4149FD96053C470E0096
:10783500FD6E0AFD660B1110483A0579CD3C6018BE
:10784500392A4149B7ED422C4DCD2777182CFD46F5
:1078550004FD4E05ED433447CD5377FD3404FD3625
:107865000500CD3E001894FD4604FD4E05ED43345C
:1078750047CDCF76CD4100D2D277E1223447C9DD5D
:107885002AFA42DD4604DD4E0B2A34473E013244D6
:1078950049CDC377C3BE773E02324449FD7E0032EF
:1078A5000479FD232A3447E52A3647E5DD2AFA42DD
:1078B500DD4603C5CD7477DD2AFA42F1DD9603284E
:1078C5000E3806CD3A52F81806ED44CD3A52F9E194
:1078D500223647E1223447C93E05DDCB056E280235
:1078E5003E043205793A4449FE023AFF4220033A02
:0F78F500047921104877E5D113018400EDB0C963
:060000014552415345 5237
:1076C500CB76637871783E60323A3E3E4032393E41
:1076D500AF321847321947321A47322C43325F49C5
:1076E5003A3B3EF5CB8F323B3ECD74603E40323F58
:1076F5003E3A2B3ECB473E092801AF324049CD3BB0
:107705006D0A3E5021403ECB6E28033A343E4F323F
:10771500F5422A11402306000303 1EFFB7ED423848
:10772500031C18F97B3D32F14332F2433D32F043FD
:10773500FE1830013D321F47FE1830142131 3ECB73
:10774500AE3AF542FE502008325F493E18321F47D7
:10775500AF322047CD3A52CCCD126932F642D378BA
:10776500060D212147CD9E6321053EAFCB4E280254
:107775003E2032FF42210000ED5B1140CD1F52211A
:1077850030431190430660AF12773C132310F92A5A
:10779500D049AF77237723772322CE4921004 8119B
:1077A5003B47B7ED52E5C121FFFF193600EDB0FDAE
:1077B5002171493AF542FD7701C602FD7702AFFD19
:1077C5007704FD7705CBFFFD7703FD226F49117720
:1077D5004921874901 1000EDB0DD217749DD3600EB
:1077E500C03A1F473DDD7702FE173006DD7704DD21
:1077F5007706DD22FA423AF542473DDD770B3A320C
:107805003EDD770D3A333EDD770ECD3A5284DD7E8F
:1078150002FE173016FD219749FD77003CFD7703E1
:10782500CD3A528CFD3400CD3A528C2A6F49CD3A6F
:1078350052832AFA42CD3A52CA2A3447223647CDD4
:107845004B61213 13ECB5E28083AF942EE0132F810
:1078550042F1323B3ECD74603E4C325549C93E50F3
```

```
:10786500021403ECBAE32F542CDCB76C93E84214098
:0578750003ECBEE18F00F
:060000014552534 14C4C36
:1076C500E376C976D7325749CD0A63FD210847FDD0
:1076D50036001 2DD2AFA42AF325E49C36277D721FE
:1076E50000002269 49CD0A633E01325749DD2AFA75
:1076F500423E102131 3ECB6E20023E12FD2108474D
:10770500FD7700DD7E03B7200BDDCB056EC2CA78A1
:107715003E011801AF325E49CDC4782021CDCF7826
:10772500203BCDB16C20333A2753CB672805CDB626
:107735006C202A3A363ECBFF32363ECD4C77CD0E05
:1077450001AF32003A1816DD7E04DD4E030DF25707
:10775500770C9147C8CD3A5289C9CD4C77DDE5D133
:10776500FD219749FD7301FD7202FD7304FD72054C
:10777500DD7E03FD77033DF28D77CD3A52B7225A70
:10778500493 25C49CD3A52B9325D49FD7700CD3A6F
:10779500528CFD6E06FD6607FD4E08FD4609FD216E
:1077A5000847CDCF782007CBF03E02CD3C603A5E4E
:1077B50049B73A5D492008DD7E03ED4B574991CD28
:1077C5003A5285226949ED536B49FD210847FD75FC
:1077D50003FD7404CDCF782002CBF2FD7305FD7255
:1077E5006FD360201DD7E00E6C0FEC03E01200238
:1077F5003E02FD7709DD4E0B0CDD4604ED43D578E1
:10780500DDE5D1CD53003E08CD3C60CBB0FD710C1C
:10781500FD700DED4BD5783A5749ED4480F2287847
:107825003A5D4947CD5300FD750AFD740BED4BD507
:10783500780CCD53003E08CD3C60CBB0FD710EFDFC
:10784500700FFD7E00CD3C603A5E49B72818DD7E9D
:107855002DD9601CD0852AFED5B5A49ED4B5B4910
:10786500CD3A52BC1819ED4B5749DD7E0391DD77B2
:1078750003DD7E0491DD77043A3547913 23547CDF6
:10788500C478280C3ACA40FEFF28F4FE86CAED7675
:10789500CD9A78CFC9CDCF78C0CDB16CC021363E59
:1078A500CBBE2A69497CB5C8ED4B6B493E02CD3C40
:1078B50060DD7E04DD4E03914704CD3A528AC93A14
:1078C500363ECB7FC9CD346018C6FD7E00FE10C99B
:060000015343524C42572C
:1076C500CB76D576CF76AF3D1807AF32464918133E
:1076D500AF324649014949CDC577E5FDE1014D493F
:1076E500CDC577CD08780478324F493E01324849F7
:1076F500324749ED4B364778324B4979324C49CDC3
:107705002F63FD7E08325449FDE5FD214849FD4EB4
:1077150004ED5B4F49D5CDF677FD2BFD4E04ED5BB2
:107725005449CDF677FD23FD4E06D1CDF677FD2BD9
:10773500FD4E06ED5B5449CDF677ED5BFA423A4BCB
:1077450049ED4B4D49B93003CDD3773A4C49ED4B13
:107755004E49B93005FD23CDD377FDE1FD7300FD1D
:107765007201ED4B3647FD7004FD7105CD3E00DD20
:107775002152493A4949DD77003A4B49473A4C4944
:107785004FCD5300225049E53A4D49473A4E494FAE
:10779500CD5300E5D1E13A4A4947C506153A464970
:1077A50080473A484980C1CD3C60DD3500C8FDE5DC
:1077B500FD214749CDDF77FDE1ED5BFA42C37E77D9
:1077C500CD3A52A7FD7E000203FD7E0102C9FD6E82
:1077D50002CDE6773EFFFD7700C9FD6E00CDE77768
:1077E500C92DFD7E0485FD7704FD7E0685FD7706A2
:1077F500C91CFD7E02813804477BB8D01D7B91FDF5
:0B78050077 02C9F53AF5423D47F1C992
```

:0600000014D4350424F5830
:1076C500DF76000040001177267726772777907 7B9
:1076D500F876FD76027770777 0C77AFF332FD4CFB32
:1076E500320847FD7E00E63FFE0AF021CB76CDCA83
:1076F50000EBE9CD3A52EAC9CD3A52EBC9CD3A523F
:10770500ECC9CD3A52EDC9CD3A52EEC9CD3A52E85F
:10771500F3CD3A52C5CD3A52C6FBDD21F54CCD83AA
:1077250060C9CD86783E35320B473E40210C477700
:107735003A0700F523773A2F002377D1A2FEFFCC35
:107745007377FD210000FDE5E11100103E1BDF7D93
:10775500B4C48177210C47160306 00CD807828250F
:10776500CD2E6CCD8E78DD21F54CCD8360C9210CF5
:10777500477EDBC7773E2023772377C93A0C47CB83
:10778500CF320C47C9CD3A52AA18D8CD8678AF3238
:107795000B473E40FD210C47FD7700CDD071607FE
:1077A500210C47CD80783A0B47472819CD2E6C3AE6
:1077B5000B473C320B47FE0820D8CD8E78DD21F5EE
:1077C5004CCD8360C9CD3A52AA18E43A0B47473EDF
:1077D50012FD211940FD360000FD7001DFFE002875
:1077E50017FD210C47FDCB00C6FDCB00CE0606FDDF
:1077F500360120FD2310F8C9DD210000FD21000020
:107805000680C5FDE501800021004 83A0B4757FD7C
:107815002226403E1FDFDDE5E1FD21004811800005
:107825003E1BDFE5DDE1FDE1018000FD09C110D270
:10783500DE5E17CA520021805210C47CBCE210210
:1078450000222 6403A0B4757010600210C47233EEC
:107855001FDFFD210C47FD7E06F5FD7E05F50604BF
:10786500FD210C47FD7E04FD7706FD2B10F6F1FD8D
:10787500210C47FD7701F1FD7702C93A2753CB6704
:10788500C9CD8078C43A52A6C9CD8078C48F6CC959
:06000000145584555453541C
:1076C500D376E276117740775277000040000E02BC
:1076D5003E30320B47210C473EFF77182D3E3132A5
:1076E5000B47CDF6783A313ECB7FCAEC78F5AF3211
:1076F500 0847F10E00210C473E0277233E01772310
:107705003E007723AF77233EFF77182D3E32320BAD
:1077150047CDF6783A2B3ECB4FC2EC78F5AF320821
:1077250047F10E04210C473E0277233E1077233E96
:10773500047723AF77233EFF771824CD03793E33B3
:10774500320B470E01210C473EFF771812CD037906
:107755003E34320B470E05210C473EFF771800C516.
:10776500CDDD78C1CD8C7716030600210C47CDD72A
:1077750078280ECD2E6CCDE578DD21F54CCD8360D6
:10778500C9CD3A52AA18EF2100002269 49060E1602
:1077950001E08210048CD6D7810F61E082100480E
:1077A500E5CD6D78FDE1FDE5FD2B0608D5CD8578A8
:1077B500D1226B49C57C45A0FEFF200E3AD176CB80
:1077C500C732D176212020226B49C11E08E1E5CDC3
:1077D5003A52A9FDE1FDE5FD2B0608D5CD8578D109
:1077E500FDE1E5FDE5D5C5FD2B06080E1F111000D1
:1077F500FD19FD7E00A1FD77001 0F5C1D1FDE11158
:10780500800 02A6949CDC578D13A0B47FE31283722
:10781500FE322833AFED523AD17647283E183AD595
:10782500E5210C477EFEFF282E4F237E3208472395
:107835007E2B2B772323237E2B2B772323237E2B32
:107845002B77E1D1C38C773A0847A720D2E52122CF
:107855007877237 7E118BDE1D1CBC8210C47702398
:10786500ED5B6B49722373C9C5E5CD3A52A9FDE1BC

```
:10787500D51180002A6949CDC578226949D1C1C988
:10788500DDE5210000DD21D276DD3600071110008F
:10789500FD19FD7E00E660CB27571E00C5DD4600BD
:1078A50078A72811CB3ACB1BCB3ACB1B10F6DD467C
:1078B5000005DD700019C110D4E5D1656ADDE1C9A7
:1078C500FD4E00CBB9D53E19DFD11B7AB3C8FD23D8
:1078D50018EE3A2753CB67C9CDD778C43A52A6C913
:1078E500CDD778C48F6CC9C5D5CDDD78D1C1C36C72
:1078F50077210C473E43773E2023772377C93A2BE0
:0B7905003ECB47C8CDF678DDE118DC72
:0600000143475445535 42F
:1076C500D876EF761377177773F777977020004013D
:1076D500050110FD7E0047E638CB3FCB3FCB3FFE93
:1076E50005F021C776CDCA00EBE9AF327B4BCDB3B0
:1076F50077E5064048CD9E63E10602FD7E01FE1B4F
:10770500C8E60FED6FFD2310F2230D20ECC9CDB3B4
:1077150077E9CDB377E50E0221B149CDDC773AB1F2
:107725004977FDE1114000 3E1ADFED4BB249AFED5F
:1077350042C8213C3ECB65C034C9CDEE77D7CD3A99
:1077450052A6CFF578E6070605 21D176CDD1772863
:107755001FD11E0121A149E5CD3A52A9E106101616
:1077650017E0F0F0F0FCDC3777ECDC3772310F1A9
:10777500CD8F6CD950FDE5CDEE77FDE1F5FD23FD1F
:10778500230E1021A149E5CDDC777AE6073D0602F7
:1077950021D676CDD177E12002F1C9220947C5CDA1
:1077A5003A52EFC1D179320847CD3A52A8C978E6A5
:1077B5000706 0626006F2910FD01347A09C9E5E69A
:1077C5000FC64021B14977CD2E6CE1C9B720034ED4
:1077D5003CC93D2310F6C90602FD7E01E60FED6F9B
:1077E500FD2310F5230D20EFC9FDE5DDE1DD7E016B
:1077F500FD212E47FD7702DD7E02FD77033E23DF67
:01780500C9B9
:0600000144574E4C4F4431
:1076C500C7760E0047FE21CA2878FE722866FE2E70
:1076D500CA9577FE30385DFE49DAB178FE50DAB4E6
:1076E50077FE6EDA6678FE71CA2878FE73CAC077AF
:1076F500FE742826FE7C283CFE7DCAD577FE7ECA10
:10770500DE77F2E477D675FE0220160E4021404959
:107715003E0FCB7620013DC31978CD3A5280C31771
:107725007821F27816005F197EC5CD3252C118490D
:107735003EE918F5212B3ECB66CAD278FE2728F004
:10774500FE2C281FFE72280630CDFE22201121278F
:1077550053CB66200A32F742CDAC6F0E00181ACB18
:10776500F918B4210F3ECB86CB8ECB56200ECBD647
:10777500CD3A52C83E13CDE66CC31978CB96CB668D
:10778500200ACBC6CD3A52C73E1218EACBCE18F422
:10779500C53A313ECB5F280CCB9F32313ECD3A52B4
:1077A500B1C1186ECBDF32313ECD3A52B218F2FE7E
:1077B5004C3816D64F38083E2C18123E3B180EC6CC
:1077C5002EFE2C20083E2E1804D63CCBF1CBE1C969
:1077D5003E2A183C3255491839CD2952AF1833FE87
:1077E5007F20EA212753CB662004CB76200B210F7F
:1077F5003ECB46200ECBF91819CBD9C9210F3ECB6C
:1078050046200F212753CB662808CBD11806CBF984
:1078150 0CBE1CBC9CB69C8CB51C821033ECB46C010
:10782500CB81C9CBE9212753CB662004CB7620C970
:10783500210F3EFE212817CB5621033E200ACB5EA1
:1078450028D2CBD1CBC118CACB5E28C618F40E00FE
```

```
:107855003A443ED62028053A453E18AECD4F6C1821
:10786500B321313ECB46280D47E60FFE0A380218F4
:1078750066CD3A52D521033ECB662030FE603802F4
:10788500D610D620FE3A304D47212753CB66200A25
:10789500CB76C2FE77CBD9C31778210F3ECB46C234
:1078A5000878CBD9CB56C21978C30178212753CB99
:1078B50066200BCB762807CBE9CBD9C30878210303
:1078C5003ECB5E28D2212753CB66CA1378CBC1CBDA
:1078D500D1CBE918C2E60FFE0D20053E73C315781E
:1078E500D60BFAEE78C62C189F3E2E189B98990059
:0478F5008E8D978F4E
:06000001434D504149444B
:1076C500D376FA7635781278E57809788A78D73AD4
:1076D5008A4A57CD3578DD2AFA42DDCB007E20096E
:1076E50078DD460C0590471817DDCB00762011DDB7
:1076F5007E0B47180BD73A894A570600DD2AFA420E
:10770500DDCB056E20313A34474FCD3D78382278B0
:10771500B720030D18010C7921693EDD2AFA42DDF7
:10772500CB007E2007D5DD5E0C1D83D1CD8163287E
:10773500D979323447CFC97832B449CDE578DAE022
:10774500773AB449B720382A3447FD4606FD4E0734
:10775500AFED422807C5CD9D6CC1203ACD44003818
:107765000CCD9D6CC20278CB6028F11823CDCF7863
:107775002806CD3A52631863CD9D6C285EAF474FFE
:10778500C1814CD41003856CD9D6C2071CB6028F280
:10779500FD4606FD4E0779323447580D2AFA42ED9B
:1077A5004B34473AB449B72817DD7E0457933802 5E
:1077B5001825ED44F57A323547F1CD3A52F8181BC4
:1077C5007BDD5603923802180EED44F57A323547C3
:1077D500F1CD3A52F918047B323547CFC9CDCF7870
:1077E5002806CD3A526418F3CD9D6C28EEDD2AFAB1
:1077F50042DD7E02DD960147DD4E0B1899CB50C464
:107805008A78188CD73E0132B449C38C773A043E46
:10781500CB4F2818DD2AFA42DDCB056E2004CB5765
:107825002806CD3A523D1804CD3A5249CDD376C9F2
:10783500F53AF5423D47F1C979B8280D3ABD49FEFB
:107845000128047AB92802AFC937C9C52A3447E5E2
:10785500CB58282BCD3A529B2825FD660FFD6E0E81
:10786500CDB478201ACDC478FDE5FD21FF42216015
:1078750049CBC6E5CD3A5250E1CB86FDE118DBE1B7
:10788500223447C1C9C5CB582823CD3A529B281D60
:10789500FD660DFD6E0CCDB4782012CDC478216047
:1078A50049CBCEE5CD3A5251E1CB8E18E3C1C9CDD6
:1078B500D878C0CDC96CAFC93A344721693EC9FDF6
:1078C5004606FD4E07ED433447C9DD2AFA42DDCBB6
:1078D5000F46C93E08C5CD3C6078B7C1C8FE20C972
:1078E500CD2F63FD460378E603FE032821CB7828D8
:1078F50006CD3A52A02819CB702806CD3A52A128B8
:107905000FCB50C45078CB682804CD3A52F7B7C98D
:0279150037C970
:06000001544142532A2A7B
:1076C500C776D7CD0A633E1832CB783AF542FD2A04
:1076D5006F49FD960132C378FD7E0132C4783A05C3
:1076E5003EE638CA6177CB5F280A21AF780605CD1B
:1076F500A578180B3A8B4AB720FACBC7328B4A2AA2
:10770500F542260022C578CD8C7723CD9C773AC2E9
:107715007887204DCB6828183ACB783D32CB783AEC
:107725000B3ECB57280AE521BC780602CDA578E1AA
```

:107735003AF542CDC077CDA777FA437720C6DD214C
:107745003A533A053ECB5F2807CD8F6CDD212F5389
:107755000602CD6B52218B4ACB86CFC9CD3460183A
:10776500F93AC478CDC07722C7782AC578CD9C77F9
:107775003AC378CDC07722C578CDA77728C0CD8C00
:10778500772AC778C310773E08CD3C60AFCB682811
:1077950023E0132C278C93E08CD3C6078E61F67DB
:1077A50069C93E0DCD8D783A053ECB5728053E0A71
:1077B500CD8D783ACB783D32CB78C932CD78E5F5A9
:1077C500CDE1773ACD783002233D233D32CD78287F
:1077D50004FEFF20EBF14F0600E109C93E08CD3C50
:1077E5006078B7200206203A0B3ECB572834CB6988
:1077F500281A3ACC78FE012829E5C521B87806046F
:10780500CDA578C1E13E0132CC7818163ACC78B7CF
:107815002810AF32CC78E5C521B4780604CDA5781B
:10782500C1E178CB5928023E20CB41280AF5CD5F2E
:10783500783E08CD8D78F1CB512814CD5F783E0880
:10784500CD8D783E5FC5010000CD5F78C11803CDB1
:107855005F78CB69280237C9B7C9F53E31CB78289F
:1078650013CCH712802C602ED5BC078BB281432FF
:10787500C078E5C521BE7806043A0B3ECB57C4A5B2
:1078850078C1E1F1CD8D78C9C54F0600DD213A53A8
:107895003A053ECB5F2804DD212F53CD6B52C1C97C
:1078A500C57ECD8D7823C110F7C9011B571B281B39
:1078B500504E5C1B504D5C1B4B1B5B0070000069
:0978C50000000000000000FF00BB
:0600000150524954501C
:1076C500C776FD7E00C6E02AB47BBDC2E8783A2D88
:1076D5003EE61FBDDAE878DD7500FD6E02FD660148
:1076E500CD9B7B7D32B57BDDCB05F6FD7E03CB5F88
:1076F500280CDDCB05EEDD360DFFDD360EFFCB5755
:107705002804DDCB05FECB672804DDCB0FC6E603D9
:10771500FE032049DDCB00FEDDCB00F63AF5423D08
:10772500DD770BDDCB056E200C3A323EDD770D3A69
:10773500333EDD770E3ABA7BED5BBB7BBB30017B1D
:10774500DD7701853 2BA7B32BB7B3DDD7702ED5BB0
:107755002047 93ED5BB27BBB3856C3E878DD360D29
:10776500FFDD360EFFFDCB034E281FDDCB00FEFDF2
:10777500E5FD2AB07BFD7E013DDD770BFDE13ABAE3
:107785007BDD7701853 2BA7B18C0DDCB00F6FDE5E0
:10779500FD2AB07BFD460104DD700C3AF54290DD13
:1077A500770BFDE13ABB7BDD7701853 2BB7B189A10
:1077B5002ACB7BDD7507DD7408DD7509DD740AEDFF
:1077C5004BD249B7ED42CAF078090603CD9E632234
:1077D500CB7BFD6E042620CD9B7BDDCB007E280771
:1077E5003ABC7BBDC2EC78DDCB007628073ABD7B81
:1077F500BDC2EC787DDDB605DD77052620FD6E057D
:10780500CD9B7BDD7E05E61FBD2803D2EC783A1FB4
:1078150047FE1838023E1832CD7B677DBCD2EC7826
:10782500DD7706FE1720123A5F49B7280ADD7E008C
:10783500E6C0FEC0C2EC783E173CDDCB007E2803D7
:1078450032BC7BDDCB0076280332BD7B010600CD43
:10785500577BFE013871CAE178DD7E00E6C0FEC0C7
:10786500C2E878DDCB05B67C953878DD7E02DD96FD
:1078750001BC386F7C953C477D21BE7BF5CD3A52E6
:10788500B8CD7463F13C10F4CD3A7B3C47DD4E0333
:1078950079CD3A52B8CD8163280305284A0C10F0FA
:1078A500793DDD7704DD8601DDBE022802303 80131

```
:1078B50004003A053ECB472803010600CD577BFE61
:1078C50001380928lC1892CD457B381B21B47B341F
:1078D500011000DD09DD22B67BC3C776CD457B38B7
:0F78E50006B7C93E0418063E0818023E2037C9F0
:06000001444546 52474E43
:1076C500C976F676260011D676EB19195E2356EBA8
:1076D500E908780878 08785F77A777B677CF77F8DD
:1076E50077F676F076327741775077CD8E70C3F89E
:1076F500773E0132BA70CD9E70CDEF6C2ACD906D7C
:107705000E21023EE5CB562804CD906D02E1E5CB76
:107715005E2006CD906D031804CD906D04E1CB4E2F
:107725002806CD906D051804CD906D06C921023E41
:10773500CB562804CB9618C1CBD618BD21023ECB1B
:107745005E2804CB9E18B2CBDE18AE21023ECB4E8E
:107755002804CB8E18A3CBCE189FCD9E70CDEF6C91
:107765002B21043EE5CB462806CD906D081804CDA7
:10777500906D07E12BE5CB4E2807CD906D0AE118FA
:107785000FE1CB562806CD906D091804CD906D0BF1
:107795003A313ECB572806CD906D0C1804CD906D2F
:1077A5000DC921043ECB462804CB8618B0CBC6189C
:1077B500AC21033ECB562806CB96CBCE189FCB4E9D
:1077C5002804CB8E1897CBD6189321313ECB56285B
:1077D50007CB96CDE5771885CBD6CDE577C3627710
:1077E5003A313EE606F67021403ECB46C8CBC7CDC2
:1077F500FE5FC9CD9E70CDEF6C2DCD0978C8CDEF5C
:0C7805006C2EC9C9473A033ECB6F78C90E
:060000014F4341522A2A80
:1076C500C9762C78260011D676EB19195E2356EB70
:1076D500E94E77E677EB77F0776B77F577FA77FF13
:1076E50077047809780E781378187 81D782278272A
:1076F500783AB47047C62032443E11453E78B7C843
:107705002107003E0ADFC93AB47047C62032483E19
:10771500114 93E18E8F5CDEF6C2CF1C92020202049
:10772500205B0606210000F53E04DFF1C9473A0358
:107735003ECB6F78C9CD3A52DFCD32777E217F3E81
:107745002803218B3ED62019C93E01CD1A77F5C6EF
:1077550030470E20ED4324773E50322277F118351D
:107765003E0332BA70C93E05CD327728F3CD1A777C
:10777500F5D604FE0A38090631CDDF77D60A180A90
:10778500C63047CDDF773E201802C6303225773E1A
:1077950046322277F1F53C32B870F1112177CD27C9
:1077A50077CD3A77EB32B47047210600B7C42C7712
:1077B5007D32B270065D3E03DF3E0632B17032B3F4
:1077C500703A7A3E32B570CD3A52DD3E4632B670E9
:1077D5003EFF32B770CD3A52E1C9F578322477F1E0
:1077E500C93E02C350773E03C350773E04C350776A
:1077F5003E06C36D773E07C36D773E08C36D773E82
:1078050009C36D773E0AC36D773E0BC36D773E0C9A
:10781500C36D773E0DC36D773E0EC36D773E0FC3C7
:107825006D773E10C36D773AB870B7CAF676FE012C
:10783500CA0C773D1822CD327728043E1018023E37
:107845004CD3A77856F2BC9856FE5CD3B7823D17C
:10785500D5AFED52E5C1E1C9217B3EF53D5F16008F
:1078650019F1E5CD3A77E5F5CD4D78F15778B128A1
:107875001C3AB470922816C5F5F43B78F1F5E5D1BC
:10788500835FF1C1F29078EDB01802EDB83AB470AB
:1078950047C620D1E177210600FE2028033E0ADFF6
:0778A5003AB570327A3EC9CA
```

:0600000014341522A2A2AA5
:1076C500007726774631 2D50474D20434F4E46498A
:1076D50047204632 2D44474E53542046332D4C54B3
:1076E50041204634 2D41424D2046352D52455345C6
:1076F5005446362D434F554E54525926001 10D7799
:10770500EB19195E2356EBE925772577297748771 5
:10771500D47732784F78BB78C278D178D17826770C
:10772500C9CD9E7011C976062DCDB0783E0132BA0D
:10773500703A313ECB7FC811F676060A212E00CD70
:10774500B378C93E503200303E00D378CD6077CD56
:107755008F77CD9A773E1F320030C9CD3A52E3215B
:10776500D0751100000E007EFEFF280E46CD7877FD
:107775002318F4EB3E02DFEB13C923BEC846C5014F
:1077850000000CD7877C110F618E621A00006500E4E
:10779500213E07DFC9CD3A52E406167832B970C5E5
:1077A500CD7C78CD8F78FD4E06FD7105CD9978237A
:1077B50046FD7E04FD6E02FD66032FA6B828060D64
:1077C50020E7C3B978CD0B78C110D0CD7878C9CD75
:1077D5003A52E4CD7C78CD8F78CD1D78FD7E05FDC0
:1077E500BE062006FD36050118 03FD3405CD0B78D0
:1077F500CDF977C9CD99782346FD7E04FD6E02FD4E
:107805006603CDAA78C9CD99784623 23E5D1FD6EC7
:107815000 0FD66013E04DFC9CD997846FD6E00FD89
:107825006601C506003E03DFC12310F6C9CD3A52F5
:10783500E4CD61783AB9703CFE17CC497832B9701D
:10784500CD7878C93E01C93E16C9CD3A52E4CD611D
:10785500783AB9703DFE00CC4C7818E10E08C5CDDC
:107865007C78CD8F78C1061FFD6E00FD66012B3E2D
:1078750002DFC90E1218E7DD21377A1E0216003A1B
:10788500B9703DC847DD1910FCC9DD6E00DD660124
:10789500E5FDE1C9FDE5E1FD7E053D160782160022
:1078A5005F195E19C9A6B077C90606210000F53E25
:1078B50004DFF1C9C1C1CD3A52E8C348773A313E38
:1078C500CB7FCA2677CD3A52D6C32677CD8E70C3E5
:0278D500267714
:060000001504341522A2A7F
:1076C500C976DE7621E37622BC7032BB70FD21BA25
:1076D50070CDE1777CCD3252C921737718E9FB76FD
:1076E5000400DA010B770401DA021B771102DA03D1
:1076F5005F770504E00431010ADA32010BDA330160
:107705000CDA880203DA310204DA320205DA3302CE
:107715000 06DA880307DAA20400DBA40401DBA60469
:1077250002DBA80403DB310404DB320405DB33048C
:1077350006DB340407DB350408DB360409DB3704D4
:107745000 0ADB38040BDB39040CDB3A040DDB3B04A4
:107755000 0EDB3C040FDB880108DA9E0400E08E0492
:107765000 01E0810403E0830402E0880309DA9177EC
:1077750006 00E201A9770301E202B5770101E703FB
:10778500B9770504E004CD770505E005310203E28C
:10779500320300E7330400DE340501DE350207E27B
:1077A500360108E28D0206E28C0205E2880204E257
:1077B50088010BE29E0400E08E0401E0810403E0F1
:1077C500830402E0880109E29E0500E08E0501E0E0
:1077D500810503E0830502E088010AE2FD6E02FDF2
:1077E5006603110600FD7E003D2804471910FDE5DE
:1077F500DDE1DD6E00DD6601110400DD460278B7CE
:107805002809FD7E01BE28111910FADD6E05FD75EA
:107815000 0DD6E03DD6604180FE5DDE1DD6E01FDBB

:097825007500DD6E02DD6603C989
:0600000153545 0524F431E
:1076C500C9762F78DD21975C11B95C21063E01034F
:1076D50000EDB0CDB2773A363EDDCB079ECB7728AD
:1076E50004DDCB07DE3A9A5CDD4E01ED79219D5C28
:1076F5000608EDB3DD4E02DD7E0EED79DD7E0FED84
:10770500793A2B3ECB6F200A3A073ECB6F2803AF61
:10771500180A3A073ECBAF32073E3E0132803ADDCA
:10772500CB12D6DD7E23CB4F200ACB5F2814CB6747
:10773500280C180EDD7E22E60FFE04FA47773E0080
:1077450018023EFF32033BCD535721C95536002B56
:107755003EFF0608772B10FCFD21C955DD7E23CBA6
:107765004728 15CB5F202E3A2B3ECB572827FD36D1
:10777500FE13FD36FD11181D3A443ED62028164F3E
:1077850006002145 3E11C355EDB03A483ED62028A6
:107795004FD36F905DDCB244E2804FD36F804DD5D
:1077A500CB2456C8FD36F804FD36FF10C9AF3207A5
:1077B5003BDD7E22E60FFE0B200F3E0132073BDD4F
:1077C5007E07E63FDD7707181FDD7E22E60FFE0503
:1077D500FADE77DD360E5F1804DD360E1F16005F04
:1077E50021247819 7EDD770FDD7E22CB672818DD11
:1077F500CB07C6DDCB0BB6DDCB09BECB6FDDCB072B
:10780500CEC8DDCB078EC9DDCB0786DDCB0BF6DD1C
:10781500CB09FECB6FDD362100C8DD362180C95787
:107825003020100820151 00A0804DD21405E2109CA
:107835003E11625EEDA0EDA0CDCE773A363EDDCBB2
:10784500079ECB672804DDCB07DE21435E060BDDF3
:107855004E01EDB3DD4E02DD7E0EED79DD7E0FEDE1
:1078650079CD53573EFF32053BDD362000DDCB1287
:10787500D63A0B3EE6032017DD360940CDEB59DD40
:10788500360B20CD245ADD361000DD361100C9DD5A
:08789500CB11E6DDCB11D6C9D1
:06000001434D494E495435
:1076C500D576FA760E771977357751778F77E47710
:1076D500D779FE04200BE6042A2B3ECB95B5322B39
:1076E5003E21063ECDB977C4C477CDA677F3CD3A12
:1076F50052C5FBCFC9D721093ECDB977C4D077CDC7
:10770500A677F3CD3A52C618E9D7061A21113ECD10
:10771500A877CFC9D7FD7E00D620FA1777FE04FAE1
:10772500177 73C4F3E0006042144 3ECDAA7718BD8D
:10773500D7FD7E00D620FA1777FE21FA17773C4F42
:107745003E00062121483ECDAA77CFC9D706842120
:107755007B3ECDA8773E0521033ECB6E28023E1128
:10776500CD3A52DF3A033ECB6F280521 0C0019EBC9
:107775002180 00B7ED5238067D327A3ECFC90684A6
:107785000E00217B3ECDA877CFC9D7FD7E00320FF5
:107795003ECB572006CD3A52C71804CD3A52C8CF32
:1077A500C906033E40770DDAB577FD560072FD2315
:1077B5002310F2C97EE60F47FD7E00E60FB8C9E546
:1077C50021363EFE023010CBF6E1C9E521363EFEFC
:1077D50002 3008CBE618F2CBB618EECBA618EAD7DE
:1077E500AF32003ACD0A7828FBCD1078FEFF28137A
:1077F500AF32003A21267816 28CD4A6CCD0A782872
:10780500F318E6CFC93ACA40FEFFC9473AC940CD89
:107815000E01FEFFC8782126780628 0E00CDAA772E
:01782500C999
:06000001575254434F4D1D
:107917001B79AC79FDE5F5DD7E00E6C02156497798

:1079270001F0FFDDE5FDE1FD7E00E61F284CFE1FAF
:107937002848FD09FD7E0057A628EC7EFEC02006DC
:10794700FDCB007E28E1FDE5D1FD7E04FD219749B1
:10795700FD7700FD7301FD7202DDE5D1F1FD7703CF
:10796700FD7304FD7205CD3A5288FD6E06FD66076C
:10797700FD5E08FD5609FDE1B7C9DDE5D1FD21979B
:1079870049FD7304FD7205F1FD7703CD3A5288FD79
:107997005E08FD56092AF5422600DDCB007E280148
:1079A7002CFDE137C9FDE5E12323E511974901070F
:1079B70000EDB0D1010700EDB021974901070OEDB7
:0279C700B0C945
:060000015052475354412B
:107917001979 2A3447ED4B3847AFED422803F22F48
:1079270079CD686CCD8F6CC9FD21A149ED5BFA4219
:10793700FD7300FD7201FD7004FD7105CD3E00C5AC
:10794700CD53003E08CD3C60CB69C128040CFD3502
:1079570012FD7E123D2005040E0018010C2A344743
:10796700AFED4228BCED433647ED4B3447AFB92066
:1079770008052 10B00194E18010DC5CD686CC1CD46
:087987003A52A4CD3A5245C961
:0600000152444D41524B38
:107917001B795A791140493AF543B7213F3E7E28F2
:107927001AE6C7771ACBBF123A023ECB47C87EE6A4
:10793700F8771ACBB712CD3B6D0AC9E6F8771ACBA1
:10794700B7123A023ECB4728ED7EE6C7771ACBBF80
:107957001218E33AF543B7213F3E1140497E282EDE
:10796700E6C7F51AE63847F1B0771ACBFF123A02A5
:107977003ECB47C87EE6F8CB38CB38CB38B0771A42
:10798700CBF7123E0A80329379CD3B6D00C9E6F8FA
:10799700F51AE60747F1B0771ACBF7123A023ECB52
:1079A70047280F7EE6C7CB20CB20CB20B0771ACB5A
:097 9B700FF127EE607C60A18CD96
:06000001534 9534F2A2A67
:107917001979FD7E08324D493D323747AF324E491E
:107927003236473E01324949FD7E093C324A49CD4C
:107937003A5287CD2F63FD7E043237473C324D499B
:10794700AF323647324E49FD7E08FD96043D281476
:10795700324949DD2AFA42DD7E0B3C324A49CD3AAB
:107967005287180EFD7E09FDBE053006CD3A523D01
:10797700183ACD2F63DD2AFA42FD7E05B72819EDA7
:107987005BFA42FD4604040E00CD53001600FD5E6F
:107997005EB19EB1BCD1F52CD2F63FD5E0AFD567C
:0D79A7000BFD6E12260019EB1BCD1F52C9FF
:0600000149 4E5331504747
:107917001979 2A34477D324E497C324D4924223623
:10792700473E01324949FD7E12324A49CD3A5287D4
:10793700CD2F63FD7E04C6023237473D324D49AF36
:10794700323647324E49FD7E08FD96043D281432F3
:107957004949DD2AFA42DD7E0B3C324A49CD3A528B
:1079670087180EFD7E09FDBE053006CD3A523D183B
:107977003FCD2F63DD2AFA42DD7E0BFD9609281ADB
:10798700F5ED5BFA42FD460805FD4E09CD5300F1C2
:1079970016005FEB19EB23CD1F52CD2F63FD6E0E43
:1079A700FD660FE5FD5E091600B7ED52D1CD1F52FA
:0179B700C906
:0600000144454C3150475C
:107917001979FDE5FD5600CD0A63CD8B68DAB57997
:10792700CD51633E08CD3C6042ED43BF792AFE420C

```
:1079370006922BD79ED4BBF79CB692810CD5879CD38
:107947002F632AFE423ABF796F22BD79CD58791845
:1079570055CD3E00FD4E120600FD6E0AFD660BE595
:10796700092B3E08CD3C60ED43BB79E1E5D113FD22
:10797700461205280530BCD3C60ED4BBD793E0216
:10798700CD3C603A6049CB4720063A043ECB57C806
:10799700FDCB024EC0FD3404FD360500ED4BBB792F
:1079A700ED43BD7918ABFDE10E01CD7561C9FDE170
:0479B700CD3460C9A2
:06000001494E5343485232
:107917001979D721AB793AF742FE01280B3ABA70A9
:10792700FE0220043619180236012100003E50CD10
:107937006179CD4879FA417920F30602CD6B52CFB0
:10794700C93E0DCD9E793A053ECB5728053E0ACD57
:107957009E793AAB793D32AB79C932AC79E5F5CD51
:1079670082793AAC793002233D233D32AC79280441
:10797700FEFF20EBF14FQ600E109C93E08CD3C6050
:1079870078B7200206207 8CD9E79CB6928073E205C
:10799700CD9E7937C9B7C9C54F0600DD213A53CD0A
:0679A7006B52C1C9000093
:06000001434E465052542C
:1079C900CD79D479ED43327AAF181DED43327A2A55
:1079D900F542260016023E08CD3C60CBB03E02CDF2
:1079E9003C60231520F03E0132317A3A337AB7C828
:1079F900DDE5D1ED4B317ADD4E0B0CDD7E00E6C0C5
:107A0900FEC020010CC5CD53003E08CD3C603A3183
:107A19007AB72004CBF01802CBB03E02CD3C60C14E
:087A29000421337A3520DEC987
:06000001534342544E4639
:1079C900CD79E179FDCB035EC0FD4606FD4E07ED9D
:1079D900433447CD3460AFC9FD660DFD6E0CCDC98A
:1079E9006CCD3E00FD5E12CD197A281C1D28062398
:1079F900FD340518F2FDCB024EC0FD3404FD3605F9
:107A090000CD3E0030DE1803CDA66CCD3460AFC981
:0D7A19003E08C5CD3C6078C1B7C8FE20C94D
:060000014D414E454E5436
:1079C900D179DF79EF79E779061021693ECD9E6398
:1079D9003E0FA6771816CDFB79CD7463180ECDFB33
:1079E90079CD816328F0CDFB79CD7A633E01322EC2
:1079F90043C93A3447DDE5DD2AFA42DDCB007E2072
:0E7A090007C5DD460C0580C1DDE121693EC9DF
:06000001544142534554 36
:1079C900CB79FD7E00FE31D8FE34D0D630474F1139
:1079D900404 93AF543B7281CCB20CB20CB201AE6E7
:1079E900C7B0123A023ECB4728051AE6F8B112CDC4
:1079F9003A520EC91AE6F8B0123A023ECB4728EFBE
:0D7A09001ACB20CB20CB20E6C7B01218E22C
:060000015345 4C43485337
:1079C900D079444F4E453AE5D53A0B47D607381199
:1079D900C5210000 11CB7906050E033E05CD3C609B
:1079E900C178A72100002809C506082310FDC11088
:1079F900F71105001923D142D10E013E05CD3C6096
:017A0900C9B3
:060000014449 53504C4439
:1079C900CB793A3847FEFF281EED4B3847ED5BFA75
:1079D90042CD53003E08CD3C603E1FB82009ED4B17
:1079E900FE423E03CD3C60ED4B3447ED433847ED55
:1079F9005BFA42CD5300ED4B1847061F3E02CD3CC2
```

```
:057A0900060CDFE63C921
:06000001534E444D524B2A
:1079C900CB79FD7E00E63FFE14F2EF79DD21F279F5
:1079D90032DE79DD7E0032ED79110300FD190B0BE2
:1079E9000BCD3A5200C9CD3460C9869182929394E5
:0D79F900000009596B3B2C0C100C4D6C2C351
:060000014558545752540B
:1079C900CB79CD2F63FD7E03E603FE0328362A34E7
:1079D90047E5FD6606FD6E07223447CD3A523DCD97
:1079E9005F772A3447E3DD2AFA42DD7E03FD9606F6
:1079F90038092807223447CD3A52F9E1223447AFF2
:087A0900325549C9CD3460C9B2
:06000001455253494E5028
:107A3400367ACD3A529FDA2F7BCD3A52B4DA2F7B85
:107A4400ED4BCC7B3ABC7BB8C22D7B3ABD7BB8C234
:107A54002D7BDD2AB07BDDCB00EE213A3E34CBAE6C
:107A640021214711BE7B060D1AB677132310F93A6C
:107A7400B27BED5B204783322047CD3A52CC3E4067
:107A840032393E2ACB7B22CE493AAF7BB7200E3A1D
:107A94003B3E32CE7BCB8F323B3ECD7460DD2AB889
:107AA4007BED4BB37BAFF5C5CD3A5284DD4604DDA7
:107AB4004E0B0CDDE5D1CD5300E5D1010000DD7E98
:107AC40000E6C0FEC02001133E00CD3C6001100062
:107AD400DD09C1F13C05F2AA7ADD2AB67BDD7E031D
:107AE400CD3A5285301AFD2AB07BDDCB007E2808C2
:107AF400FD7302FD7203180FFD7304FD7205180770
:107B0400D5C13E02CD3C6001F0FFDD0921B47B35D7
:107B1400F2E17A3AAF7BB7C02AB07BCD3A528B3AC6
:107B2400CE7B323B3ECD7460C93E08CBC7F64032B3
:107B3400393ECD3460C9DD7E05E61FED44DD8606A1
:107B4400C9CD3A7BDD8603DD7704DD8601DDBE0227
:107B5400C83FC9FD093AB37B9132B37B2836FD7E19
:107B640000FE1B202D3A053ECB472817FD6E05FD70
:107B74006604CD9B7BE5FD6E03FD6602CD9B7BC158
:107B840079180BFD7E02C6E06FFD7E03C6E0673EFA
:107B940002C9AFC93E01C93EE0856F3EE08467CBB0
:0B7BA4003C3002CBF5CB3CD0CBFDC940
:060000014445464544425F
:107A34003A7A827AC67A0600CD7A6777CB492006ED
:107A4400CB4128101838CB59C4B67BCB51C45E68DF
:107A5400CD3252C9DD7E04473A2753CB67782007DD
:107A6400E5FDE1CDA27BC9473A0F3ECB4F28065036
:107A7400CD2E6C18EBCB4728E750CD2E6CC9DD7E9C
:107A840004CDDE7B7ECB49C23460CB41280CDD467D
:107A94007F53E0132026CF1189CCB71C2787BDD94
:107AA4007E04CB59C4D47BCB61C4AD7BCB51C87E9F
:107AB400E5FDE1FD23F53A026C3D06004FF1CD32C0
:107AC40052C97ECB7F20B7E5CD3A52B5E177CB717
:107AD40020C6CB79C23460CB41C41260CB492803A1
:107AE40032554 9CB512814CB692805CD1E6C180B8F
:107AF400E521D37B160177CD2E6CE1CB59281BCB26
:107B040069280DFDE5FD21036C0602CDA27BFDE194
:107B1400E5FDE1C50E01CDB76BC1CB492838FE4A5E
:107B24002829CB692830FE71202C473A2753CB678C
:107B340078282 3E5210F3ECB56E1281AE521033EA0
:107B4400CB5EE12011CD3A5238180B3A2753CB675C
:107B54002804CD3A5280CB612806DD7E04C3827AA4
:107B64003A033ECB6FC8CB49C83A5549D631F8FEE3
```

:107B74000CD0C6043CCD8E7BB7C8573A2753CB678D
:107B8400C42E6CC93A033ECB6FC9CD3A52DFCD88BF
:107B94007B7E217F3E2803218B3ED62019C9C5FD5B
:107BA400E548CDB76BFDE1C1C9CB69C4C77BCD56F0
:107BB40068C9E5CB71C4C77B21D37B771601CD2E71
:107BC4006CE1C9E521D27B1601CD2E6CE1C91B0005
:107BD400CB69C4C77B57CD2E6CC90E00E5F57EFE7C
:107BE400813005CDEC73185AFEA23859FEAA382C00
:107BF4002822FEF320163A103EE60FC660CDFE5F43
:107C04003A313EE606C670CDFE5F1836D66B77CDA8
:107C1400EC73182E3E1B77CDEC731826D6A2CB47F7
:107C2400281BCB3F3CFE042819473E7977233E307E
:107C340080772BCDEC73F1DD360402E1C9CB3F77BD
:107C4400CBF1F1E1C9D6815F1600E521767C197E7E
:107C5400FE50CC607CE177CDEC7318E621726D5F49
:107C64003A403ECB5F2801653A0F3ECB5728015C72
:107C74007BC9444143426162OA0D0873740932515D
:107C8400006665646368674848 3D4A493C004F5054
:037C94004E5777D1
:060000014B4250524F4338
:107A3400867AEC7A717B000000000000000000F0
:107A44000000000241249241212492412094924126 4
:107A540049040402000503010 6FFFF0907FF0A08A1
:107A6400FFFF02000503010604FF1107FF1210FFC8
:107A7400FFFF000503010604 02FF07FF1210FFFFCA
:107A840011FFF579324 07AF12209473A407A4F3EA4
:107A94002CDF3E20D37C061078ED44C610D37D0E37
:107AA4007AF3ED513E02D3793E0DDFDB7AE67FBAFD
:107AB40020F0FBDB7BCB3F772310DDE5FDE5D5CD67
:107AC400717B3A0847A7C4EC7AFD2A0947111000D4
:107AD400FD19FD220947D1FDE1E1141D20ADAFD30D
:107AE4007C32013BCD7460C93A0847060FA02807D1
:107AF4000E003E2CDF18050E043E2CDF7A32467A47
:107B04003E20D37CAFD37D0610C50602FD2A09476B
:107B1400FD7E00F5CB27CB10CB2078D378F1FD2A5E
:107B24001347FDE5D1CB3BCB1ACB17D37BD5FDE176
:107B3400FD2213473A467ACB27FD2A1547FDE5D1A6
:107B4400CB3BCB1ACB1FD37AD5FDE1FD2215473EA3
:107B54000FD3793E0DDFFD21147BFD7E023CFD77C2
:107B640002C110A5AFFD21147BFD7702C9FD214799
:107B74007AFD223A7AFD2A0947FD223E7AFD2156F2
:107B84007AFD223C7AAF32457A32417A32437A32F4
:107B9400447A3E0B32427ACD0D7CFD214C7AFD2293
:107BA4003A7AFD211547FD223E7AFD21667AFD22AF
:107BB4003C7A3E0132457AFD210000FD221547AF93
:107BC40032417A32437A32447A3E0B32427ACD0DD4
:107BD4007CFD21517AFD223A7AFD211347FD223E94
:107BE4007AFD21767AFD223C7A3E0132457AFD21E6
:107BF400000FD221347AF32417A32437A32447A8D
:107C04003E0B32427ACD0D7CC91E020603C52142C9
:107C14007A4E06002A0947097E21437A4E2A3A7A87
:107C2400094EA14F3A417A8132417A3A427A3C3242
:107C3400427A3A437A3C32437AC110D1CD4D7CAF7B
:107C440032417A06021D20C5C9D50608C53A417AD3
:107C5400CB3F32417A304E21447A4E06002A3C7A98
:107C640097E06FF88283EF53A457AA72843F1F580
:107C740006F0A0C4C77CF1060FA0CB27CB27CB27E7
:107C8400C6C6FD21977CFD7703AFFD7702FD2A3E32

:107C94007AFD23FDCB00C6FD21957C3EFDFD7700DA
:107CA4003E23FD77013A447A3C32447AC1109DD197
:107CB400C9F1FD21977CFD77023EFEFD7703CDC718
:0F7CC4007C18CAAFFD21957CFD7700FD7701C9C3
:06000001434744494147 5A
:107A3400607A0E7C0A7C5B7A547B547B547B3B7B60
:107A4400427BC57B547B427B0D0A0F1B79001D884A
:107A54007C8F7C977C937CD73E011802D7AF32464B
:107A6400492A3647E52A3447E5CD0A633AF543B750
:107A74003EA328023EA632807ACD3A5200DD21414F
:107A84003E3A4649B72806CD2F63C3217B3A38478F
:107A94003C2830ED4B3847ED5BFA42CD53003E08AD
:107AA400CD3C6078FE1F2014CD3A52E6E1C3047C3D
:107AB400CD6C68C3FD7BAF32644918F401FFFFED60
:107AC400433847DD7E01D620326149DD7E00E60C75
:107AD400281BFE043A61492818CD3A52D0DABA7A02
:107AE400226249DD7E02D62032644918 12AF326127
:107AF40049CD3A52D0DABA7A226249AF326449CDDA
:107B04003A52D8DAB47ACD6C68FD21A149FD7500EA
:107B1400FD7401AFFD7704FD7705CD3E00DD7E00E9
:107B2400E60347FD7E0357E6033CE6FC80D5213C93
:107B34007ACDCA00EBD1E9CB5A2015C3C57BFDE54C
:107B4400FD2AFA42FDCB057EFDE12075CB5A20715A
:107B5400FDCB037E2810CD3A52A0200A16012152F3
:107B64007ACD2E6C180CFDCB03762806CD3A52A1A3
:107B740028EAFD4606FD4E07FD7004FD7105FDE58E
:107B8400FD212E47FD7000FD7101CD6B63CD636354
:107B9400D521C149FD7E027723FD231520F6D13E70
:107BA40002825721BF49CD2E6CFDE1DDCB00662852
:107BB40007CD3A529BCAC57BCDC96CCD3E00CD0ED4
:107BC4007C3A4649B72032CD4100D2217BDD7E008C
:107BD400E60C4FFE0C28222A62493A64493C32647E
:107BE40049CD3A52D8D20A7B3E04B9280C216149C6
:107BF400347ECD3A52D0D2FC7ACD8F6CE122344718
:107C0400E1223647CFC93E011801AFDD21413E32A2
:107C1400C649CD157D3E08CD3C60E53AC649B72836
:107C24000FFD7E05573A8A4AFEFF2804BADAE47C3F
:107C3400ED5B6D4979E67F326D4921043ECB6E28B8
:107C440019BB281667ABFE407C280FF64032CB499F
:107C540021C949D51603CD2E6CD178E680326E4900
:107C6400BA200C79E640F57BE6405FF1BB28317819
:107C7400E680F579E64057F1B2070721537ACDCA79
:107C840000D5E1E9214E7A160118123E3118063E5C
:107C94003218023E3316032151 7A772B2BCD2E6CEA
:107CA40021C549701601CD2E6CE13AC649B72006AC
:107CB400DDCB00662813ED5B6549E5FD6604FD6ECA
:107CC40005AFED52E120023CC9CB692807FD34051C
:107CD400FD351223FD35122808FD340523C3197C14
:107CE400E1FDCB024E2802AFC9FD34043A894AFEB5
:107CF400FF2001AFFD77052104 3ECB66280D160158
:107D0400CB46280114214C7ACD2E6CCD3E00C316EF
:087D14007CFD660BFD6E0AC93F
:0600000152454144424655
:107A3400367AC9637ABC7A057B2D7B557B8F7BD4E0
:107A44007BE37BB47BF27B047C1A7C2C7C3E7C55F0
:107A54007C677C8C7C9E7CB07CC27CDA7CF17CACC8
:107A640001063EF0010C0C1014181C21262B303595
:107A74003A400300031313000301323030030233330F5

```
:107A84003003033630300040431323030004053234EC
:107A940030300406333630300407343830300408CC
:107AA400373230300040939363030050A3139323052
:107AB40030050B4558434C4BBE01093EF0010A0A00
:107AC4000E12161A1F24292E3303003131300301FC
:107AD40032303003023330300303363030040431A3
:107AE40032303004053234303000406333630300045A
:107AF4000734383030004083732303004093936302E
:107B040030FC01063ECF0104040C141907004E4F4B
:107B14004E4528302907204E4F4E45283129041060
:107B24004556454E03304F44440E02093ECF0104EE
:107B3400040C141907004E4F4E4528302907204ED7
:107B44004F4E4528312904104556454E03304F44C5
:107B5400444C02073EE0010606090C121C270200F1
:107B640048440201464440504484 42D524309194639
:107B7400442D5243284F4E290A0946442D52432886
:107B84004F46462905034 6442D41535E020A3EE012
:107B9400010303061002014644091946442D5243C9
:107BA400284F4E290A0946442D5243284F46462958
:107BB400FE020B3EC00103030A0F06014F54484561
:107BC400525304084E4F4E45060554492D3834305F
:107BD4009C02363EBF01020204010031014032AE74
:107BE4000023 63EEF0102020401003101103 28C031F
:107BF4002B3EFB0102020603004F464602044F4E91
:107C0400DC030F3EEF01020207040045434 84F0521
:107C1400104C4F43414C2C04073EDF010202060383
:107C2400004F464602204F4E7C040F3EF7010202ED
:107C34000502004E4F0308594553CC04083EF90190
:107C44000303080A04004E4F4E450102040204 10C7
:107C5400041C05083EF70102020502004E4F03080A
:107C64005945536C05083ECF010404080C11030068
:107C74004F464603104F5247042041 4E535208309A
:107C84004F52472D414E5352BC05083EFE0102029D
:107C940006030 04F46460201 4F4E0C060F3EDF011D
:107CA40002020603204F464602004F4EAC06403EF9
:107CB400DF01020205020038300320313332FC06B2
:107CC400053EFD0102020906025350414345530596
:107CD40004E554C4C534C07043EFD0102020A076A
:107CE400024 54F462D544142030054414 29C07042F
:107CF4003EFB010202060304454F460700454F4C74
:047D04002D454F4674
:0600000141435444415448
:107A3400367AF3313A4E21A84E11034DED52E5C189
:107A4400D5E12B3600EDB021604B118D4AED52E5A6
:107A5400C1D5E12B3600EDB03E40ED47ED5E217F10
:107A64007B1109400106 00EDB011D040011000ED7A
:107A7400B03EC332CD4021816322CE402A957B2281
:107A8400EE402A977B22FE40AF32803A3A013BCB4C
:107A94003FCB47C4AF7ACCB27ACB4FC4B57ACCB81B
:107AA4007ACBF7CB6F2010CBEF180ECBC7C9CB879F
:107AB400C9CBCFC9CB8FC9CBAFE6F36F3A2B3EE628
:107AC4000CB5322B3E21363ECBBE213B3ECBC6CB42
:107AD400CEED4B403E3E40213C3E0606772310FC53
:107AE4003E207723773E44323D3E21403ECB6928F9
:107AF40002CBEECD937CCDC976CD2F78CDBE7BCD98
:107B0400507CCDB17B0606DD21AF7BDD6E00DD66EA
:107B14000178CD2A51DD2BDD2B10F0215144065084
:107B2400CD9E632101440650CD9E6321997B060CB2
```

:107B34007ECDE66C2310F93A0F3ECB572806CD3B99
:107B44006D131804CD3B6D123A313ECB7F2808CD1E
:107B54003A52CDCD3A52CEFB21B0041101000600B9
:107B64003AFA43FE05280D10F7B7ED5220F0CD3B4D
:107B74006D0418E4AF32FA43C33450C3A144C34A7A
:107B84000E15EEA5C945F945FEA55D356D854935F
:107B940054AD4FF07B090A110F1016171933203416
:107BA400264B530D54685EC96D3D52426A3EB7D3AD
:107BB400DF3EEAD3DF3EE8D3DCC9AFCBE73227535D
:107BC400CD3B6D16210E00CD81693E04CD2A5101B5
:107BD400040011C94021DF7BEDB0C900FF0000049F
:107BE4007C0D7C167C237C2F7CE85F00D73A003A1E
:107BF4002AFA4326001 1E37B29194E2346C5E1E9FD
:107C0400CD3B6D033E28C3457C3E0132FA433E40E2
:107C1400182FFEF620F33A313EE606C67018223AD3
:107C2400103EE60F32EF7BC6601816E60707473AA8
:107C3400EF7BB820D4CD3B6D093E2021E85F22FEC6
:107C44004021FA433432003ACFFBED4DCD3A524C49
:107C54002A0F40110300B7ED52ED5222D249ED4BE9
:107C6400D049ED4201000ED5238030318F9CB204E
:107C7400CB213002CBC0CB20CB213002CBC0CB29CF
:107C8400CB2979C620322F3E78C620322E3EC9D762
:107C9400110180CDB97C110280CDB97C110380CD56
:107CA400B97C3A0F3ECB572006CD3A52C71804CDC3
:107CB4003A52C8CFC9FD2119403E0AD5F57AE607E4
:107CC400FD7701FD360200FD360300FD73003E150D
:0F7CD400DFB72808F1D13D20E23E27DFF1D1C90B
:060000014F53494E495423
:037D1C0000000064
:06000001415452544424C30

APPENDIX B

CMOS RAM $$
$$

:103E00002424414261564443404241454241444199
:103E10004E4B20285526263039 2B2E242420204195
:103E20005A617A20202020202020205320 2B232874
:103E3000105EFFFF84000140404040434044404 04A
:103E4000040402020200000028 4F505449203934A1
:013E50003041
:103E6900000000000000000000000000000000000049
:063E790000802020202043
:06000001434D4F532A2A73

SYSTEM ROM $$
$$

:10000000F3ED5E6DC3A5012ADDE1F1C1D1E1181365
:10001000DDE3FDE5E5D51813E5D5215104C35F0007
:10002000C30040FDE1DDE3C9C30340C5F5DDE9419F
:10003000C306405344D205443C30940C3840EC377C5
:100040000BC3E20CC3F80CC3700DC32B0AC35E0DC7
:10005000C3D30CC30E0D000000000000000000CD53
:10006000CA00EBD1E3C9F53A003BCB5F2804F1C3EA
:100070000C40F1D3EED3EF210340E5ED4500000045
:100080002AF643E5DDE1DD7E09C9D5FDE1FD36084F
:1000900001FD6605FD6E04F9FD6607FD6E06FD2295

APPENDIX C

System ROM

```
:1000A000F643E5FDE1D1C1E1F1DDE1FDE3C9CDD3E9
:1000B000002810CDE5002009D5545D23237323725 9
:1000C000D1F601C9CDCA00CB27C95F160019195E48
:1000D0002356C95E23562B7AB3C92AF843CDC400F0
:1000E000D5DDE1B7C9EBD5CDD300E37323722BD1B6
:1000F000C9C54E732346722BEB3600233600 2BEB1B
:1001000060697323 72C1C9F5AF32003AF1C9F5AF26
:1001100032C9403EFF32CA40F1C93AF543FE0028D9
:10012000103ACC40B7C83ACA40FEFFC0AF32CC400C
:10013000C93ACC40B720F532003AC921363E3AFAE6
:1001400043FE063A003A302CFEFF2820FEF0282815
:1001500032CA40FE852806FE862802CBBE3ACB4036
:10016000B72810F53E3032CC40F1181432C940AFF8
:1001700032003AC9AF32FA43CBBE3ACB40B7280877
:10018000F5AF32CB40F118E83ACC4018E30603C58E
:10019000CDDB05C1B7C810F7F3AF32003E113C0408
:1001A0000609C3F2033E40ED473EEB06FF10FE3D5D
:1001B00020F9C3150B2100203E54BE200223E92163
:1001C000000 30366F3E01D3782100400E4059DD21CA
:1001D000D501C3DC084B1E00210040DD21E601FDF6
:1001E00021 1202C3F4082100800E8059DD21F301A1
:1001F000C3DC084B1E00210080DD212402FD210408
:100200002C3F408F9FD211D02DD2127021E01C3EE
:100210000A09111B04060631FF3EC3EF0311210436
:10022000060718F33100003BFD217B03C33903FDB2
:100230002183 03C3390 3081BED730F40ED4B0F40BF
:1002400078BA20D979BB20D508FEAAC26403ED7321
:100250000F40FD210000110010CD33097DB42808A6
:100260001128040606C3EF0321FF1F221140DD21E0
:10027000A003210000 0620C50600C5015555CD93F9
:100280000301AAAACD9303010000CDD20423C1101B
:10029000E9C110E3CDCE032100203E50BE2028FD51
:1002A00021D007110010 3A0120FE02280311000896
:1002B000CD33097DB428101 12E040607C3F20311B3
:1002C00035040607C3F2032A003EE5AF32003E21A3
:1002D000003E110041010001EDB0FD218B03C33947
:1002E0000311003E210041010001EDB0E122003E7A
:1002F000CD5D073E242A003EBC2003BD2815FD210C
:1003000019402100002219 40CD8D0111450406 0637
:10031000C3F203FD2119403A353E6F3A363EE60FEF
:100320006722 1940AFFD7704CD8D01210020573E93
:100330004DBECA01202A1D40E93E55FD6601FD6EF5
:1003400000FD4603FD4E020B77545D13EDB0FD66D4
:1003500001FD6E00FD4603FD4E02BE36002010ED8D
:10036000A1EA5A03FE55280FFD6605FD6E04E9EB70
:10037000FD6607FD6E06E93EAA18C0004000402F4A
:1003800002120200800080 4E023602003E0001E1AF
:1003900002BF02C5CDD204CD1A05D1CDC203DDE91D
:1003A000D02B22114023DD21AB03C9D87CC6F8F243
:1003B000BA03113300060 5C3EF03114B040606C34D
:1003C000EF0378BA20067 9BB2002AFC937C9D7AF8F
:1003D000D3782100303 62F114F00210000E5C1CD28
:1003E000AD042100001109040609CDF204CFC9CDE6
:1003F000CE03D5C52109001112040 11209CDFE0456
:10040000C1D10E12CDFE0418FE53454C4620544572
:1004100053542D464149 4C45443A2052414D2054B5
:100420004352414D2041464D524F4D20544350526E
:100430004F4D20544 3434D4F53205443524F4D533F
```

:10044000204C4F414442545920544353
4D20444D75
:1004500045AD04CB04D204E904F204FE04E5040A29
:10046000051A052D0531053D056805CA0546095CD7
:100470000982099809D1050906FF05DB055D0753C7
:10048000088508190933093609DA08F208CD09EC9C
:100490000753097309BF09B109F8090C0A8D0198EE
:1004A0001770573057F057B05670B0000CDCB0445
:1004B00078D37A79D37BD5EBB7ED52233E0FD3793E
:1004C000CDCA052B7CB520F4E123C97CD37C7DD338
:1004D0007DC93E03F5CDCB0478D37A79D37BF1D3B4
:1004E00079CDCA05C93E0F18EBC5CD1A0579C14FA4
:1004F00018E0C51A47CDE9041323C110F5C9C51A80
:10050000047CDD2041323C110F5C9D5C5D1CD1A05E5
:100510004BCDD204231520F5D1C93E02F5CDCB0435
:10052000F1D379CDCA05DB7A47DB7B4FC93E0E1884
:10053000EBC5CD1A0578121323C110F5C9C54806BD
:1005400000B09EB09C1C5CD50051B2BC110F7C924
:10055000CD1A053EBFA14FC5EBCD1A05E33E40A124
:10056000B54FE1EBCDD204C9EBC5CD50051323C186
:1005700010F7C90E02180A0E0318060E0018020E14
:10058000017CD37C7DD37D3E02D379CDCA057AD35D
:100590007C7BD37D3E03D379CDCA05CB41281E7C1D
:1005A000D37C7DD37DAFD37B3A053ECB4F28043E31
:1005B000201801AFD37A3E03D379CDCA05CB4920A9
:1005C000041323180021B2B10B8C9DB78CB6720FA61
:1005D000C9FD4601FD4E00CDFB07C9CDD105CB7F3E
:1005E000C03A2540CB67200CFD360200FD360300E3
:1005F000CD0906C92A13407CBD20033E82C9E9CD3E
:10060000DB05FD6605FD6E04E9CDD105CB7FC0CDD0
:10061000B706CDD306E5CD3307DDE13808CDF506C5
:10062000FE81C818323A2540CB6F2810D5E5CDB7EA
:1006300006DDE5E1CDD906CDF5061811CDD105CD04
:10064000F206FE81C8CD3307D5E5CDF206E1C1FE45
:1006500081C8CD380738F1CD7206FD5E041600FD65
:100660006E02FD660319195E2356FD7304FD7205C3
:10067000AFC92100203E50BEC0110800194623FD1D
:100680007E00BE200E23FD7E01BE23CC97062310E4
:10069000EDAFC9232318F7E5C55E2356EB4E7E2345
:1006A000B6281146235E235623E52A234019EBE1A1
:1006B000EDB018E9C1E1C9502125407EE660B728B8
:1006C00082A26402323222640010400211F40CD72
:1006D000EC07C9FD6E02FD6603E5ED5B21407DB4CC
:1006E0002805AFED521806FD7203FD730222234068
:1006F000E1C9CDB706CD0F07010400211F40CD99F8
:10070000082A1F407CBD2805CD0F0718EBAFC9EDA7
:100710004B1F402A2140ED5B2340191600CD99085C
:10072000D5010100211F401600CD9908F182C8E1D2
:100730003E81C92138404604100 2AFC9237EFDBE68
:100740000023200A7EFDBE01232806231 8EA231871
:10075000FAC54E2346E5CDFB07E1D137C9AF32805C
:100760003B3E2032803BAFDD21284032803B3E10B3
:10077000213840328 03BAF061310FE32803B06101A
:10078000EFF3600230CC5E57921000 0CD2E08218F
:100790002540010100CD85083A2540FEFF2007DDF8
:1007A000360000E11809DD7700E1C1C5CDB607DDEF
:1007B00023C110D1AFC9410E00E5C5CDFB07CB7FEA
:1007C0002027212540 7EE660B7281AC1502138 40F5
:1007D00034E1E5C50102 00CDEC07C1E123237 1231B

:1007E000702300C18D4C1E118F9C1E1C97AE5C52A12
:1007F0002640CD2E08C1E1CD8508C921284016002C
:1008000058197EA720063E80C9C118FAC50CB9FA4E
:10081000090878210800110300D28031918FACDE2
:100820002E08212540010300CD8508C1AFC9221F34
:1008300040CD3808CD5308C9211F402346CB3FCBBC
:100840001ECB3FCB1E23772B3E3FA0473EC0A6B01A
:10085000772BC9AF32803B0E033E20ED6732803BE1
:10086000E60FDD23DD2B0D32803B2814F620DD233F
:10087000ED6732803BED6723AFDD2B32803B18D92B
:10088000ED67ED67C93E1032803BAF571E031D2058
:10089000FD32803B3E0A3D20FD3E1032803B781EFB
:1008A00021D20FDB1C83E0032803B1E011D20FD0F
:1008B0003A803BED671E011D20FD3E1032803B1E3D
:1008C00031D20FD3E0032803B1E011D20FD0B3A22
:1008D000803BED677A86572318BFDDE13E6906004D
:1008E0005778A97AEAE808371777231OF30D20F034
:1008F000DDE9DDE13E6906005778A97AEA000937AB
:1009000017BE08AFBB200D0820082310EB0D20E810
:10091000DDE9FDE90828FB18F11101A0060879AD11
:10092000CB3CCB1DE60128067CAA677DAB6FCB399B
:1009300010ECC9210000FD4E00D5CD1909D11B7A5C
:10094000B3C8FD2318F0F5CD5309FD23CD5309FDA0
:100950002BF1C9FD7E00C620FD7702C9F5FD7E00A2
:10096000CD7309FD7E01FD23FD23CD7309FD2BFD14
:100970002BF1C9F5CDC109FD7702F1CDC809FD778D
:1009800003C9F5CD8F09FD23CD8F09FD2BF1C9FDDD
:100990007E02D620FD7700C9F5C5CDB109FD7700EF
:1009A000FD23FD23CDB109FD2BFD2BFD7701C1F109
:1009B000C9FD7E02D6200F0FF5FD7E03D620C1B003
:1009C000C9E6C00707C620C9E63FC620C93ACB40E2
:1009D000B720FAF321CC407EB720173E30773AF5A6
:1009E00043FE0020067832003AFBC93ACA40FEFFB7
:1009F00020F37832CB40FBC93A033EE606280ACB07
:100A00005728043E1818023E104718C13A303E21BC
:100A100023ECB662802CBFFCB5E2802CBEF213B08
:100A20003ECB4E2002CBF7320030C9ED730043318C
:100A30002C43D7DB78F53E88D379F1FD2A0243CBEE
:100A400057C2E70AFD7E00FE0E2861FD6E03FD66BB
:100A50004FD4E05FD46063E02CDD204FD7E02FE9B
:100A600002200C23FD4E07FD46083E02CDD204FDB8
:100A70007E00FE0D285DFE113805CDEC0A1826FD1E
:100A80007E00FE0F20043E4018023E414FEE01D38F
:100A9000793E88D37979D379CFED7B0043F53E94C5
:100AA000D379F1ED45CFED7B0043ED45FD6E022698
:100AB0000FD4E06FD46073E02CDD20423FD4E0446
:100AC000FD46053E02CDD204FD7E03D37EFD3601F8
:100AD0000018D2FD6E0AFD660BFD5E0CFD560DFD85
:100AE0004609CD7B0518E6CDEC0A18B9FD6E0AFD66
:100AF000660BFD4E0CFD460D3E02CDD204FD7E0977
:100B0000FE02200C23FD4E0EFD460F3E02CDD20408
:100B1000FD360100C9210050F93A313ECB7F28440F
:100B2000160021000083E20D37C06100E02CD670B74
:100B3000783DD37DCD5B0B3E02D379CDCA050E0047
:100B4000CD670B3E08D3783E03D379CDCA0510DBC1
:100B500142B7CB520D3AFD37C18097AD37ADB7AF7
:100B6000BA20F8C9C3B5017932003B0F32013B0FFF
:100B70000FCBF7320030C9D7FD360200FD6E00FD05

```
:100B8000660122F343E5DDE1FD7E05FEFF2009DD80
:100B9000860BFD7705FD3504FD7E05DD960B3809D6
:100BA00028073DFD7705FD3404FD7E04B7FACC0C23
:100BB000DD7E02DD9601FDBE04DACC0CDD5E09DDD2
:100BC000560ADD6E07DD6608010300E5DDE1FD7E06
:100BD00004DDBE00381C200CFD7E05DDBE01381290
:100BE00020021811D5EBB7ED52EBD12002180609FF
:100BF00018D9B7ED42E5DDE1FD7510FD7411DD7E1C
:100C000002FD7703DD4600DD4E01FD7006FD710734
:100C1000ED5BF343CD0E0DFD750CFD740DFD46042B
:100C2000FD4E05CD0E0DFD750AFD740BFD7E04FD18
:100C3000BE062004FDCB02C6DD2AF343FD5E10FD97
:100C400005611DD6E09DD660AB7ED52280BEBE5DDC6
:100C5000E1110300DD191824DD7E02DD9601FD7728
:100C600008DD7E0BFD77093CFD9605FD7712FD7EC4
:100C700008FDBE042040FDCB02CE183AFD7E04DD07
:100C8000BE00200CFD7708DD7E013DFD770918D7F9
:100C9000DD7E01B728133DFD7709DD7E00FD770875
:100CA000DD2AF343DD7E0B18BEDD460005FD70082E
:100CB000DD2AF34318ABFD4608FD4E09ED5BF34317
:100CC000CD0E0DFD750EFD740FCFB7C9FDCB02D64D
:100CD000CF37C9CDE20CD8FD7E03E603FE0320EA40
:100CE00018F1CD770BD8F5FD7E093CFD7705FD7E2B
:100CF00008FD7704F1C3770BCD770BD8F5FD7E07A0
:100D00003DFD7705FD7E06FD7704F1C3770BDDE53C
:100D1000D5D5DDE1DD7E0180213043DDCB007E20B5
:100D20000321904 35F1600195E3AF5423C3C2E00C9
:100D300067FE52CC460DC4520D5F19060009DD4E08
:100D40000C09D1DDE1C9292919292919292929 19CC
:100D50029C92919292929292919291929C9DD4622
:100D600000FD4E00CDD20423DD23FD231D20EFC95D
:100D7000DD2AFA42DD7E00E6C0FEC02820CB7F28B7
:100D80029DD6E0B2C2600ED5BF5421D1600CD7D96
:100D90000EAF32FC42DD7E0B32FD421822AF32FC38
:100DA000423AF5423D32FD42181521 0000DD5E0C4D
:100DB0001D1D16003E00CD7D0EDD7E0C3D18DF2A88
:100DC000FC4226001E0016080E003AF542FE842062
:100DD0002160D062ECD610E063ACD6C0E062ECDF6
:100DE000610E1C7BFE0A20021E007BC630470E04EB
:100DF000CD6C0E0E001520DB3AF542FE842008066D
:100E00002ECD6C0ECD6C0EDDCB056EC03AFD42EDE5
:100E10005BFB42923C5F7A21693ECDCD40200614B7
:100E20001D20F3180A6A26000654CD760E18F0DD50
:100E30007E0DCD3C0EDD7E0ECD3C0EC9FEFFC8DD25
:100E4000CB007E2004DD860C3D6F2600064DCD765E
:100E5000 0EC93AFD42BDD83A2C43B7C87DFE323F99
:100E6000C93E04F5CD6C0EF13D20F8C9CD520E3EC1
:100E700023801DF23C9CD520E3E0318F4ED4BFEBC
:100E800042C3AD04220443E1F57E23320643F1E57B
:100E90002A0443D7FD2119402100413A0643BE38B8
:100EA000F5E231600935F19195E23567BB2200252
:100EB000CFC9CB7A200EFD7301FD7202FD3600C34F
:100EC000CFC31940CDAD0F3423CB2109732372CD8D
:100ED000F90EFD3600C3FD7101FD7002CFCD194042
:100EE000D7CDAD0F3528C97E2BCB274F095E2356B2
:100EF000FD211940CDF90ECFC9CD610FD8CD040F1A
:100F0000D03E27DFFD2119403E03D5F57AE607FDE7
:100F10007701FD73003E15DFB72813F1D13D20EABC
```

:100F2000ED4B2E432A0A4336002310FB37C9F1D17B
:100F3000ED4B2E432A08437EFDBE022320067EFD94
:100F4000BE032808231 0F0CD980FB7C92A0A433AE8
:100F50002F4390 0600CB274F0973237AE687771833
:100F6000E62A0A43ED4B2E437EBB202623CB7E2868
:100F7000227AE687BE201C2A08433A2F4390CB27CB
:100F80004F0600097EFD7702237EFD7703CD980F83
:100F900037C9232310D2B7C97AE678CB3FCB3F06B7
:100FA000004FFD6603FD6E02094E2346C92A0C431D
:040FB0004E0600C920
:0600000150575255502A31

What is claimed is:

1. A data display system for forming a plurality of independently controllable display regions on a display device comprising:

data processor means;

input means for transmitting electronic signals to said processor means;

main memory means connected to said processor means for receiving data therefrom and for providing data and instructions thereto;

mass data storage means having processor instructions permanently stored therein for transferring selected instructions to said memory means for subsequent transfer to said processor means as required;

control means for controlling the transfer of instructions from said mass data storage means to said main memory means;

a display device;

display controller means;

display memory means connected to and accessed by said controller means for storing information to be outputted to said display device;

character memory means connected to said controller means and to said display memory means for storing a set of predetermined character codes;

generator means connected to said display controller means, to said character memory means and to said display memory means for outputting signals to said display device; and random access memory means connected to said display controller means and to said generator means for storing alterable character code information, wherein said random access memory means is accessed by said display controller means through said generator means.

2. The system of claim 1 wherein said display device comprises a CRT, further comprising:

means connected to said processor means and to said generator means for controlling the contrast of said CRT in a plurality of discrete steps.

3. A data display system for forming a plurality of independently controllable display regions on a display device comprising:

data processor means;

main memory means connected to said data processor means;

input means connected to said data processor means and to said memory means;

display controller means connected to said data processor means;

display memory means connected to said display controller means wherein each row of characters to be displayed on said display device is assigned one or more memory location identifiers as defined by said display controller means to indicate the display memory address of a subsequent row of characters to be displayed and wherein said display controller means alters the sequence of rows displayed on said display device by modifying the memory location identifiers on the selected rows of characters;

character memory means connected to said display controller means for storing a predetermined set of character data codes, whereby the data code corresponding to a selected character is loaded into said display memory means in response to a command from said display controller means;

generator means connected to said display controller means, to said character memory means and to said display memory means for outputting control signals to said display device and for generating a visual attribute code for each character stored in said display memory means; and character random access memory means connected to said display controller means and to said generator means for storing alterable character data codes therein, wherein a selected character code is transferred therefrom through said generator means into said display memory means in response to a command from said display controller means.

4. The system of claim 3 wherein said display device comprises a CRT, further comprising:

means connected to said data processor means and to said generator means for controlling the contrast of said CRT in a plurality of discrete steps.

5. The system of claim 4, wherein said data processor means comprises a microprocessor.

6. The system of claim 5, wherein said main memory means comprises a random access memory.

7. The system of claim 7, wherein said input means comprises:

an array of manually operable switch means;

input processor means for scanning said array of switch means wherein said input processor means transmits electronic signals to said microprocessor corresponding to which of said switch means are enabled.

* * * * *